(12) United States Patent
Masuda et al.

(10) Patent No.: US 10,018,868 B2
(45) Date of Patent: Jul. 10, 2018

(54) OPTICAL AND POSITIONING STRUCTURES, ILLUMINATION DEVICE, AND DISPLAY DEVICE HAVING THE SAME

(71) Applicant: Sharp Kabushiki Kaisha, Sakai, Osaka (JP)

(72) Inventors: Takeshi Masuda, Sakai (JP); Ryuzo Yuki, Sakai (JP); Hisashi Watanabe, Sakai (JP); Shinya Kadowaki, Sakai (JP); Mitsuhiro Murata, Sakai (JP); Takeshi Ishida, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/539,831

(22) PCT Filed: Dec. 18, 2015

(86) PCT No.: PCT/JP2015/085471
§ 371 (c)(1),
(2) Date: Jun. 26, 2017

(87) PCT Pub. No.: WO2016/104352
PCT Pub. Date: Jun. 30, 2016

(65) Prior Publication Data
US 2017/0351127 A1     Dec. 7, 2017

(30) Foreign Application Priority Data

Dec. 26, 2014  (JP) ................................ 2014-265558

(51) Int. Cl.
*G02F 1/1335* (2006.01)
*F21V 5/02* (2006.01)
(Continued)

(52) U.S. Cl.
CPC .............. *G02F 1/1335* (2013.01); *F21V 5/02* (2013.01); *F21V 5/048* (2013.01); *G02F 2001/133337* (2013.01); *G02F 2001/133388* (2013.01)

(58) Field of Classification Search
CPC ........... G02F 1/1335; F21V 5/02; F21V 5/048
See application file for complete search history.

(56) References Cited

U.S. PATENT DOCUMENTS

2015/0029443 A1    1/2015  Inui et al.

FOREIGN PATENT DOCUMENTS

CN          201582648 U     9/2010
JP          2000-214793 A   8/2000
(Continued)

*Primary Examiner* — Joseph L Williams
(74) *Attorney, Agent, or Firm* — ScienBiziP, P.C.

(57) ABSTRACT

A backlight device includes: optical members with a substantially circular profile, including a light guide plate, optical sheets, and a reflective sheet; a chassis (lamination member) disposed to overlap the light guide plate, the optical sheets, and the reflective sheet (optical members); and positioning structures. The positioning structures are provided on the light guide plate, the optical sheets, and the reflective sheet (optical members) and on the chassis (lamination member). The positioning structures have contact faces that come into contact with each other in the circumferential direction of the light guide plate, the optical sheets, and the reflective sheet (optical members), so as to position the light guide plate, the optical sheets, and the reflective sheet (optical member) relative to the chassis (lamination member) in the circumferential direction.

14 Claims, 38 Drawing Sheets

(51) Int. Cl.
*F21V 5/04* (2006.01)
*G02F 1/1333* (2006.01)

(56) References Cited

FOREIGN PATENT DOCUMENTS

| | | | |
|---|---|---|---|
| JP | 2002-156632 | A | 5/2002 |
| JP | 2005-302568 | A | 10/2005 |
| JP | 2005-347014 | A | 12/2005 |
| JP | 2006-004751 | A | 1/2006 |
| JP | 2008-129259 | A | 6/2008 |
| JP | 2009-199971 | A | 9/2009 |
| JP | 2011-228042 | A | 11/2011 |
| JP | WO2013/161241 | A1 | 10/2013 |
| JP | 2014-154321 | A | 8/2014 |
| WO | 2013161241 | A1 | 10/2013 |

OPTICAL AND POSITIONING STRUCTURES, ILLUMINATION DEVICE, AND DISPLAY DEVICE HAVING THE SAME

TECHNICAL FIELD

The present invention relates to illumination devices and display devices.

BACKGROUND ART

Liquid crystal displays have been conventionally used as display devices in compact, thin apparatus such as laptop computers, mobile phones, and portable televisions. Other growing areas of applications of the liquid crystal display include onboard meters for vehicles that display vehicle and traffic information. These liquid crystal displays include an illumination device for casting light on a liquid crystal panel. Such an illumination device includes a light source and a light guide plate that converts a flux of light coming from the light source to an area flux of light that is the most suitable to the lighting-up of a liquid crystal panel. Patent Literature 1 detailed below discloses a known, exemplary illumination device of this type. The illumination device disclosed in Patent Literature 1 includes a plurality of light sources and a light guide member. The light emitted by the light source enters the light guide member through a light-incident portion thereof and exits the light guide member through the light-exiting portion thereof to cast light on a liquid crystal panel which is a lit-up member. The light guide member is substantially circular. The light sources are arranged along the circumference of the light guide member so that all the directions of the light emitted by the light sources can intersect.

CITATION LIST

Patent Literature

Patent Literature 1: Japanese Unexamined Patent Application Publication, Tokukai, No. 2009-199971

Problems to be Solved by the Invention

Since the light guide member described in Patent Literature 1 has a substantially circular profile, the light guide member is easily displaced in the circumferential direction thereof when the light guide member is assembled during manufacture or when the liquid crystal display is subjected to vibration or impact after being manufactured. The light guide member, if displaced, moves out of alignment with the light sources, therefore possibly developing problems including failure to exhibit desired optical performance. These problems have been difficult to cope with.

SUMMARY OF INVENTION

The present invention, completed in view of these problems, has an object to prevent inconveniences that could result from such displacement.

Means to Solve Problems

The present invention is directed to an illumination device including: an optical member having a substantially circular profile; a lamination member disposed to overlap the optical member; and positioning structures provided to the optical member and the lamination member and having contact faces that come into contact with each other in a circumferential direction of the optical member, to position the optical member relative to the lamination member in the circumferential direction.

In this configuration, the optical member and the lamination member disposed to overlap the optical member have positioning structures with contact faces that come into contact with each other in the circumferential direction of the optical member. Therefore, when the lamination member is to be disposed to overlap the optical member, the optical member is positioned relative to the lamination member in the circumferential direction of the optical member. In addition, the positioning structures render the optical member less likely to be displaced relative to the lamination member in the circumferential direction of the optical member when, for example, the illumination device is subjected to vibration or impact. The configuration hence enables, for example, the optical member to exhibit appropriate optical performance. The configuration also renders the optical member less likely to be subjected to abrasion and scratching that could otherwise be caused by friction with the lamination member and prevents other like displacement-caused inconveniences.

The following configurations are preferred aspects of the present invention.

(1) The illumination device further includes a plurality of light sources arranged at intervals in terms of the circumferential direction, wherein the positioning structures are provided between those light sources which are adjacent in the circumferential direction. In this configuration, the positioning structures are less likely to obstruct light emitted by the light sources. The light exiting from the illumination device is hence less likely to have non-uniform luminance or develop other like problems.

(2) At least two of the positioning structures differ in size from each other as viewed in a direction in which the lamination member overlaps the optical member and are provided in locations that are not point-symmetric with respect to a center of the optical member. In this configuration, the optical member is positioned relative to the lamination member in the circumferential direction. In addition, if the optical member is to be disposed to overlap the lamination member in the flipped, incorrect position, at least either one of the two positioning structures becomes out of alignment. These features can interrupt assembling and hence prevent the optical member from being assembled in the flipped position.

(3) The optical member includes a plurality of optical members disposed to overlap each other, and the positioning structures include at least a first pair of two of the positioning structures and a second pair of another two of the positioning structures. The positioning structures in the first pair differ in size from each other as viewed in a direction in which the lamination member overlaps the optical members and are provided in such a manner as to make an angle of $\alpha$ (degrees) therebetween so that the positioning structures in the first pair are provided in locations that are not point-symmetric with respect to a center of the optical member. The positioning structures in the second pair differ in size from each other as viewed in the direction in which the lamination member overlaps the optical members and are provided in such a manner as to make the same angle of $\alpha$ (degrees) therebetween as the positioning structures in the first pair and in such a manner that the first pair of positioning structures and the second pair of positioning structures make an angle of $\beta$ (degrees)

therebetween, α (degrees) being not equal to β (degrees). In this configuration, when the optical members are to be disposed to overlap each other, the optical members can have the same structure and be arranged and positioned by rotating the optical members by an angle of β (degrees) that is not equal to α (degrees). These features can reduce the types of components used as the optical members, thereby allowing for reduction in manufacturing cost.

(4) The optical member includes a plurality of lens sheets each including unit lenses extending in a single direction, the unit lenses being arranged in a direction that intersects that single direction, and the positioning structures are arranged so that the first pair of positioning structures and the second pair of positioning structures make an angle of 90° therebetween. In this configuration, when the lens sheets are to be disposed to overlap each other, the lens sheets can have the same structure and be arranged so that the extension direction of the unit lenses in the first lens sheet is perpendicular to the extension direction of the unit lenses in the second lens sheet. These features allow for improvement of front luminance at a low cost. Besides, the positioning structures position the first lens sheet and the second lens sheet relative to the lamination member in the circumferential direction. Therefore, the angle (90°) made by the extension direction of the unit lenses in the first lens sheet and the extension direction of the unit lenses in the second lens sheet is less likely to vary, which enables the illumination device to stably exhibit the optical performance thereof.

(5) The positioning structures are each asymmetric in shape as viewed in a direction in which the lamination member overlaps the optical member. In this configuration, the optical member is positioned relative to the lamination member in the circumferential direction. In addition, if the optical member is to be disposed to overlap the lamination member in the flipped, incorrect position, the positioning structures, which are asymmetric in shape as viewed in the overlapping direction, do not fit together. These features can interrupt assembling and hence prevent the optical member from being assembled in the flipped position.

(6) The illumination device further includes a plurality of light sources arranged at intervals in terms of the circumferential direction, wherein: the optical member includes at least a light guide plate for guiding light emitted by the light sources, and the lamination member includes at least a housing for housing the light sources and the light guide plate. In this configuration, when the housing is to be placed into the light guide plate, the positioning structures position the light guide plate relative to the housing in the circumferential direction of the light guide plate. Thus, the light guide plate comes to have a stable positional relationship with the light sources in the circumferential direction. The light guide plate can hence exhibit appropriate optical performance by which the light emitted by the light sources is guided. Additionally, the light guide plate becomes less likely to displaced relative to the housing in the circumferential direction of the light guide plate when, for example, the illumination device is subjected to vibration or impact. That in turn renders the light guide plate less likely to be subjected to abrasion and scratching that could otherwise be caused by friction with the housing.

(7) The optical member includes at least an optical sheet disposed to overlap a light-exiting side of the light guide plate, the optical sheet performing an optical operation on light exiting from the light guide plate. In this configuration, when the optical sheet is to be placed into the housing, the positioning structures position the optical sheet, as well as the light guide plate, relative to the housing in the circumferential direction of the optical sheet. Thus, the optical sheet comes to have a stable positional relationship with the light guide plate in the circumferential direction. Additionally, the optical sheet becomes less likely to be displaced relative to the light guide plate in the circumferential direction of the optical sheet when, for example, the illumination device is subjected to vibration or impact. That in turn renders the optical sheet less likely to be subjected to abrasion and scratching that could otherwise be caused by friction with the light guide plate.

(8) The housing has a sidewall portion encircling at least the light sources and the light guide plate, the sidewall portion having a plurality of light-source-containing concave portions in dented parts of an inner circumferential surface of the sidewall portion at intervals in terms of the circumferential direction, the light-source-containing concave portions containing the light sources inside thereof. The positioning structures include: a convex positioning portion on a projecting part of an outer circumferential surface of the light guide plate, the convex positioning portion having contact faces; and a concave positioning portion in a dented part of the inner circumferential surface of the sidewall portion, the concave positioning portion having contact faces for engagement with the convex positioning portion. In this configuration, when the light guide plate is to be placed into the housing, the convex positioning portion, which projects out of a part of the outer circumferential surface of the light guide plate, is engaged with the concave positioning portion, which is formed by denting a part of the inner circumferential surface of the sidewall portion. As a result, the contact faces of the convex positioning portion and the contact faces of the concave positioning portion come into contact with each other in the circumferential direction, so that the light guide plate is positioned relative to the housing in the circumferential direction. The convex positioning portion, projecting out of a part of the outer circumferential surface of the light guide plate, is less likely to obstruct light propagating in the light guide plate than a concave positioning portion formed by denting a part of the outer circumferential surface of the light guide plate. Besides, the light sources are contained in the respective light-source-containing concave portions formed by denting parts of the inner circumferential surface of the sidewall portion of the housing and arranged at intervals in terms of the circumferential direction. Therefore, the provision of the light-source-containing concave portions leaves a smaller gap between the outer circumferential surface of the light guide plate and the inner circumferential surface of the sidewall portion than a gap as large as the light source that would exist between the outer circumferential surface of the light guide plate and the inner circumferential surface of the sidewall portion if no light-source-containing concave portions were provided in the sidewall portion. Hence, even if light leaks out from the outer circumferential surface of the light guide plate in the direction of the sidewall portion, the light is less likely to leak through that gap between the outer circumferential surface of the light guide plate and the inner circumferential surface of the sidewall portion in the direction of the light-exiting side, which can suppress non-uniform luminance and other related problems.

(9) The illumination device further includes a plurality of light sources arranged at intervals in terms of the circumferential direction, wherein: the lamination member includes at least a light guide plate for guiding light emitted by the light sources, the light guide plate having a substantially circular profile so as to be encircled by the light sources; and the optical member includes at least an optical sheet disposed to overlap a light-exiting side of the light guide plate, the optical sheet performing an optical operation on light exiting from the light guide plate. In this configuration, when the optical sheet is to be disposed to overlap the light-exiting side of the light guide plate, the positioning structures position the optical sheet relative to the light guide plate in the circumferential direction of the optical sheet. Additionally, the optical sheet becomes less likely to be displaced relative to the light guide plate in the circumferential direction of the optical sheet when, for example, the illumination device is subjected to vibration or impact. That in turn renders the optical sheet less likely to be subjected to abrasion and scratching that could otherwise be caused by friction with the light guide plate.

(10) The illumination device further includes a housing for housing the light sources, the light guide plate, and the optical sheet, the housing having a sidewall portion encircling at least the light sources, the light guide plate, and the optical sheet, wherein: the light guide plate has a substantially circular profile, has light-incident faces in parts of an outer circumferential surface thereof that face the light sources, the light emitted by the light sources being incident on the light-incident faces, and has light-source-to-light-source intervening portions interposed between those light sources which are adjacent in the circumferential direction and projecting toward the sidewall portion relative to the light-incident faces; and the positioning structures are provided to the light-source-to-light-source intervening portions and an outer edge of the optical sheet. In this configuration, the light-source-to-light-source intervening portions are interposed between those light sources which are adjacent in the circumferential direction in such a manner as to project toward the sidewall portion relative to the light-incident faces. The positioning structures are provided on the light-source-to-light-source intervening portions and the outer edge of the optical sheet. The positioning structures are less likely to obstruct light propagating in the light guide plate, which renders non-uniform luminance and related problems less likely to occur in the light emitted by the illumination device. Besides, the sidewall portion of the housing has no positioning structures. This configuration readily allows for reduction in the thickness of the sidewall portion, thereby providing the illumination device with a narrow frame. Furthermore, the light-source-to-light-source intervening portions project toward the sidewall portion relative to the light-incident faces. This configuration leaves a smaller gap between the outer circumferential surface of the light guide plate, to the exclusion of the light-incident faces, (the external faces of the light-source-to-light-source intervening portions) and the inner circumferential surface of the sidewall portion than without there being any light-source-to-light-source intervening portions on the light guide plate. Hence, even if light leaks through parts of the outer circumferential surface of the light guide plate, to the exclusion of the light-incident faces, in the direction of the sidewall portion, the light is less likely to leak through that gap between the outer circumferential surface of the light guide plate and the inner circumferential surface of the sidewall portion in the direction of the light-exiting side, which can suppress non-uniform luminance and other related problems.

(11) The positioning structures include: a light-guiding-plate-side positioning portion projecting out of the light guide plate toward the light-exiting side; and an optical-sheet-side positioning portion provided on the optical sheet to mate with the light-guiding-plate-side positioning portion. In this configuration, the light-guiding-plate-side positioning portion, which mates with the optical-sheet-side positioning portion of the optical sheet, projects out of the light guide plate in the direction of the light-exiting side. The light-guiding-plate-side positioning portion is therefore less likely to obstruct light propagating in the light guide plate than a light-guiding-plate-side positioning portion formed by denting the light guide plate away from the light-exiting side. These features enable the light guide plate to exhibit the optical performance thereof in a satisfactory manner.

(12) The illumination device further includes a housing for housing at least the light sources, the light guide plate, and the optical sheet, wherein the light guide plate and the housing each include a holding structure configured to hold the light guide plate and the housing in assembled state. In this configuration, the holding structures maintain the light guide plate and the housing in assembled state. The optical sheet, positioned relative to the light guide plate, is also positioned relative to the housing.

Next, to address the problems, the present invention is also directed to a display device including: the illumination device described above; and a display panel producing a display by utilizing light emitted by the illumination device.

In the display device configured in this manner, inconveniences are prevented that could accompany displacement of the optical member in the illumination device. This feature enables the optical member to exhibit appropriate optical performance and also renders the optical member less likely to be subjected to abrasion and scratching that could otherwise be caused by friction with the lamination member. Therefore, the resultant display will have excellent display quality.

Effects of the Invention

The present invention is capable of preventing displacement-caused inconveniences.

DESCRIPTION OF EMBODIMENTS

Embodiment 1

Figure 1:
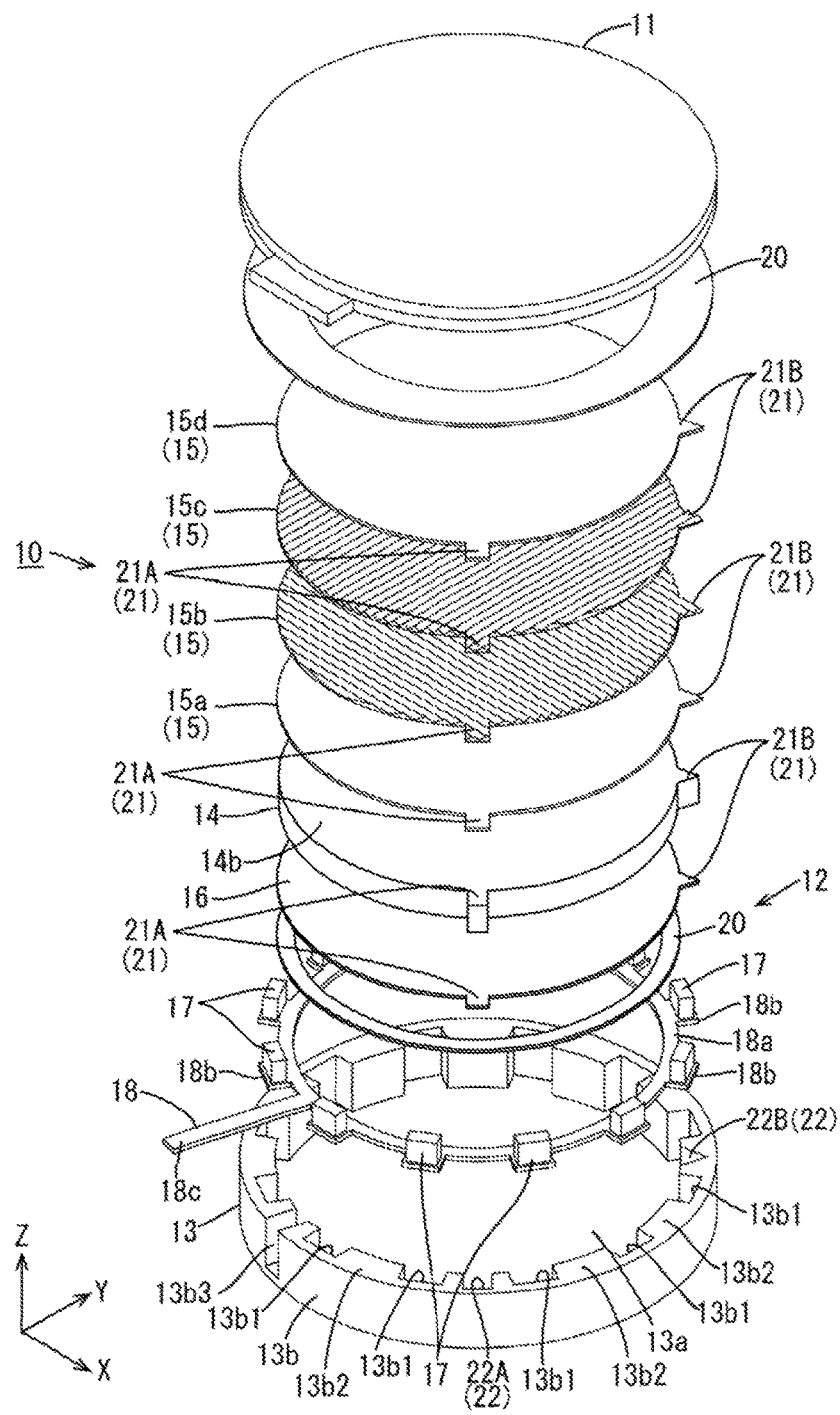
FIG. 1 is an exploded perspective view of a liquid crystal display in accordance with Embodiment 1 of the present invention.
Figure 2:
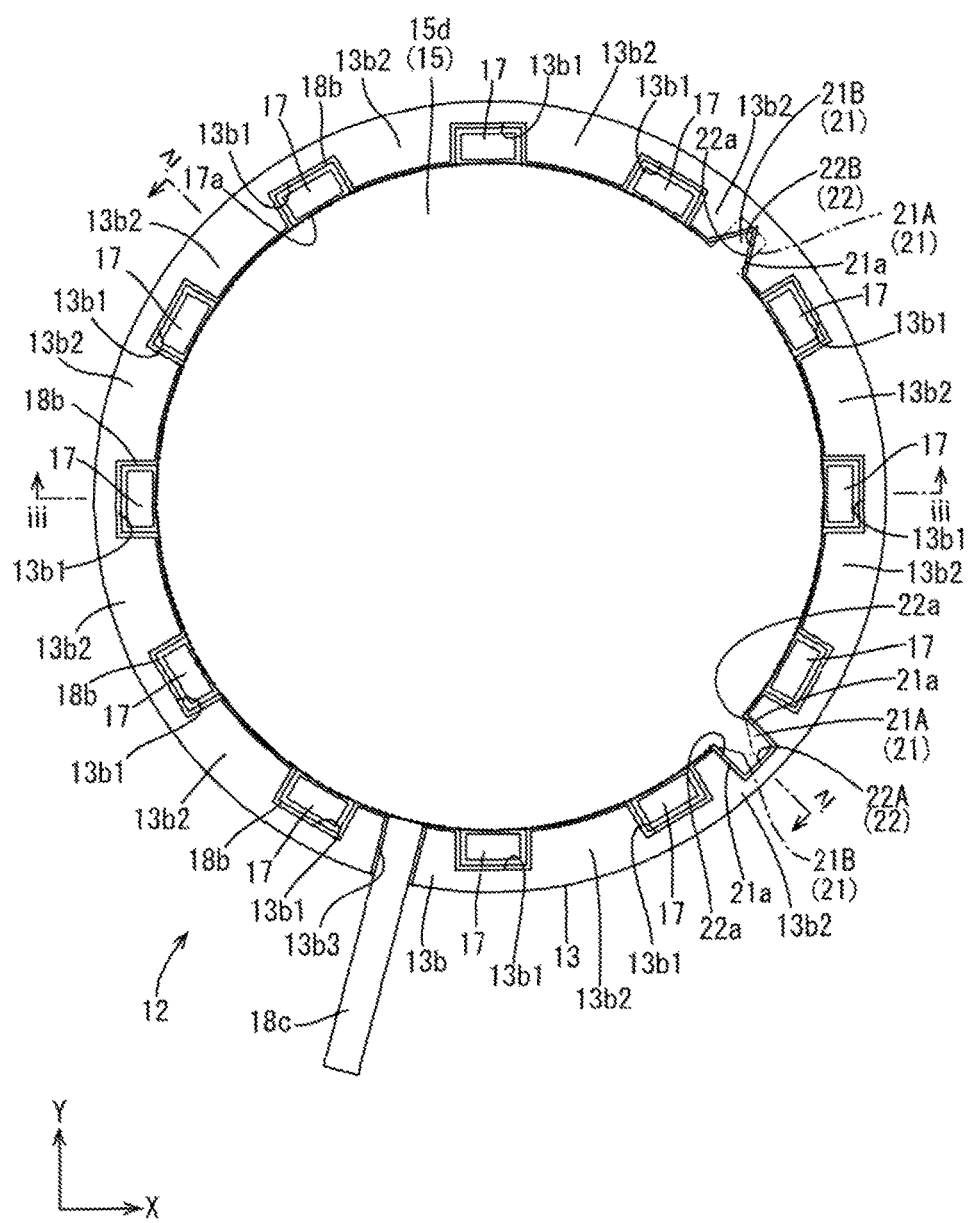
FIG. 2 is a plan view of a backlight device in the liquid crystal display.
Figure 3:
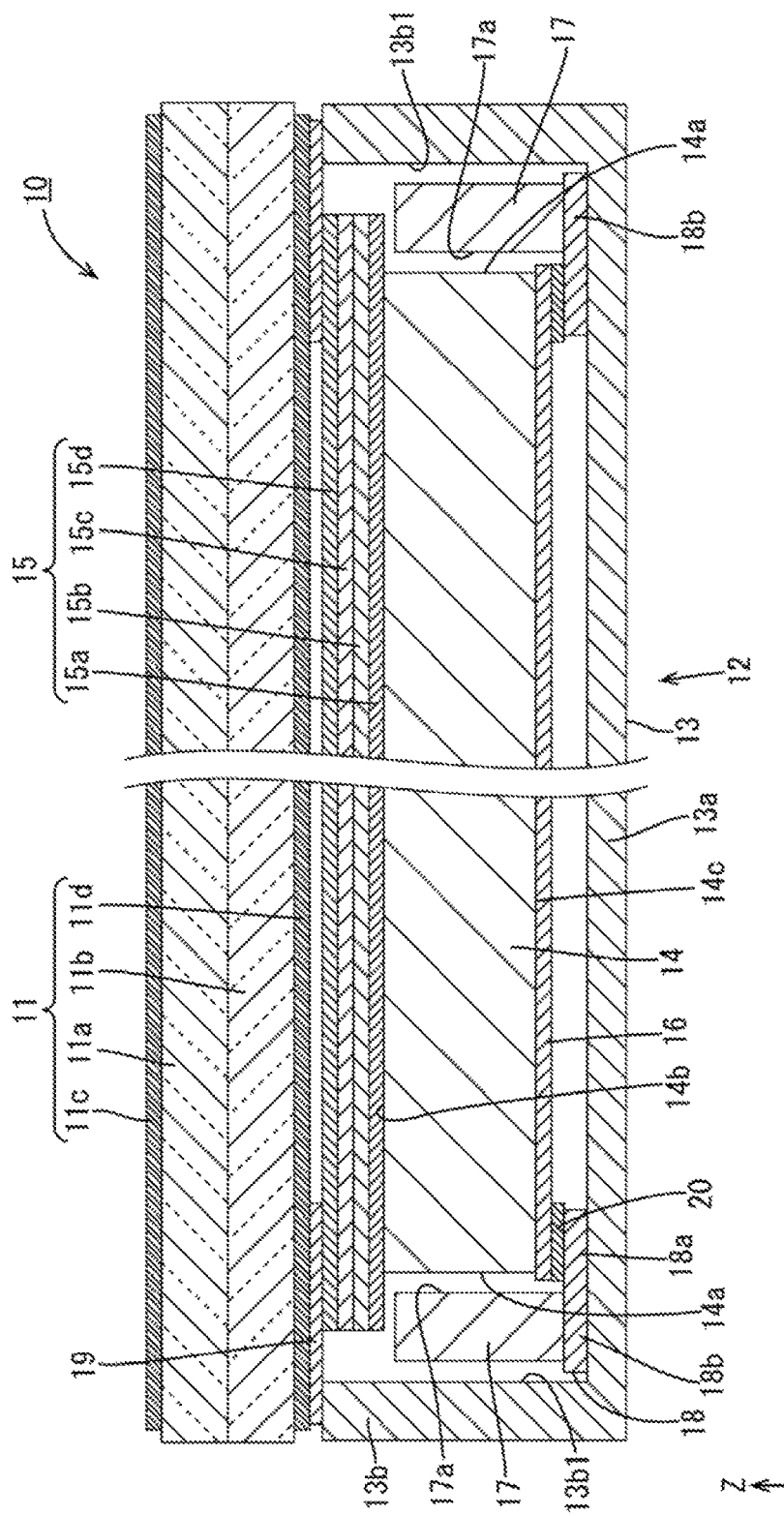
FIG. 3 is a cross-sectional view taken along line iii-iii in FIG. 2.
Figure 4:
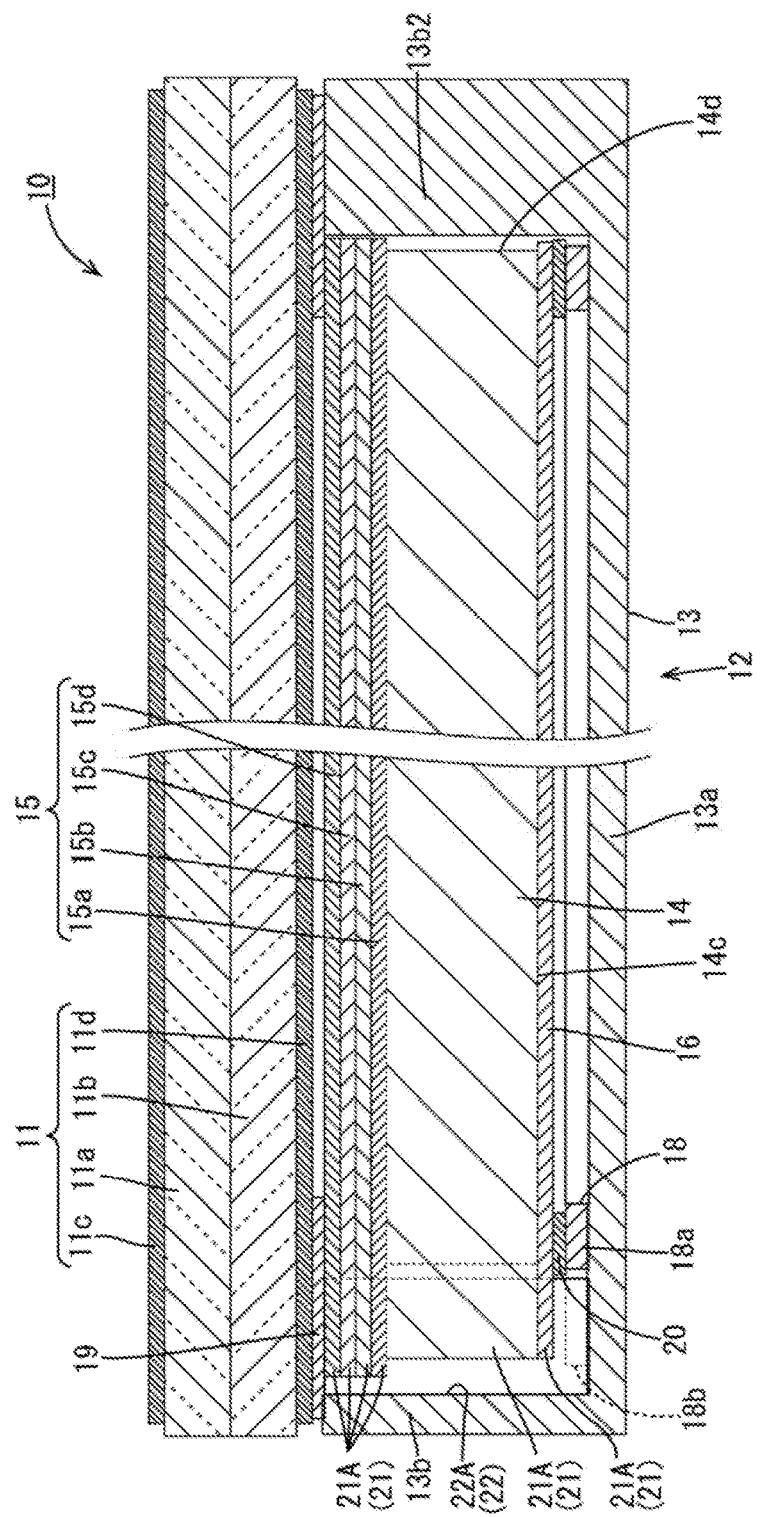
FIG. 4 is a cross-sectional view taken along line iv-iv in FIG. 2.

Embodiment 1 of the present invention will be described in reference to FIGS. 1 to 6. The present embodiment gives, as an example of a display panel, a liquid crystal display (display device) 10 including a liquid crystal panel 11. Some of the figures indicate an X axis, a Y axis, and a Z axis and are drawn to match these axes. FIGS. 3 and 4 provide a reference for the vertical (up/down) directions. The top ends of these figures indicate the "front side" whilst the bottom ends thereof indicate the "back side."

The liquid crystal display 10 is substantially circular as a whole. As shown in FIG. 1, the liquid crystal display 10 includes at least the liquid crystal panel (display panel) 11 capable of displaying images and a backlight device (illumination device) 12 disposed on the back side of the liquid crystal panel 11 to cast light onto the liquid crystal panel 11 to produce a display. The liquid crystal display 10 may further include a bezel (not shown) between the liquid crystal panel and the backlight device 12 to hold an outer circumference portion of the liquid crystal panel 11. The liquid crystal display 10 in accordance with the present embodiment is preferably used, for example, in various electronic apparatus (not shown) such as mobile phones (including smart phones), notebook computers (including tablet computers), mobile information terminals (including electronic books and PDAs), digital photo frames, and mobile gaming devices. Applications of the liquid crystal display 10 are however not necessarily limited in any manner to these examples. The liquid crystal panel 11 in the liquid crystal display 10 in accordance with the present embodiment preferably has a screen size of, for example, a few inches to about a dozen inches, corresponding generally to small to medium-small panels. The screen size of the liquid crystal panel 11 is however not necessarily limited in any manner to these particular dimensions.

First, the liquid crystal panel 11 will be described in detail. The liquid crystal panel 11, as shown in FIG. 1, is substantially circular when viewed as a whole in plan view. The liquid crystal panel 11, as shown in FIG. 3, includes a pair of glass substrates 11a and 11b and a liquid crystal layer (not shown). The substrates 11a and 11b are substantially transparent and exhibit excellent translucency. The liquid crystal layer is interposed between the substrates 11a and 11b and contains liquid crystal molecules which are a substance having optical characteristics that can change upon application of an electric field. The substrates 11a and 11b are joined together by a sealant (not shown) with a gap being maintained therebetween with the same thickness as the liquid crystal layer. The liquid crystal panel 11 has a display area (active area) and a non-display area (non-active area). The display area is substantially circular and occupies the central part of the screen to display images. The non-display area is shaped like a substantially circular ring (substantially circular frame or doughnut) encircling the display area and occupies the peripheral part of the screen. The non-display area displays no images. The liquid crystal panel 11 is capable of displaying images in the display area by utilizing light supplied by the backlight device 12. Light exits the liquid crystal panel 11 through the front side thereof which is a light-exiting side. The substrates 11a and 11b are provided with polarizer plates 11c and 11d on the respective external faces thereof.

One of the substrates 11a and 11b in the liquid crystal panel 11 that is provided on the front side (surface face) forms a CF substrate 11a whilst the other one that is provided on the back side (back face) forms an array substrate 11b. The array substrate 11b partially projects out of the periphery of the CF substrate 11a. On the projection is there provided a terminal unit (not shown) connected to a flexible substrate (not shown) that feeds various signals to the liquid crystal panel 11. The internal face of the array substrate 11b (the face facing the liquid crystal layer and the CF substrate 11a) has thereon a matrix of numerous pixel electrodes and TFTs (thin film transistors) as switching elements. A lattice of gate lines and source lines is provided around each of these TFTs and pixel electrodes. The gate lines and source lines are fed with image-related signals by respective drivers (not shown). The pixel electrodes, disposed in square-shaped areas surrounded by the gate lines and source lines, include, for example, transparent ITO (indium tin oxide) or ZnO (zinc oxide) electrodes. In contrast, the internal face of the CF substrate 11a has thereon a matrix of numerous color filters arranged in locations corresponding to those of the pixels. The color filters come in three colors, R, G, and B. The color filters of these colors are arranged repeatedly. A light-blocking layer (black matrix) is formed between the color filters to prevent the colors from mixing. On the surfaces of the color filters and the light-blocking layer are there provided counter electrodes facing the pixel electrodes on the array substrate 11b. The substrates 11a and 11b have formed on the respective internal faces thereof alignment films (not shown) for orienting the liquid crystal molecules in the liquid crystal layer.

Next, the configuration of the backlight device 12 will be described in detail. Similarly to the liquid crystal panel 11, the backlight device 12 as a whole is shaped substantially like a block that is substantially circular in plan view. The backlight device 12, as shown in FIGS. 1 to 3, includes at least a chassis (lamination member, housing) 13, a plurality of LEDs (light-emitting diodes) 17, an LED substrate (light source substrate) 18, a light guide plate (optical member) 14, a plurality of optical sheets (optical members) 15, and a reflective sheet (optical member) 16. The chassis 13 is shaped substantially like a box with an opening facing the liquid crystal panel 11. The LEDs 17 serve as light sources. The LED substrate 18 has the LEDs 17 mounted thereon. The light guide plate 14 is disposed to overlap the front side of the chassis 13 to guide light emitted by the LEDs 17. The optical sheets 15 are disposed to overlap the front side (light-exiting side) of the light guide plate 14 to perform an optical operation on light exiting the light guide plate 14 before casting the light onto the liquid crystal panel 11. The reflective sheet 16 is interposed between the chassis 13 and the light guide plate 14 to reflect light toward the light guide plate 14. In the present embodiment, the light guide plate 14, the optical sheets 15, and the reflective sheet 16 form a "combination of optical members" whilst the chassis 13 forms a "lamination member" disposed on the combination of optical members. The backlight device 12 converts the light emitted by the LEDs 17 into area light by means of the optical operation performed by the light guide plate 14, the optical sheets 15, and the reflective sheet 16 ("combination of optical members") before casting that light onto the liquid crystal panel 11 (which is placed on the front side of the backlight device 12) through the opening of the chassis 13. In other words, the front side of the backlight device 12 forms the light-exiting side. The following will describe structural components of the backlight device 12. The Z-axis direction shown in the drawings coincides with the direction of the normal to the faces of the light guide plate 14, the optical sheets 15, and the reflective sheet 16 ("combination of optical members") and also with the direction in which the chassis 13 ("lamination member") overlaps the light guide plate 14, the optical sheets 15, and the reflective sheet 16 ("combination of optical members").

The chassis 13, composed of a synthetic resin, is substantially circular in plan view and shaped substantially like a box (bottomed, substantially cylindrical shape) with an opening facing the front side, as shown in FIGS. 1 to 3, so that the chassis 13 can contain inside thereof, for example, the LED substrate 18, the light guide plate 14, the optical sheets 15, and the reflective sheet 16. Similarly to, for example, the liquid crystal panel 11, the chassis 13 is substantially circular when viewed as a whole in plan view (when viewed in the Z-axis direction in which the chassis 13 overlaps, for example, the light guide plate 14 (combination of optical members)). The chassis 13 includes a substantially circular bottom wall portion 13a and a sidewall portion 13b that rises from the outer circumference portion of the bottom wall portion 13a toward the front side. The bottom wall portion 13a has a face parallel to the faces of the light guide plate 14, the optical sheets 15, the reflective sheet 16, and the liquid crystal panel 11 and gives backside support to the light guide plate 14, the optical sheets 15, and the reflective sheet 16 contained inside the chassis 13. In other words, the bottom wall portion 13a is an "optical-member-supporting portion" that supports the "combination of optical members." The sidewall portion 13b as a whole is shaped substantially like a circular ring (substantially circular frame) and disposed to encircle the light guide plate 14, the optical sheets 15, and the reflective sheet 16 contained inside the chassis 13. The sidewall portion 13b has LED-containing concave portions (light-source-containing concave portions) 13b1 that contain the LEDs 17 therein. The LED-containing concave portions 13b1 are formed by denting parts of the inner circumferential surface of the sidewall portion 13b and arranged at intervals in terms of the circumferential direction of the sidewall portion 13b to align with the LEDs 17 on the LED substrate 18 which will be described later in detail. Therefore, the sidewall portion 13b is formed with a relatively small thickness where the LEDs 17 are disposed, that is, where the LED-containing concave portions 13b1 are provided, in terms of the circumferential direction of the sidewall portion 13b (see FIGS. 2 and 3) and formed with a relatively large thickness where no LEDs 17 are disposed, that is, where no LED-containing concave portions 13b1 are provided (non-forming parts 13b2 (parts between those LEDs 17 which are adjacent in the circumferential direction)) (see FIGS. 2 and 4). The sidewall portion 13b has a top end onto which the back face of an outer circumference portion of a panel securing tape 19 is securely attached to fix the liquid crystal panel 11 to the backlight device 12. The panel securing tape 19 is a double-sided tape in which both sides of a base material are rendered adhesive. The panel securing tape 19 is securely attached to the sidewall portion 13b, the optical sheets 15 (detailed later), and the liquid crystal panel 11 in such a manner as to straddle the sidewall portion 13b and the optical sheets 15.

The LEDs 17 are configured as an LED chip (LED element), which is a light-emitting semiconductor device, sealed with a resin material on a substrate portion securely attached to the face of the LED substrate 18 as shown in FIGS. 1 to 3. The LED chip mounted on the substrate portion has a single main emission wavelength, specifically, a blue wavelength (monochromatic emission). On the other hand, the resin material with which the LED chip is sealed is a blend containing, dispersed therein, fluorescent substances that emit light of predetermined colors (e.g., yellow, green, and red) when excited by the blue light emitted by the LED chip. Each LED 17 as a whole emits substantially white light. The LED 17 has a light-emitting surface 17*a* that is a side face adjacent to the face of the LED 17 on which the LED 17 is mounted on the LED substrate 18 ("side emitting type"). The LED 17 has an optical axis parallel to the normal to the light-emitting surface 17*a*. The "optical axis" here refers to the direction in which light emitted by the LED 17 (light distribution) exhibits the highest emission intensity.

As shown in FIGS. 1 to 3, the LED substrate 18 is provided in the form of a flexible film or sheet composed of an insulating material. The LED substrate 18 has a surface parallel to, for example, the surface of the bottom wall portion 13*a* of the chassis 13. The LED substrate 18 includes a base portion 18*a*, a plurality of LED-mounting portions 18*b*, and a drawn-out portion 18*c*. The base portion 18*a* is shaped substantially like a circular ring extending in the circumferential direction of the light guide plate 14, the optical sheets 15, and the reflective sheet 16. The LED-mounting portions 18*b* project radially out of parts of the base portion 18*a* so that the LEDs 17 can be mounted on the respective LED-mounting portions 18*b*. The drawn-out portion 18*c* is drawn out of a part of the base portion 18*a*. The base portion 18*a*, shaped substantially like a circular ring, has an inner diameter that is shorter than the outer diameter of the light guide plate 14 and the reflective sheet 16 and an outer diameter that is approximately equal to the outer diameter of the light guide plate 14 and the reflective sheet 16. The base portion 18*a* is disposed to overlap the back sides of the outer circumference portions of the light guide plate 14 and the reflective sheet 16. The base portion 18*a* is securely attached, via an LED-substrate-securing tape 20, to the reflective sheet 16 overlapping the front side of the base portion 18*a*. The LED-substrate-securing tape 20 is a double-sided tape in which both sides of a base material are rendered adhesive. The base portion 18*a* has formed thereon a wiring pattern (not shown) for feeding power to the LEDs 17 mounted on the LED-mounting portions 18*b*.

As shown in FIGS. 1 and 2, the LED-mounting portions 18*b* each have one of the LEDs 17 surface-mounted on a face thereof facing the front side and have a profile that, as viewed in plan view, is substantially similar to the profile of the LED 17 as viewed in plan view. The LED-mounting portions 18*b* are arranged at intervals in terms of the circumferential direction of the base portion 18*a*. Specifically, the LED-mounting portions 18*b* are arranged at equal angular intervals (at equal angles) on the base portion 18*a*. More specifically, the LED-mounting portions 18*b* (12 of them) are arranged at 30° angular intervals in terms of the circumferential direction. Therefore, the LEDs 17 mounted on the LED-mounting portions 18*b* are arranged point-symmetrically with respect to the center of the base portion 18*a*, and the light-emitting surfaces 17*a* of those LEDs 17 which are positioned 180° apart are opposite from each other across the light guide plate 14. The light-emitting surfaces 17*a* of all the LEDs 17 face the center of the light guide plate 14. The interval between those LEDs 17 which are adjacent in the circumferential direction of the base portion 18*a* is greater than the width of the LEDs 17. The wiring pattern on the base portion 18*a* extends to the LED-mounting portions 18*b* so that the extension can be connected to terminals (not shown) of the LEDs 17. The LEDs 17, arranged in a ring along the periphery of the base portion 18*a*, are thus connected in series with each other by the wiring pattern on the base portion 18*a*. The drawn-out portion 18*c* is provided on a part of the base portion 18*a* between a predetermined pair of those two of the LED-mounting portions 18*b* which are adjacent in the circumferential direction and extends substantially straightly. The wiring pattern on the base portion 18*a* extends to the drawn-out portion 18*c*. This extension runs in the extension direction of the drawn-out portion 18*c* and has far ends where terminals (not shown) are exposed. The drawn-out portion 18*c* is drawn out of the backlight device 12 through a notch 13*b*3 formed in a part of the sidewall portion 13*b* of the chassis 13. The drawn-out portion 18*c* passed through the notch 13*b*3 is folded onto the back side of the chassis 13 so that the terminals can be connected to power feeder connectors on the LED-driving circuit substrate (not shown) disposed on the back side of the chassis 13.

Figure 6:
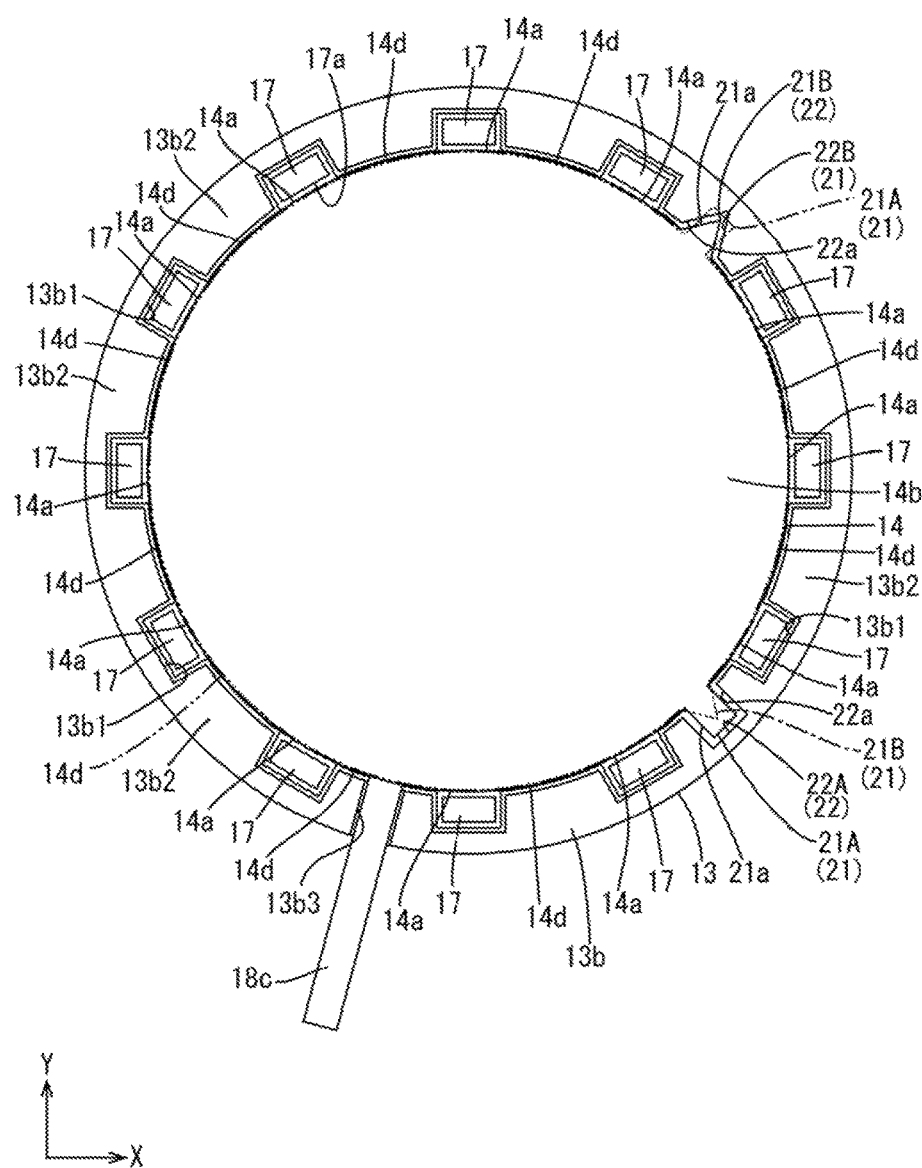
FIG. 6 is a plan view of a light guide plate inside the chassis.

As shown in FIGS. 1, 3, and 6, similarly to the bottom wall portion 13*a* of the chassis 13, the light guide plate 14 is substantially circular as viewed in plan view (as viewed in the Z-axis direction in which the chassis 13 overlaps, for example, the light guide plate 14 (combination of optical members). The light guide plate 14 has an outer diameter that is slightly shorter than the bottom wall portion 13*a* of the chassis 13. The light guide plate 14 is contained inside the chassis 13 in such a manner that the sidewall portion 13*b* can encircle the light guide plate 14 and disposed right below the liquid crystal panel 11 and the optical sheets 15. The light guide plate 14 has an outer circumference end face thereof divided into LED-facing portions (light-source-facing portions) that face the LEDs 17 and non-LED-facing portions (non-light-source-facing portions) that do not face the LEDs 17. Among these, the LED-facing portions form light-incident faces 14*a* that are directly struck by the light emitted by the LEDs 17. On the other hand, the non-LED-facing portions form non-light-incident faces 14*d* that are hardly directly struck by the light emitted by the LEDs 17. On the outer circumference end face of the light guide plate 14, one light-incident face 14*a* and one non-light-incident face 14*d* are arranged alternately along the circumference of the light guide plate 14 so that the light-incident faces 14*a* and the non-light-incident faces 14*d* are arranged at equal angular intervals of approximately 30°. The light-incident faces 14*a* are each formed on a segment of the outer circumference end face of the light guide plate 14, the segment having approximately the same circumferential width as the associated LED 17 and being circumferentially narrower than the segment of the outer circumference end face on which the non-light-incident face 14*d* is formed. In the present embodiment, the non-LED-facing portions are described as forming the "non-light-incident faces 14*d*," which does not necessarily indicate that no light is incident to the non-LED-facing portions. For example, if light leaking through the non-light-incident face 14*d* returns after being reflected off the sidewall portion 13*b*, the returning light may be incident on the non-light-incident face 14*d*.

Of the front and back faces of the light guide plate 14, the face facing the front side (facing the liquid crystal panel 11) forms a light-exiting face 14*b* through which light exits toward the liquid crystal panel 11. Meanwhile, the face, of the light guide plate 14, facing the back side (facing the reflective sheet 16, facing the bottom wall portion 13*a*) forms an opposing face (reflection-side face) 14*c* that is opposite from the light-exiting face 14*b*. In this configuration, the direction in which the LEDs 17 and the light guide plate 14 are arranged is perpendicular to the direction in which the optical sheets 15 (liquid crystal panel 11) and the light guide plate 14 are arranged. The light guide plate 14 receives the light emitted by the LEDs 17 through the light-incident faces 14*a* and then guides that light upward toward the optical sheets 15 (front side, light-exiting side)

while the light is propagating therein so that the light can exit the light guide plate 14 through the light-exiting face 14b (front face). The opposing face 14c of the light guide plate 14 has formed thereon a light reflecting pattern (not shown) constituted by a light reflecting section to promote the exiting of light inside the light guide plate 14 through the light-exiting face 14b by reflecting the light toward the light-exiting face 14b. The light reflecting section constituting the light reflecting pattern is composed of numerous light reflection dots the distribution density of which is variable in accordance with distance from the light-incident faces 14a (the LEDs 17). Specifically, in the radial direction of the light guide plate 14, the distribution density of the light reflection dots constituting the light reflecting section increases with increasing distance from the light-incident faces 14a and decreases with decreasing distance to the light-incident faces 14a, thereby reaching the highest value at the center of the light guide plate 14 and the lowest value on the outer circumference of the light guide plate 14. Meanwhile, in the circumferential direction of the light guide plate 14, the distribution density of the light reflection dots reaches the highest value at the center of each non-light-incident face 14d of the light guide plate 14 (midpoint between those light-incident faces 14a which are adjacent) and the lowest value at the center of each light-incident face 14a (midpoint between those non-light-incident faces 14d which are adjacent, on the perpendicular to the light-emitting surface 17a of the LEDs 17). The optical design of the light reflecting pattern is optimized in this manner so that the light emitted by the light-exiting face 14b of the light guide plate 14 can exhibit good luminance uniformity.

Similarly to the light guide plate 14, the optical sheets 15 is substantially circular as viewed in plan view (as viewed in the Z-axis direction in which the chassis 13 overlaps, for example, the light guide plate 14 (combination of optical members)) and has a slightly longer outer diameter than the light guide plate 14 as shown in FIGS. 1 and 3. The optical sheets 15 are placed between the liquid crystal panel 11 and the light guide plate 14 on the front side of the light-exiting face 14b of the light guide plate 14 to transmit the light emitted by the light guide plate 14 for emission in the direction of the liquid crystal panel 11 while performing a predetermined optical operation on the light during transmission. The optical sheets 15 in accordance with the present embodiment include four sheets: a diffusion sheet 15a, two lens sheets 15b and 15c (a first lens sheet 15b and a second lens sheet 15c), and a reflective polarizer sheet 15d. The diffusion sheet 15a includes numerous light-diffusing diffusion particles blended with, and dispersed in, a substantially transparent synthetic resin base material. The diffusion sheet 15a is disposed to exactly overlap the light guide plate 14 and located closer to the light guide plate 14 than the other optical sheets 15.

The two lens sheets 15b and 15c include numerous unit lenses on one of the faces of a substantially transparent synthetic resin base member as shown in FIGS. 1 and 3. One of these two lens sheets 15b and 15c that is disposed to exactly overlap the diffusion sheet 15a forms the first lens sheet 15b, and the other one that is disposed to exactly overlap the first lens sheet 15b and located closest to the liquid crystal panel 11 forms the second lens sheet 15c. The first lens sheet 15b includes numerous unit lenses each extending in a first direction parallel to a face of the first lens sheet 15b and arranged in a second direction perpendicular to the first direction so that the first lens sheet 15b can perform a light conversion operation (anisotropic light conversion operation) on exiting light selectively in the second direction in which the unit lenses are arranged. The second lens sheet 15c includes numerous unit lenses each extending in the second direction parallel to a face of the second lens sheet 15c and arranged in the first direction perpendicular to the second direction so that the second lens sheet 15c can perform a light conversion operation on exiting light selectively in the first direction in which the unit lenses are arranged. In the first lens sheet 15b and the second lens sheet 15c, the extension direction is perpendicular to the arrangement direction in this manner. Also, in the first lens sheet 15b and the second lens sheet 15c, the unit lenses have equal apex angles, heights, and array pitches. The X-axis direction in each figure coincides with the extension direction (first direction) of the unit lenses in the first lens sheet 15b whilst the Y-axis direction coincides with the extension direction (second direction) of the unit lenses in the second lens sheet 15c. Particularly, in FIG. 1, the unit lenses in the lens sheets 15b and 15c are indicated by stripes parallel to either the X-axis direction or the Y-axis direction.

Referring to FIGS. 1 and 3, the reflective polarizer sheet 15d has a multilayer structure including, for example, alternately stacked layers having different refractive indices so that the reflective polarizer sheet 15d can transmit one of polarized rays of light exiting from the light guide plate 14 and reflect the other polarized ray of light in the direction of the light guide plate 14. The polarized ray of light reflected by the reflective polarizer sheet 15d is reflected again in the direction of the front side by, for example, the reflective sheet 16 (which will be described later in detail). Upon this second reflection, the polarized ray of light is depolarized. In this manner, the provision of the reflective polarizer sheet 15d enables the polarized ray of light that would otherwise be absorbed by the polarizer plates 11c and 11d of the liquid crystal panel 11 to be reflected in the direction of the light guide plate 14 for reuse, thereby increasing light use efficiency (and in turn luminance). The reflective polarizing axis of the reflective polarizer sheet 15d coincides with the extension direction of the unit lenses in the first lens sheet 15b (first direction, X-axis direction). The back face of the panel securing tape 19 is securely attached onto the outer circumference portion of the reflective polarizer sheet 15d.

Referring to FIGS. 1 and 3, the reflective sheet 16 is arranged to cover the back side of the light guide plate 14, i.e., the opposing face 14c located opposite from the light-exiting face 14b. The reflective sheet 16 is composed of a synthetic resin sheet material with a white surface that exhibits excellent light reflectivity. Therefore, the reflective sheet 16 is capable of efficiently guiding upward in the direction of the front side (light-exiting face 14b) the light exiting from the opposing face 14c after propagation in the light guide plate 14. Similarly to the light guide plate 14 and the optical sheets 15, the reflective sheet 16 is substantially circular as viewed in plan view (as viewed in the Z-axis direction in which the chassis 13 overlaps, for example, the light guide plate 14 (combination of optical members)) and has a slightly longer outer diameter than the light guide plate 14. The reflective sheet 16 has most of the central part thereof flanked by the light guide plate 14 and the bottom wall portion 13a of the chassis 13. The reflective sheet 16 has an outer circumference portion slightly projecting out of the outer circumference end face of the light guide plate 14. Especially, those segments of the reflective sheet 16 which project relative to the light-incident faces 14a toward the LEDs 17 are capable of efficiently reflecting light coming from the LEDs 17 so that the light can be incident on the light-incident faces 14a.

As mentioned earlier, since the light guide plate 14 has a substantially circular profile, the light guide plate 14 is easily displaced on the circumferential direction thereof when the light guide plate 14 is assembled in the chassis 13 during manufacture or when the liquid crystal display 10 and the backlight device 12 are subjected to vibration or impact during transport or use after manufacture. When the light guide plate 14 is displaced in this manner, the light-incident faces 14a of the light guide plate 14 move out of the correct positional relationship with the LEDs 17, therefore possibly developing problems including failure to exhibit desired optical performance or abrasion and scratching due to friction with, for example, the optical sheets 15, the reflective sheet 16, and the chassis 13. Likewise, since the optical sheets 15 and the reflective sheet 16 have a substantially circular profile, the optical sheets 15 and the reflective sheet 16, when displaced in the circumferential direction thereof, can possibly develop problems including abrasion and scratching due to friction with, for example, the other optical sheets 15, the light guide plate 14, and the chassis 13.

Accordingly, in the present embodiment, the light guide plate 14, the optical sheets 15, and the reflective sheet 16 ("combination of optical members") and the chassis 13 ("lamination member") each have contact faces 21a and 22a that come into contact with each other in the circumferential direction of the light guide plate 14, the optical sheets 15, and the reflective sheet 16 as shown in FIGS. 1 and 2. These contact faces 21a and 22a provide positioning structures (convex positioning portions 21 and concave positioning portions 22 which will be described later in detail) that position the light guide plate 14, the optical sheets 15, and the reflective sheet 16 relative to the chassis 13 in the circumferential direction. The positioning structures determine the locations of the light guide plate 14, the optical sheets 15, and the reflective sheet 16 relative to the chassis 13 in the circumferential direction of the light guide plate 14, the optical sheets 15, and the reflective sheet 16 when the chassis 13, the light guide plate 14, the optical sheets 15, and the reflective sheet 16 are disposed to overlap each other. In addition, the positioning structures render the light guide plate 14, the optical sheets 15, and the reflective sheet 16 less likely to be displaced relative to the chassis 13 in the circumferential direction of the light guide plate 14, the optical sheets 15, and the reflective sheet 16 when the liquid crystal display 10 and the backlight device 12 are subjected to vibration or impact. Hence, in the light guide plate 14, the positional relationship of the light-incident faces 14a and the LEDs 17 in the circumferential direction is maintained in the desirable original form in which the light-incident faces 14a and the LEDs 17 are opposite from each other. That in turn enables the light guide plate 14 to exhibit appropriate optical performance by which the light emitted by the LEDs 17 is guided, also renders the light guide plate 14 less likely to be subjected to abrasion and scratching that could otherwise be caused by friction with, for example, the optical sheets 15, the reflective sheet 16, and the chassis 13, and additionally renders the optical sheets 15 and the reflective sheet 16 less likely to be subjected to abrasion and scratching that could otherwise be caused by friction with, for example, the other optical sheets 15, the light guide plate 14, and the chassis 13.

More specifically, referring to FIGS. 1, 2, and 4, the positioning structures include the convex positioning portions (optical-member-side positioning portions) 21 and the concave positioning portions (lamination-member-side positioning portions, housing-side positioning portions) 22. The convex positioning portions 21 are provided on the light guide plate 14, the optical sheets 15, and the reflective sheet 16. The concave positioning portions 22 are provided on the sidewall portion 13b of the chassis 13 for engagement with the convex positioning portions 21. The convex positioning portions 21 are provided so as to extend radially (in the direction moving away from the center) out of parts of the outer circumferential surfaces of the light guide plate 14, the optical sheets 15, and the reflective sheet 16. The concave positioning portions 22 are provided by denting parts of the inner circumferential surface of the sidewall portion 13b of the chassis 13. The faces of the engaging convex positioning portions 21 and concave positioning portions 22 that face each other in the circumferential direction, for example, of the light guide plate 14 provide the contact faces 21a and 22a that contact each other. The convex positioning portions 21 and the concave positioning portions 22 are each arranged between those LEDs 17 which are adjacent in the circumferential direction.

More particularly, the convex positioning portion 21 of the light guide plate 14 is provided selectively on a specific one of the non-light-incident faces 14d on the outer circumference end face of the light guide plate 14 as shown in FIG. 6 and disposed in the circumferential middle portion of that non-light-incident face 14d. The convex positioning portions 21 of the optical sheets 15 and the reflective sheet 16 are, as shown in FIG. 2, provided on parts of the respective outer circumferential surfaces thereof that overlap the convex positioning portion 21 of the light guide plate 14. Particularly, the convex positioning portion 21 of the first lens sheet 15b, which is one of the optical sheets 15, is disposed so that the extension direction of the unit lenses in the first lens sheet 15b coincides with the X-axis direction when the convex positioning portion 21 is engaged with one of the concave positioning portions 22. Similarly, the convex positioning portion 21 of the second lens sheet 15c is disposed so that the extension direction of the unit lenses in the second lens sheet 15c coincides with the Y-axis direction when the convex positioning portion 21 is engaged with one of the concave positioning portions 22. The concave positioning portions 22 are each arranged on a part of the sidewall portion 13b that is between those LED-containing concave portions 13b1 (intermediate locations) which are adjacent in the circumferential direction of the sidewall portion 13b and have a concave depth that is equal to that of the LED-containing concave portions 13b1. Therefore, the sidewall portion 13b has the same thickness in those circumferential parts of the sidewall portion 13b where the concave positioning portions 22 are formed and in those circumferential parts of the sidewall portion 13b where the LED-containing concave portions 13b1 are formed.

The backlight device 12 in accordance with the present embodiment has two types of positioning structures as shown in FIGS. 1 and 2: the convex positioning portions 21 and the concave positioning portions 22. The two positioning structures differ in shape and size from each other as viewed in plan view and are provided in locations that are not point-symmetric with respect to the center of the light guide plate 14, the optical sheets 15, and the reflective sheet 16. In other words, the two positioning structures, differing in shape and size from each other as viewed in plan view, are arranged at angular intervals of other than 180°, specifically, approximately 90°. In this configuration, if the light guide plate 14, the optical sheets 15, or the reflective sheet 16 is/are to be mounted into the chassis 13 in the flipped, incorrect position with the front and back thereof reversed, either of the two positioning structures fails to fit, interrupting the assembling and thereby preventing the assembling in reverse position. Three of the LEDs 17 are interposed between the two positioning structures in the circumferential direction. A first one of the two positioning structures includes a first convex positioning portion 21A and a first concave positioning portion 22A whilst a second one includes a second convex positioning portion 21B that differs in shape and size from the first convex positioning portion 21A as viewed in plan view and a second concave positioning portion 22B that differs in shape and size from the first concave positioning portion 22A as viewed in plan view. Note that throughout the following description, whether each of the convex positioning portions 21 and the concave positioning portions 22 constituting the two positioning structures is a first positioning structure or a second positioning structure will be indicated, where necessary, by adding a suffix "A" to the reference number thereof if it is a first positioning structure and adding a suffix "B" to the reference number thereof if it is a second positioning structure. Where there is no such need, the convex positioning portions 21 and the concave positioning portions 22 will be collectively denoted without adding a suffix to the reference numbers thereof.

As shown in FIG. 2, the first convex positioning portion 21A and the first concave positioning portion 22A, which make up the first positioning structures, are each symmetric and substantially quadrilateral as viewed in plan view and have a dimension in the circumferential direction of the light guide plate 14, the optical sheets 15, and the reflective sheet 16, the dimension being constant across the radius. The first convex positioning portions 21A and the first concave positioning portions 22A each have an outer circumferential surface constituted by a pair of faces that are parallel to the radial direction of the light guide plate 14, the optical sheets 15, and the reflective sheet 16 and also by a face that is parallel to the circumferential direction thereof. That pair of faces forms the contact faces 21a and 22a. Meanwhile, the second convex positioning portion 21B and the second concave positioning portion 22B, which make up the second positioning structures, are each symmetric and substantially triangular in shape as viewed in plan view and have a dimension in the circumferential direction of the light guide plate 14, the optical sheets 15, and the reflective sheet 16, the dimension becoming gradually smaller outward in the radial direction. The second convex positioning portions 21B and the second concave positioning portions 22B each have an outer circumferential surface constituted by a pair of faces that are inclined in both the radial and circumferential directions of the light guide plate 14, the optical sheets 15, and the reflective sheet 16. That pair of faces forms the contact faces 21a and 22a. In addition, the dimension of the second convex positioning portion 21B and the second concave positioning portion 22B in the radial direction of the light guide plate 14, the optical sheets 15, and the reflective sheet 16 is slightly smaller than the corresponding dimension of the first convex positioning portion 21A and the first concave positioning portion 22A. Meanwhile, the dimension of the second convex positioning portion 21B and the second concave positioning portion 22B in the circumferential direction of the light guide plate 14, the optical sheets 15, and the reflective sheet 16, i.e., the bottom of the second convex positioning portion 21B and the second concave positioning portion 22B, is slightly larger than the corresponding dimension of the first convex positioning portion 21A and the first concave positioning portion 22A. The second convex positioning portion 21B and the second concave positioning portion 22B, being substantially triangular in shape as viewed in plan view, are smaller in area as viewed in plan view than the first convex positioning portion 21A and the first concave positioning portion 22A which are substantially quadrilateral as viewed in plan view. Therefore, if the light guide plate 14, the optical sheets 15, and the reflective sheet 16 are to be assembled into the chassis 13 in the flipped, incorrect position with the front and back thereof reversed, the relatively small second convex positioning portion 21B can be inserted into the relatively large first concave positioning portion 22A, but the relatively large first convex positioning portion 21A cannot be inserted into the relatively small second concave positioning portion 22B and moves onto the edge portion of the second concave positioning portion 22B. This first convex positioning portion 21A remaining on the edge portion can trigger detection of the assembling in reverse position.

The liquid crystal display 10 in accordance with the present embodiment has the aforementioned structure and can be manufactured by the process detailed immediately below. Before manufacture of the liquid crystal display 10, the liquid crystal panel 11 and all the structural components of the backlight device 12 are manufactured in advance. The structural components of the backlight device 12 are assembled first in the assembling of the liquid crystal display 10. The LED substrate 18 is placed into the chassis 13 constituting a part of the backlight device 12, and then the reflective sheet 16, the light guide plate 14, and the optical sheets 15 ("combination of optical members") are placed in a predetermined sequence (FIG. 1).

Figure 5:
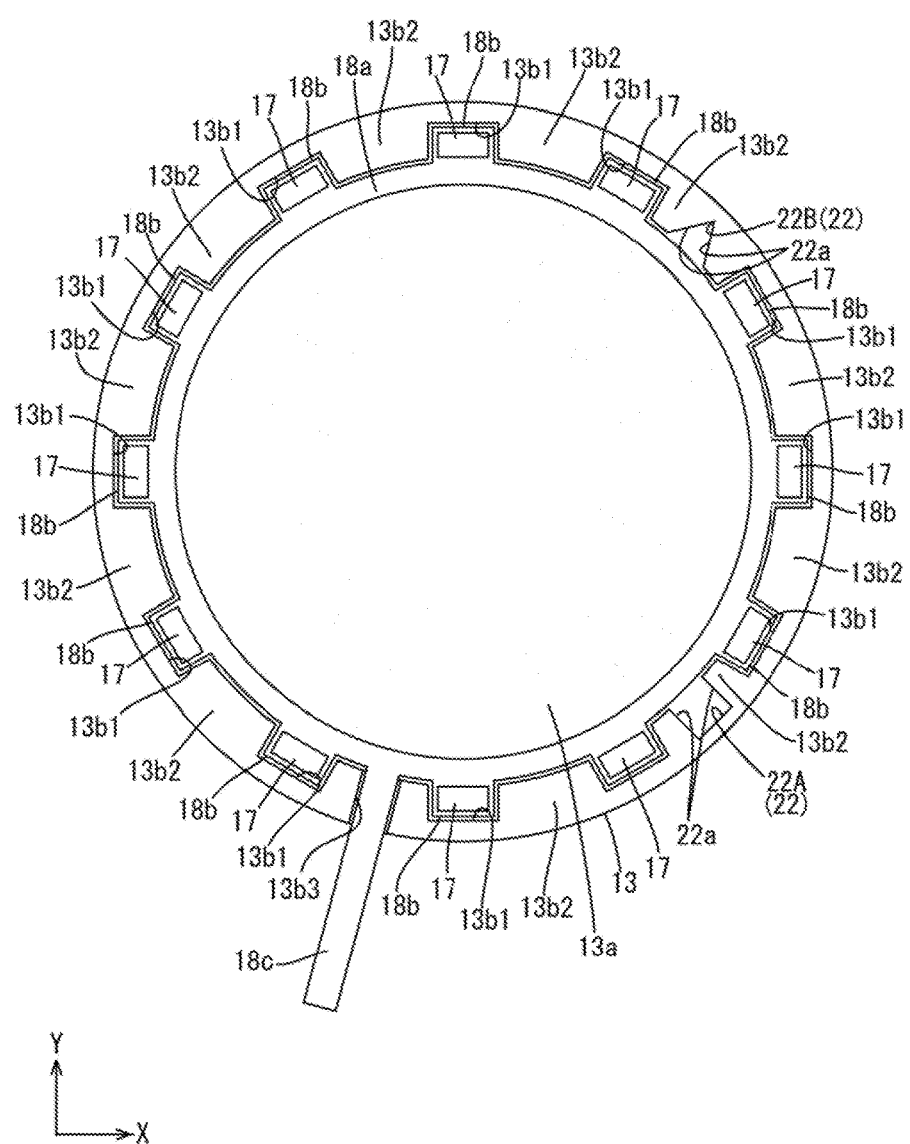
FIG. 5 is a plan view of an LED substrate inside a chassis.

More specifically, first, referring to FIG. 5, the LED substrate 18 is placed into the chassis 13. In this step, the LED substrate 18 is positioned in the circumferential direction of the base portion 18a so that the drawn-out portion 18c can be passed through the notch 13b3 in the sidewall portion 13b of the chassis 13. Next, the LED-substrate-securing tape 20 is securely attached onto the LED substrate 18. The LED-substrate-securing tape 20 may, before the LED substrate 18 is placed into the chassis 13, be securely attached onto the LED substrate 18 or onto the reflective sheet 16. Subsequently, the reflective sheet 16 is placed into the chassis 13. Specifically, if the reflective sheet 16 is in the correct position in terms of the front and back sides thereof, and each convex positioning portion 21 is aligned with the corresponding concave positioning portion 22 in the circumferential direction, the first convex positioning portion 21A is inserted into the first concave positioning portion 22A, and the second convex positioning portion 21B is inserted into the second concave positioning portion 22B, so that the reflective sheet 16 is placed smoothly into the chassis 13 and securely attached to the LED-substrate-securing tape 20. The LED substrate 18 is fixed to the reflective sheet 16 via the LED-substrate-securing tape 20.

Next, the light guide plate 14 is placed into the chassis 13. Specifically, referring to FIG. 6, if the light guide plate 14 is in the correct position in terms of the front and back sides thereof, and each convex positioning portion 21 is aligned with the corresponding concave positioning portion 22 in the circumferential direction, the first convex positioning portion 21A is inserted into the first concave positioning portion 22A, and the second convex positioning portion 21B is inserted into the second concave positioning portion 22B, so that the light guide plate 14 is placed smoothly into the chassis 13 and stacked on the front side of the reflective sheet 16. Thereafter, the optical sheets 15 are placed into the chassis 13. Specifically, if the optical sheets 15 are in the correct position in terms of the front and back sides thereof, and each convex positioning portion 21 is aligned with the corresponding concave positioning portion 22 in the circumferential direction, the first convex positioning portion 21A is inserted into the first concave positioning portion 22A, and the second convex positioning portion 21B is inserted into the second concave positioning portion 22B, so that the optical sheets 15 are placed smoothly into the chassis 13 and sequentially stacked on the front side of the light guide plate 14.

If the reflective sheet 16, the light guide plate 14, and the optical sheets 15 are in the flipped, incorrect position with the front and back thereof reversed when these members are placed into the chassis 13, the assembling of the members are interrupted as in the following. Namely, for example, if the light guide plate 14 is to be assembled in the flipped, incorrect position with the front and back thereof reversed, as indicated by a dash-double-dot line in FIG. 6, the second convex positioning portion 21B, which is relatively small in size as viewed in plan view, can be inserted into the first concave positioning portion 22A, which is relatively large in size as viewed in plan view, whereas the first convex positioning portion 21A, which is relatively large in size as viewed in plan view, cannot be inserted into the second concave positioning portion 22B, which is relatively small in size as viewed in plan view, and moves onto the edge portion of the second concave positioning portion 22B, thereby interrupting the assembling in reverse position. The optical sheets 15, similarly to the light guide plate 14, are also prevented from being assembled in the flipped position with the front and back thereof reversed as indicated by a dash-double-dot line in FIG. 2. The reflective sheet 16, similarly to the light guide plate 14 and the optical sheets 15, are also prevented from being assembled in the flipped position with the front and back thereof reversed (not shown). If any of the reflective sheet 16, the light guide plate 14, and the optical sheets 15 is/are prevented by the positioning structures from being assembled in this manner, that member/those members may be flipped back-to-front to the correct position before being subjected to the assembling process once again.

If the reflective sheet 16, the light guide plate 14, and the optical sheets 15 are assembled in the correct position in terms of the front and back thereof as shown in FIGS. 2, 5, and 6, the convex positioning portion 21 mates with the concave positioning portion 22, and the contact faces 21a and 22a, which face each other in the circumferential direction, contact each other, so that the reflective sheet 16, the light guide plate 14, and the optical sheets 15 are positioned in the circumferential direction of the chassis 13. This configuration renders the light guide plate 14, the optical sheets 15, and the reflective sheet 16 less likely to be subjected to abrasion and scratching that could otherwise be caused by friction with, for example, the overlapping, other optical sheets 15, light guide plate 14, and chassis 13 when the liquid crystal display 10 is subjected to vibration or impact after being manufactured. Especially, in the light guide plate 14, the light-incident faces 14a are positioned to face the LEDs 17 (i.e., aligned with the LEDs 17) in terms of the circumferential direction as shown in FIGS. 3 and 6 so that any part of the non-light-incident faces 14d is less likely to be positioned to face the LEDs 17. That in turn enables the light reflecting pattern to exhibit appropriate optical performance by which the light striking the light-incident faces 14a is reflected during propagation inside the light guide plate 14 for emission through the light-exiting face 14b. More specifically, the light reflecting pattern has a distribution density of light reflection dots therein specified in accordance with the positional relationship of the light reflection dots and the light-incident faces 14a as described earlier. Therefore, if the light-incident faces 14a and the LEDs 17 have an appropriate positional relationship in the circumferential direction, the light reflection dots constituting the light reflecting pattern exhibit an appropriate reflection intensity distribution, in other words, the light-exiting face 14b exhibits an appropriate emission intensity distribution. This in turn renders the light exiting from the light guide plate 14 less likely to develop non-uniform luminance.

As described above, the backlight device (illumination device) 12 of the present embodiment includes: the light guide plate 14, the optical sheets 15, and the reflective sheet 16 (combination of optical members), each having a substantially circular profile; the chassis 13 (lamination member) disposed to overlap the light guide plate 14, the optical sheets 15, and the reflective sheet 16 (combination of optical members); and the positioning structures provided on the light guide plate 14, the optical sheets 15, and the reflective sheet 16 (combination of optical members) and on the chassis 13 (lamination member) and having the contact faces 21a and 22a which come into contact with each other in the circumferential direction of the light guide plate 14, the optical sheets 15, and the reflective sheet 16 (combination of optical members) to position the light guide plate 14, the optical sheets 15, and the reflective sheet 16 (combination of optical members) relative to the chassis 13 (lamination member) in the circumferential direction.

In this configuration, the light guide plate 14, the optical sheets 15, and the reflective sheet 16 (combination of optical members) and the chassis 13 (lamination member) disposed to overlap the light guide plate 14, the optical sheets 15, and the reflective sheet 16 include the positioning structures having the contact faces 21a and 22a which come into contact with each other in the circumferential direction of the light guide plate 14, the optical sheets 15, and the reflective sheet 16 (combination of optical members). Therefore, when the light guide plate 14, the optical sheets 15, and the reflective sheet 16 (combination of optical members) are disposed to overlap the chassis 13 (lamination member), the light guide plate 14, the optical sheets 15, and the reflective sheet 16 (combination of optical members) are positioned relative to the chassis 13 (lamination member) in the circumferential direction of the light guide plate 14, the optical sheets 15, and the reflective sheet 16. The configuration renders the light guide plate 14, the optical sheets 15, and the reflective sheet 16 (combination of optical members) less likely to be displaced relative to the chassis 13 (lamination member) in the circumferential direction of the light guide plate 14, the optical sheets 15, and the reflective sheet 16 when, for example, the backlight device 12 is subjected to vibration or impact. This in turn enables, for example, the light guide plate 14, the optical sheets 15, and the reflective sheet 16 (combination of optical members) to exhibit appropriate optical performance and also renders the light guide plate 14, the optical sheets 15, and the reflective sheet 16 (combination of optical members) less likely to be subjected to abrasion and scratching that could otherwise be caused by friction with the chassis 13 (lamination member) and prevents other like displacement-caused inconveniences. Aligning the light guide plate 14, the optical sheets 15, and the reflective sheet 16 (combination of optical members) with the chassis 13 (lamination member) thus becomes easier. Hence, assembly-related time in the manufacturing process can be reduced, which is preferable for enhanced productivity.

The backlight device 12 includes the plurality of LEDs (light sources) 17 arranged at intervals along the circumference thereof. The positioning structures are arranged between those LEDs 17 which are adjacent in the circumferential direction. In this configuration, the positioning structures are less likely to obstruct light emitted by the LEDs 17. The light exiting from the backlight device 12 is hence less likely to have non-uniform luminance or develop other like problems.

The positioning structures come in at least two sizes as viewed in the direction in which the light guide plate 14, the optical sheets 15, and the reflective sheet 16 (combination of optical members) overlap the chassis 13 (lamination member). The positioning structures are arranged in locations that are not point-symmetric with respect to the center of the light guide plate 14, the optical sheets 15, and the reflective sheet 16 (combination of optical members). In this configuration, the light guide plate 14, the optical sheets 15, and the reflective sheet 16 (combination of optical members) are positioned relative to the chassis 13 (lamination member) in the circumferential direction. In addition, if the light guide plate 14, the optical sheets 15, and the reflective sheet 16 (combination of optical members) are to be disposed in the flipped, incorrect position on the chassis 13 (lamination member), at least one of the two positioning structures is out of alignment and interrupts the assembling, which can prevent the light guide plate 14, the optical sheets 15, and the reflective sheet 16 (combination of optical members) from being assembled in the flipped position.

The backlight device 12 includes the plurality of LEDs 17 arranged at intervals along the circumference thereof. Optical members include at least the light guide plate 14 that guides light emitted by the LEDs 17. Lamination members include at least the chassis (housing) 13 in which the LEDs 17 and the light guide plate 14 are contained. In this configuration, when the light guide plate 14 is to be placed into the chassis 13, the positioning structures position the light guide plate 14 relative to the chassis 13 in the circumferential direction of the light guide plate 14. Thus, the light guide plate 14 comes to have a stable positional relationship with the LEDs 17 in the circumferential direction. The light guide plate 14 can hence exhibit appropriate optical performance by which the light emitted by the LEDs 17 is guided. Additionally, the light guide plate 14 becomes less likely to be displaced relative to the chassis 13 in the circumferential direction of the light guide plate 14 when, for example, the backlight device 12 is subjected to vibration or impact. That in turn renders the light guide plate 14 less likely to be subjected to abrasion and scratching that could otherwise be caused by friction with the chassis 13.

The optical members include at least the optical sheets 15 disposed to overlap the light-exiting side of the light guide plate 14 to perform an optical operation on the light emitted by the light guide plate 14. In this configuration, when the optical sheets 15 are to be placed into the chassis 13, the positioning structures position the optical sheets 15, as well as the light guide plate 14, relative to the chassis 13 in the circumferential direction of the optical sheets 15. Thus, the optical sheets 15 come to have a stable positional relationship with the light guide plate 14 in the circumferential direction. Additionally, the optical sheets 15 become less likely to be displaced relative to the light guide plate 14 in the circumferential direction of the optical sheets 15 when, for example, the backlight device 12 is subjected to vibration or impact. That in turn renders the optical sheets 15 less likely to be subjected to abrasion and scratching that could otherwise be caused by friction with the light guide plate 14.

The chassis 13 has the sidewall portion 13b encircling at least the plurality of the LEDs 17 and the light guide plate 14 and having the plurality of LED-containing concave portions 13b1 arranged therein at intervals in terms of the circumferential direction to contain the LEDs 17, the LED-containing concave portions 13b1 being formed by denting parts of the inner circumferential surface of the sidewall portion 13b. The positioning structures include: the convex positioning portion 21 having the contact faces 21a and projecting out of a part of the outer circumferential surface of the light guide plate 14; and the concave positioning portion 22 formed by denting a part of the inner circumferential surface of the sidewall portion 13b and having the contact faces 22a for engagement with the convex positioning portion 21. In this configuration, when the light guide plate 14 is to be placed into the chassis 13, the convex positioning portion 21, which projects out of a part of the outer circumferential surface of the light guide plate 14, is engaged with the concave positioning portion 22, which is formed by denting a part of the inner circumferential surface of the sidewall portion 13b. As a result, the contact faces 21a and 22a of the convex positioning portion 21 and the concave positioning portion 22 come into contact with each other in the circumferential direction, so that the light guide plate 14 is positioned relative to the chassis 13 in the circumferential direction. The convex positioning portion 21, projecting out of a part of the outer circumferential surface of the light guide plate 14, is less likely to obstruct light propagating in the light guide plate 14 than concave positioning portions formed by denting parts of the outer circumferential surface of the light guide plate 14. Besides, the LEDs 17 are contained in the respective LED-containing concave portions 13b1 formed by denting parts of the inner circumferential surface of the sidewall portion 13b of the chassis 13 and arranged at intervals in terms of the circumferential direction. Therefore, the provision of the LED-containing concave portions 13b1 leaves a smaller gap between the outer circumferential surface of the light guide plate 14 and the inner circumferential surface of the sidewall portion 13b than a gap as large as the LED 17 that would exist between the outer circumferential surface of the light guide plate 14 and the inner circumferential surface of the sidewall portion 13b if no LED-containing concave portions 13b1 were provided in the sidewall portion. Hence, even if light leaks out from the outer circumferential surface of the light guide plate 14 in the direction of the sidewall portion 13b, the light is less likely to leak through that gap between the outer circumferential surface of the light guide plate 14 and the inner circumferential surface of the sidewall portion 13b in the direction of the light-exiting side, which can suppress non-uniform luminance and other related problems.

The liquid crystal display (display device) 10 in accordance with the present embodiment includes the backlight device 12 and the liquid crystal panel (display panel) 11 producing a display by utilizing light supplied by the backlight device 12. In the liquid crystal display 10 configured in this manner, inconveniences are prevented that could accompany displacement of the light guide plate 14, the optical sheets 15, and the reflective sheet 16 (combination of optical members) in the backlight device 12. These features enable the light guide plate 14, the optical sheets 15, and the reflective sheet 16 (combination of optical members) to exhibit appropriate optical performance and also renders the light guide plate 14, the optical sheets 15, and the reflective sheet 16 (combination of optical members) less likely to be subjected to abrasion and scratching that could otherwise be caused by friction with the chassis 13 (lamination member). Therefore, the resultant display will have excellent display quality.

Embodiment 2

Embodiment 2 of the present invention will be described in reference to FIGS. 7 to 13. This Embodiment 2 presents an example including some changes, for example, in the number of positioning structures. Note that description of those structures, operations, and effects which are similar to those described in Embodiment 1 above will not be repeated to avoid duplication.

Figure 7:
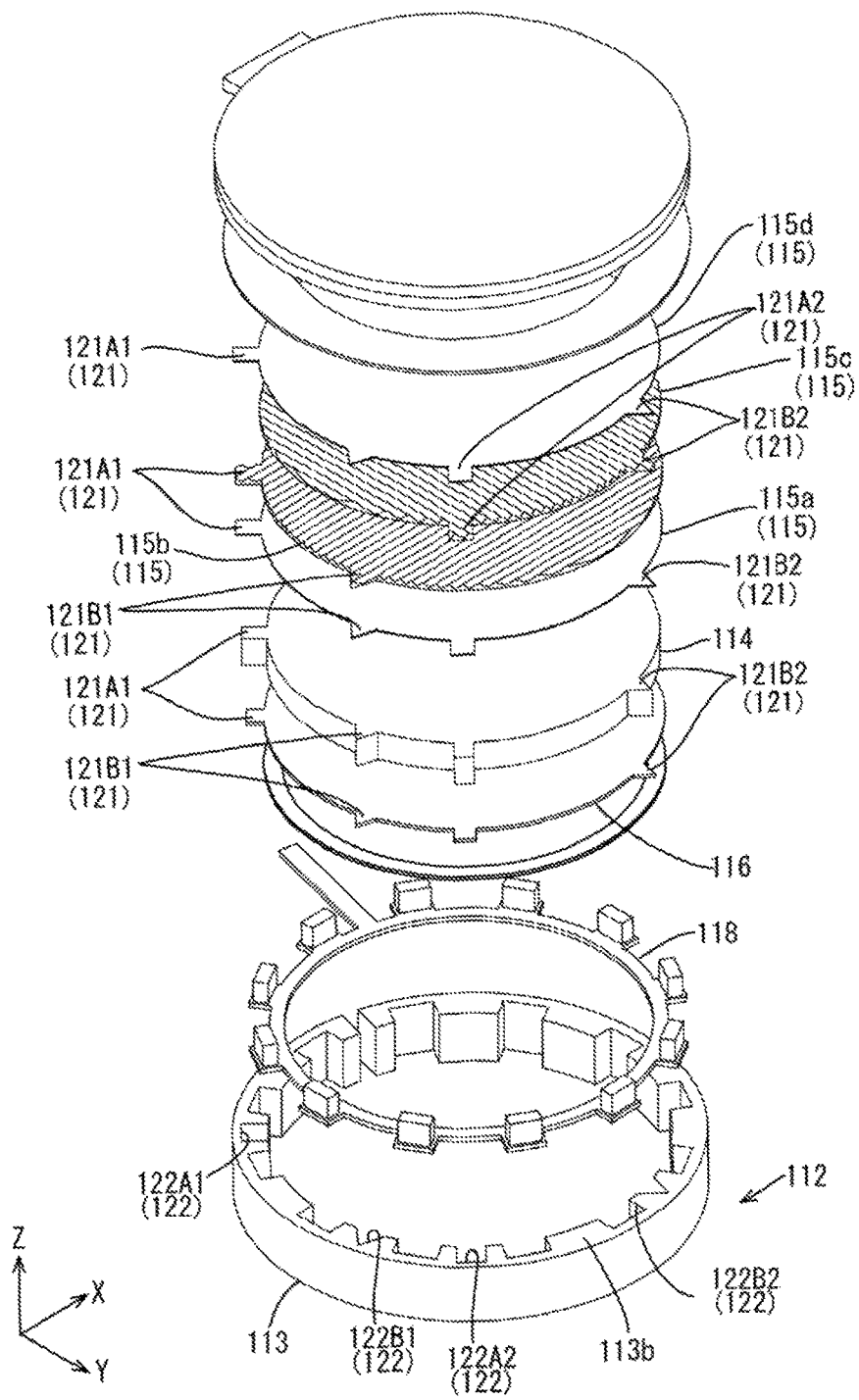
FIG. 7 is an exploded perspective view of a liquid crystal display in accordance with Embodiment 2 of the present invention.
Figure 8:
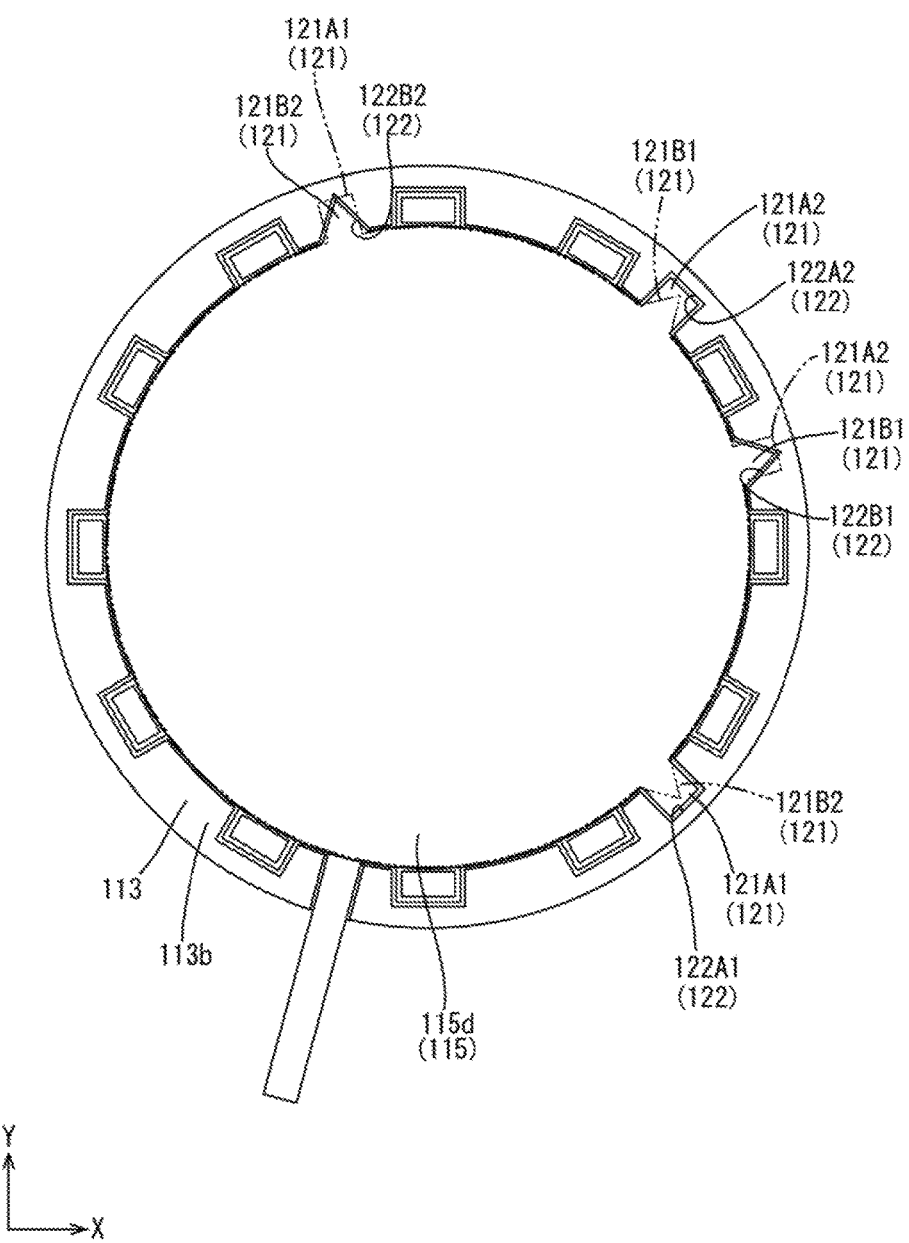
FIG. 8 is a plan view of a backlight device in the liquid crystal display.

Referring to FIGS. 7 and 8, there are provided a total of four positioning structures in the present embodiment. Two of them, which make up a first pair of positioning structures, differ from each other in shape and size as viewed in plan view and are arranged to make an angle therebetween that is not equal to 90° or 180°. The remaining two, which make up a second pair of positioning structures, differ from each other in shape and size as viewed in plan view and are arranged to make the same angle therebetween as does the first pair and also so that the second pair and the first pair make an angle of approximately 90° therebetween. The first pair of two positioning structures includes a first positioning structure ("first-pair first positioning structure") and a second positioning structure ("first-pair second positioning structure"). The first-pair second positioning structure differs from the first-pair first positioning structure in shape and size as viewed in plan view and makes an angle of approximately 60° ($\alpha$ (degrees)) with the first-pair first positioning structure. The second pair of two positioning structures includes a first positioning structure ("second-pair first positioning structure") and a second positioning structure ("second-pair second positioning structure"). The second-pair first positioning structure makes an angle of approximately 90° ($\beta$ (degrees)) with the first-pair first positioning structure. The second-pair second positioning structure differs from the second-pair first positioning structure in shape and size as viewed in plan view, makes an angle of approximately 60° ($\alpha$ (degrees)) with the second-pair first positioning structure, and makes an angle of approximately 90° ($\beta$ (degrees)) with the first-pair second positioning structure. In this manner, the angle between the two positioning structures in the first pair and the angle between the two positioning structures in the second pair are equal to each other (approximately 60°), but not equal to 90° and not equal to 180°. In addition, the angle between the two positioning structures in the first pair and the two positioning structures in the second pair is approximately equal to 90°. In other words, the two positioning structures in the first pair and the two positioning structures in the second pair are all arranged to make therebetween equal angles of approximately 60° ($\alpha$ (degrees)) so that all the four positioning structures are not arranged point-symmetrically with respect to the center of a light guide plate 114, an optical sheet 115, and a reflective sheet 116. Furthermore, the two positioning structures in the first pair and the two positioning structures in the second pair are arranged to make therebetween an angle of approximately 90° ($\beta$ (degrees)), not approximately 60° ($\alpha$ (degrees)).

Specifically, as shown in FIGS. 7 and 8, the first-pair first positioning structure includes a first-pair first convex positioning portion 121A1 that is substantially quadrilateral in shape and relatively large in size as viewed in plan view and a first-pair first concave positioning portion 122A1 that is substantially quadrilateral in shape and relatively large in size as viewed in plan view and that engages the first-pair first convex positioning portion 121A1. Meanwhile, the first-pair second positioning structure includes a first-pair second convex positioning portion 121B1 that is substantially triangular in shape and relatively small in size as viewed in plan view and a first-pair second concave positioning portion 122B1 that is substantially triangular in shape and relatively small in size as viewed in plan view and that engages the first-pair second convex positioning portion 121B1. The second-pair first positioning structure includes a second-pair first convex positioning portion 121A2 that has substantially the same shape and size as the first-pair first convex positioning portion 121A1 as viewed in plan view and a second-pair first concave positioning portion 122A2 that has substantially the same shape and size as the first-pair first concave positioning portion 122A1 as viewed in plan view and that engages the second-pair first convex positioning portion 121A2. Meanwhile, the second-pair second positioning structure includes a second-pair second convex positioning portion 121B2 that has substantially the same shape and size as the first-pair second convex positioning portion 121B1 as viewed in plan view and a second-pair second concave positioning portion 122B2 that has substantially the same shape and size as the first-pair second concave positioning portion 122B1 as viewed in plan view and that engages the second-pair second convex positioning portion 121B2. Note that throughout the following description, the first pair and the second pair will be distinguished, where necessary, by adding a suffix "1" to the reference number of the positioning structure in the first pair and adding a suffix "2" to the reference number of the positioning structure in the second pair. Where there is no such need, the first pair and the second pair will be collectively denoted without adding a suffix to the reference numbers thereof.

Referring to FIGS. 7 and 8, the concave positioning portions 122 in the first and second pairs, which are components of the four positioning structures, are provided by denting respective parts of the inner circumferential surface of a sidewall portion 113b of a chassis 113. On the other hand, the convex positioning portions 121 in the first and second pairs, which are components of the four positioning structures, are provided on the outer peripheral portions of the light guide plate 114, a diffusion sheet 115a, a reflective polarizer sheet 115d, and the reflective sheet 116 (four on each outer peripheral portion) and on the outer peripheral portions of a first lens sheet 115b and a second lens sheet 115c (two of the first pair and two of the second pair on each outer peripheral portion). Specifically, referring to FIG. 7, the first-pair first convex positioning portion 121A1 and the first-pair second convex positioning portion 121B1, which make up the first-pair positioning structures, are provided on the outer peripheral portion of the first lens sheet 115b. In addition, the second-pair first convex positioning portion 121A2 and the second-pair second convex positioning portion 121B2, which make up the second-pair positioning structures, are provided on the outer peripheral portion of the second lens sheet 115c. As described earlier, the first-pair first convex positioning portion 121A1 and the first-pair second convex positioning portion 121B1, which make up the first-pair positioning structures, are identical in shape and size as viewed in plan view and disposed at an angular (circumferential) interval of approximately 90° between the second-pair first convex positioning portion 121A2 and the second-pair second convex positioning portion 121B2, which make up the second-pair positioning structures. Meanwhile, the extension direction (X-axis direction) of the unit lenses in the first lens sheet 115b is perpendicular to the extension direction (Y-axis direction) of the unit lenses in the second lens sheet 115c. Therefore, the first lens sheet 115b and the second lens sheet 115c structurally match each other if either of them is rotated by an angle of approximately 90° in the circumferential direction. A single type of component can therefore be used as both the first lens sheet 115*b* and the second lens sheet 115*c*, which allows for reduction in manufacturing cost.

Figure 9:
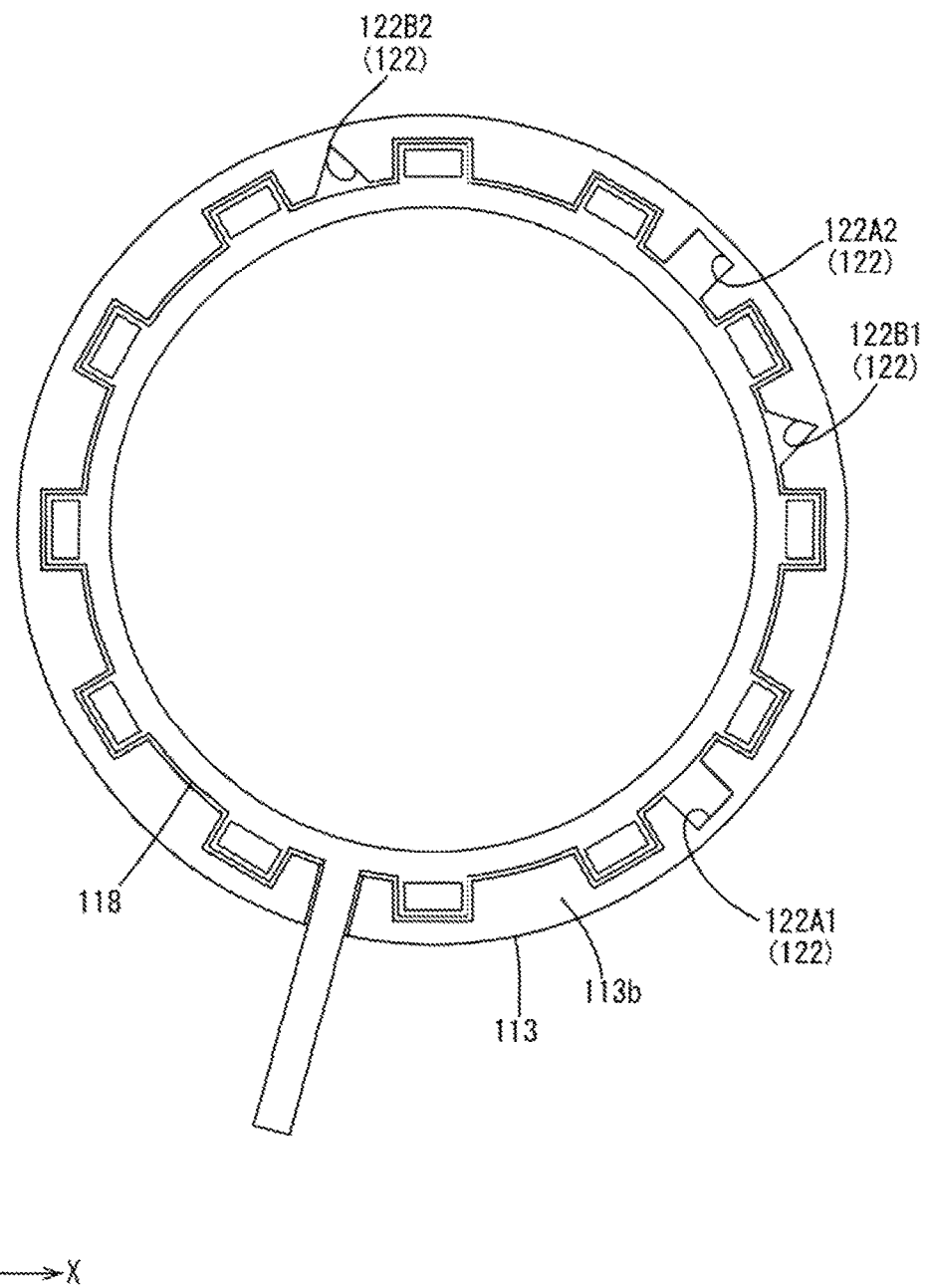
FIG. 9 is a plan view of an LED substrate inside a chassis.
Figure 10:
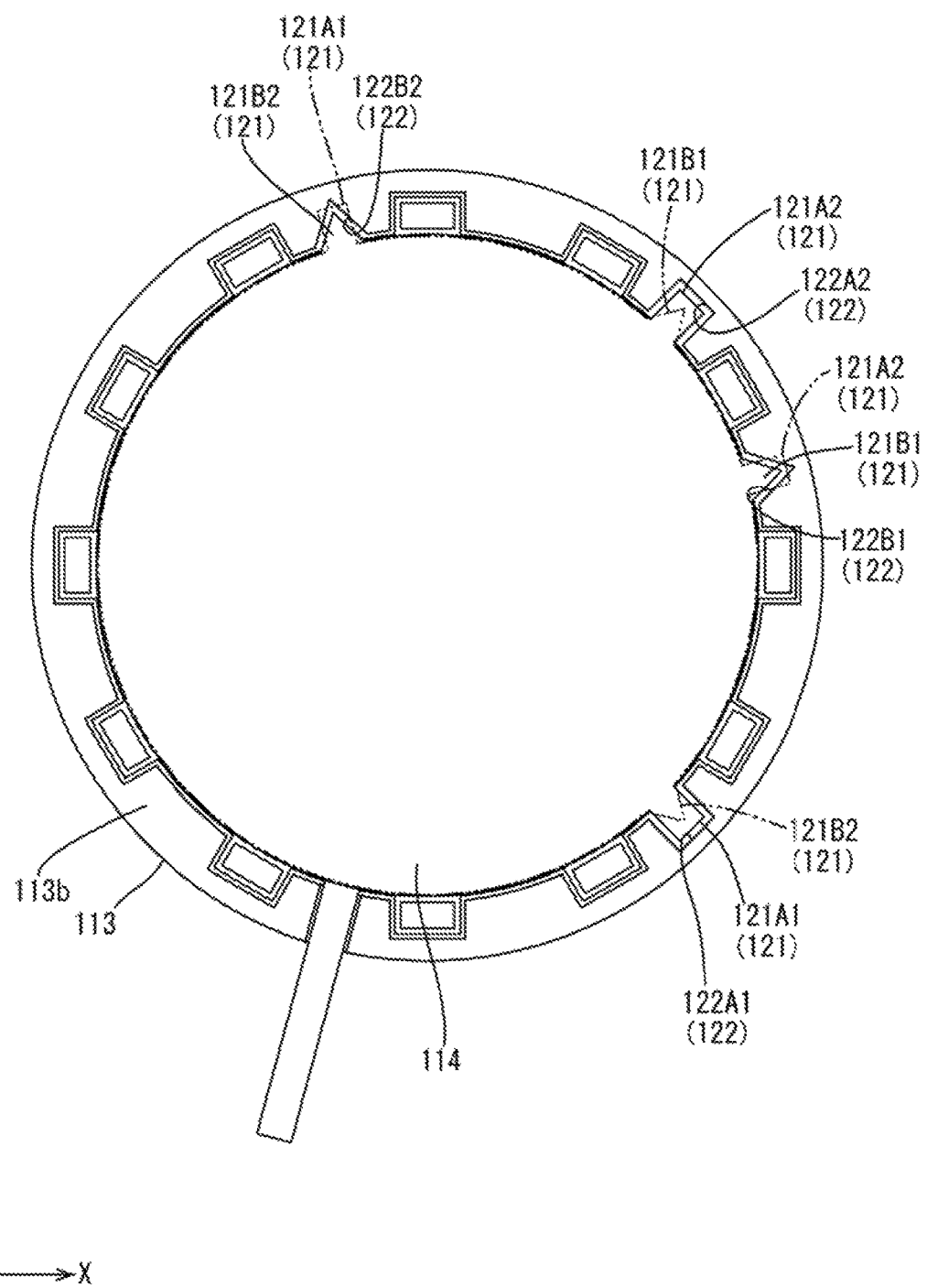
FIG. 10 is a plan view of a light guide plate inside the chassis.
Figure 11:
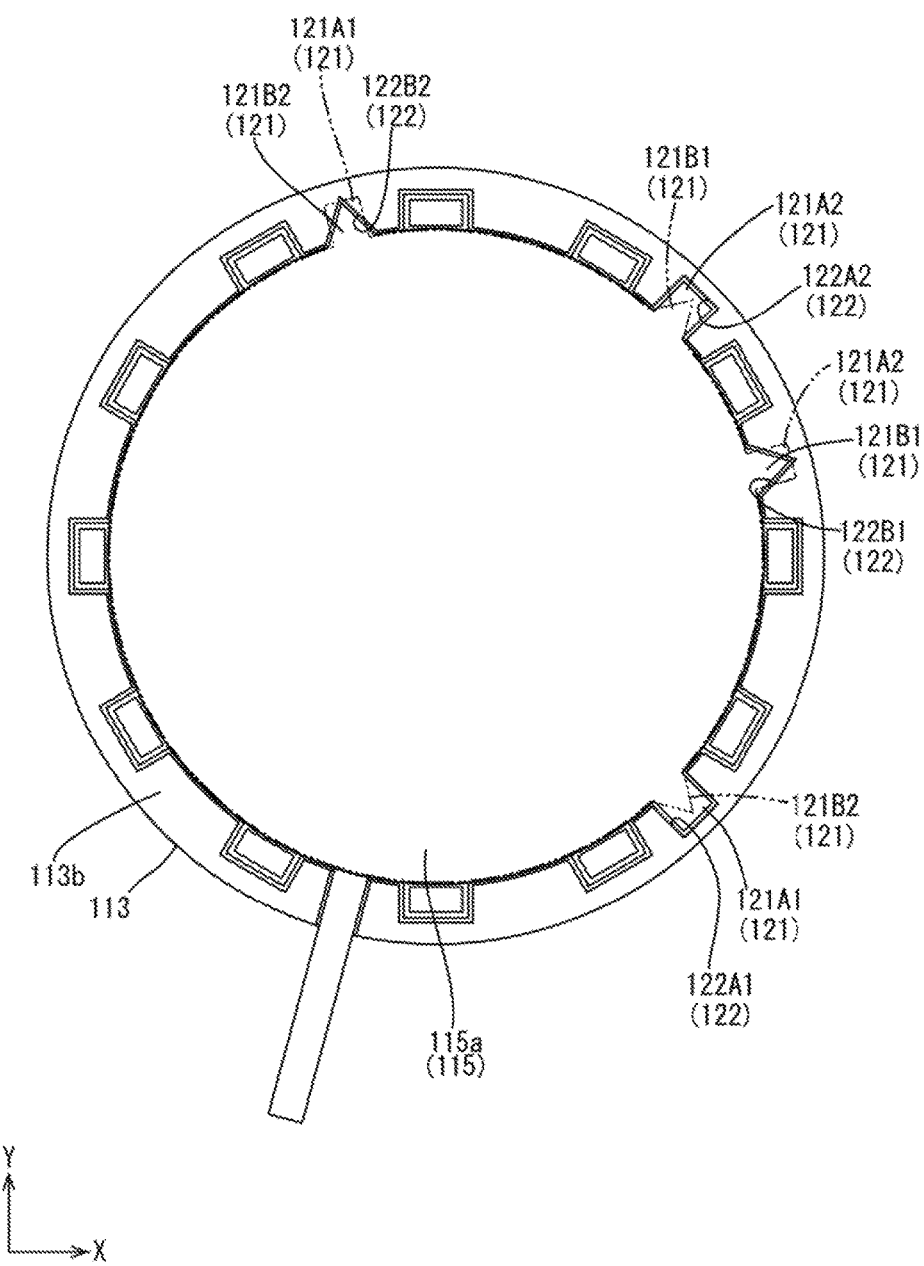
FIG. 11 is a plan view of a diffusion sheet inside the chassis.

Next, an assembly procedure for a backlight device 112 in accordance with the present embodiment will be described. Referring to FIG. 9, an LED substrate 118 is placed into the chassis 113. The reflective sheet 116 and the light guide plate 114 are then sequentially placed as shown in FIG. 10. In this step, if the reflective sheet 116 and the light guide plate 114 are in appropriate positions relative to the chassis 113 in the circumferential direction, the four convex positioning portions 121 engage the associated concave positioning portions 122 so that the reflective sheet 116 and the light guide plate 114 are positioned relative to the chassis 113 in the circumferential direction. Thereafter, as shown in FIG. 11, the diffusion sheet 115*a* is placed into the chassis 113 and then positioned by the positioning structures in the circumferential direction similarly to the reflective sheet 116 and the light guide plate 114.

Figure 12:
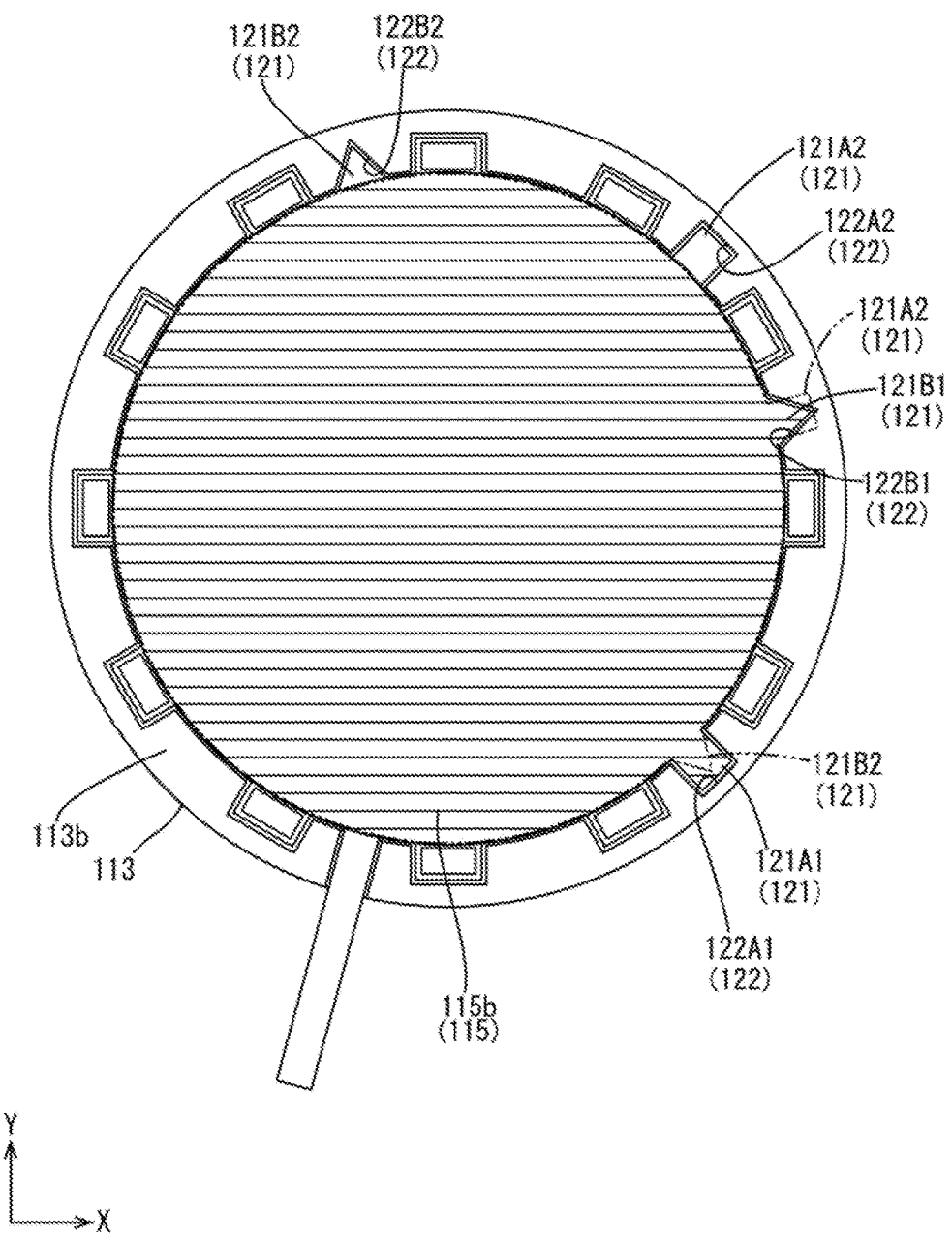
FIG. 12 is a plan view of a first lens sheet inside the chassis.
Figure 13:
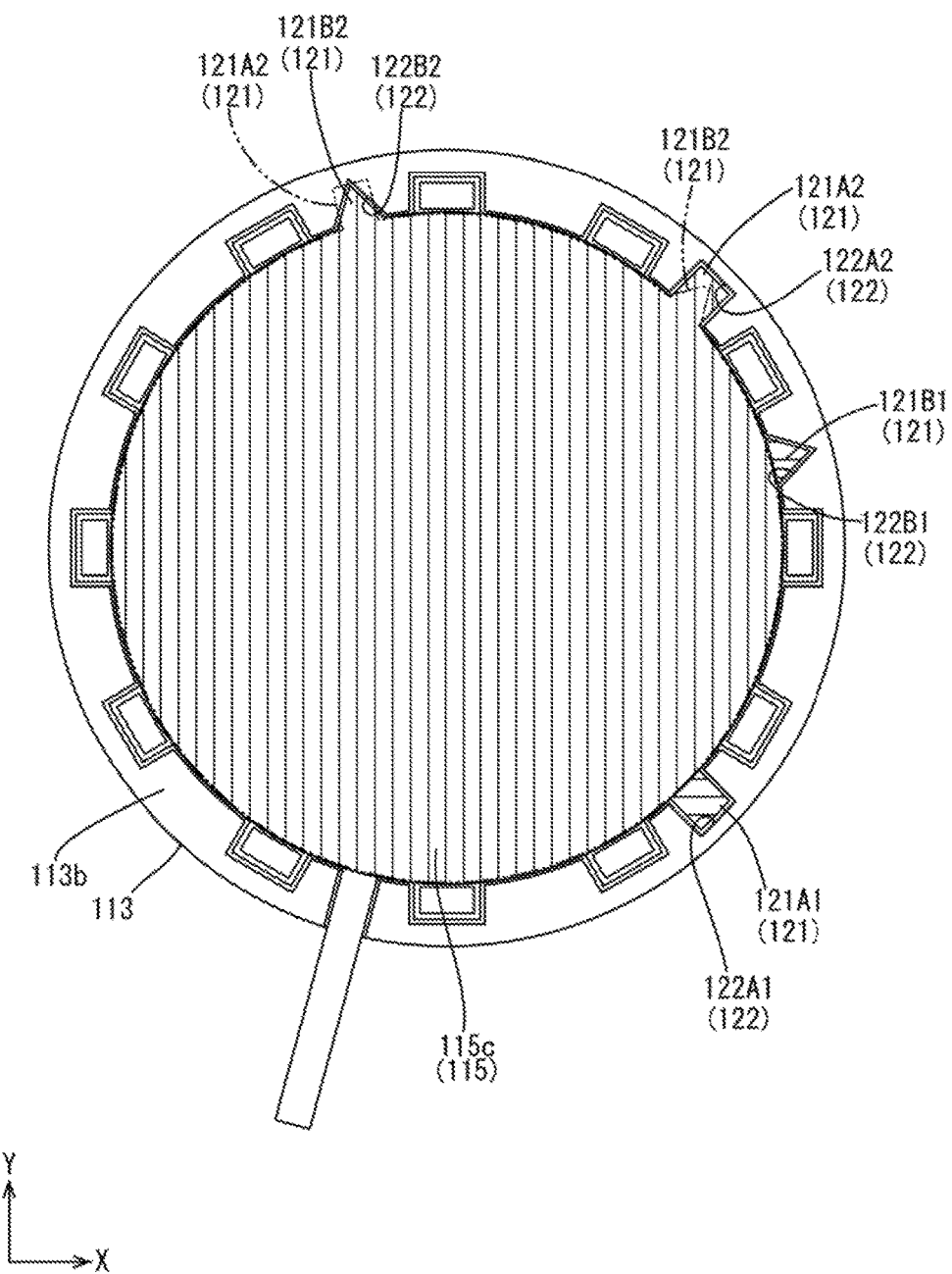
FIG. 13 is a plan view of a second lens sheet inside the chassis.

Next, referring to FIG. 12, the first lens sheet 115*b* is placed into the chassis 113. In this step, the first-pair first convex positioning portion 121A1 and the first-pair second convex positioning portion 121B1 of the first lens sheet 115*b* are respectively inserted into the first-pair first concave positioning portion 122A1 and the first-pair second concave positioning portion 122B1. This insertion positions the first lens sheet 115*b* in the circumferential direction in such a manner that the unit lenses become parallel to the X-axis direction. Subsequently, the second lens sheet 115*c* is placed into the chassis 113. Specifically, the second-pair first convex positioning portion 121A2 and the second-pair second convex positioning portion 121B2 of the second lens sheet 115*c* are respectively inserted into the second-pair first concave positioning portion 122A2 and the second-pair second concave positioning portion 122B2 as shown in FIG. 13. This insertion positions the second lens sheet 115*c* in the circumferential direction in such a manner that the unit lenses become parallel to the Y-axis direction. Thereafter, as shown in FIG. 8, the reflective polarizer sheet 115*d* is placed into the chassis 113 and then positioned by the positioning structures in the circumferential direction similarly to the diffusion sheet 115*a*.

If the reflective sheet 116, the light guide plate 114, the diffusion sheet 115*a*, and the reflective polarizer sheet 115*d* are in the flipped, incorrect position with the front and back thereof reversed when these members are to be placed into the chassis 113, the assembling of the members is interrupted. Specifically, as indicated by a dash-double-dot line in FIGS. 8, 10 and 11, the first-pair second convex positioning portion 121B1 and the second-pair second convex positioning portion 121B2, which are relatively small in size as viewed in plan view, can be inserted into the first-pair first concave positioning portion 122A1 and the second-pair first concave positioning portion 122A2, which are relatively large in size as viewed in plan view. On the other hand, the first-pair first convex positioning portion 121A1 and the second-pair first convex positioning portion 121A2, which are relatively large in size as viewed in plan view, cannot be inserted into the first-pair second concave positioning portion 122B1 and the second-pair second concave positioning portion 122B2, which are relatively small in size as viewed in plan view, and move onto the edge portions of the first-pair second concave positioning portion 122B1 and the second-pair second concave positioning portion 122B2, thereby interrupting the assembling in reverse position. If the first lens sheet 115*b* is in the flipped, incorrect position with the front and back thereof reversed, the assembling of the first lens sheet 115*b* is interrupted. Specifically, as indicated by a dash-double-dot line in FIG. 12, the first-pair second convex positioning portion 121B1, which is relatively small in size as viewed in plan view, can be inserted into the first-pair first concave positioning portion 122A1, which is relatively large in size as viewed in plan view. On the other hand, the first-pair first convex positioning portion 121A1, which is relatively large in size as viewed in plan view, cannot be inserted into the first-pair second concave positioning portion 122B1, which is relatively small in size as viewed in plan view, and moves onto the edge portion of the first-pair second concave positioning portion 122B1, thereby interrupting the assembling in reverse position. If the second lens sheet 115*c* is in the flipped, incorrect position with the front and back thereof reversed, the assembling of the second lens sheet 115*c* is interrupted. Specifically, as indicated by a dash-double-dot line in FIG. 13, the second-pair second convex positioning portion 121B2, which is relatively small in size as viewed in plan view, can be inserted into the second-pair first concave positioning portion 122A2, which is relatively large in size as viewed in plan view. On the other hand, the second-pair first convex positioning portion 121A2, which is relatively large in size as viewed in plan view, cannot be inserted into the second-pair second concave positioning portion 122B2, which is relatively small in size as viewed in plan view, and moves onto the edge portion of the second-pair second concave positioning portion 122B2, thereby interrupting the assembling in reverse position. If any of the reflective sheet 116, the light guide plate 114, and the optical sheets 115 is/are prevented by the positioning structures from being assembled in this manner, that member/those members may be flipped back-to-front to the correct position before being subjected to the assembling process once again.

As described above, according to the present embodiment, the optical members are disposed to overlap each other. The positioning structures include at least: the first pair of two positioning structures that differ in size from each other as viewed in the direction in which the light guide plate 114, the optical sheet 115, and the reflective sheet 116 (combination of optical members) overlap the chassis 113 (lamination member) and that are arranged to make an angle of α (degrees) therebetween so that those two positioning structures are not arranged point-symmetrically with respect to the center of the light guide plate 114, the optical sheet 115, and the reflective sheet 116 (combination of optical members); and the second pair of two positioning structures that differ in size from each other as viewed in the direction in which the light guide plate 114, the optical sheet 115, and the reflective sheet 116 (combination of optical members) overlap the chassis 113 (lamination member) and that are arranged in such a manner as to make the same angle of α (degrees) therebetween as the positioning structures in the first pair and in such a manner that the first pair and the second pair make an angle of β (degrees) therebetween, α (degrees) being not equal to β (degrees). In this configuration, when the light guide plate 114, the optical sheet 115, and the reflective sheet 116 (combination of optical members) are to be disposed to overlap each other, the first lens sheet 115*b* and the second lens sheet 115*c* included in the combination of optical members can have the same structure and be arranged and positioned by rotating the first lens sheet 115*b* and the second lens sheet 115*c* by an angle of β (degrees) that is not equal to α (degrees). These features can reduce the types of components used as the first lens sheet 115b and the second lens sheet 115c (combination of optical members), thereby allowing for reduction in manufacturing cost.

The optical members include a plurality of lens sheets (the first lens sheet 115b and the second lens sheet 115c) in each of which unit lenses extending in one direction are arranged in a direction that intersects that direction. The positioning structures are arranged in such a manner that the first pair of positioning structures and the second pair of positioning structures make an angle of 90° therebetween. In this configuration, when the first lens sheet 115b and the second lens sheet 115c are to be disposed to overlap each other, the first lens sheet 115b and the second lens sheet 115c can have the same structure and be arranged so that the extension direction of the unit lenses in the first lens sheet 115b is perpendicular to the extension direction of the unit lenses in the second lens sheet 115c. These features allow for improvement of front luminance at a low cost. Besides, the positioning structures position the first lens sheet 115b and the second lens sheet 115c relative to the chassis 113 (lamination member) in the circumferential direction. Therefore, the angle (90°) made by the extension direction of the unit lenses in the first lens sheet 115b and the extension direction of the unit lenses in the second lens sheet 115c is less likely to vary, which enables the backlight device 112 to stably exhibit the optical performance thereof.

Embodiment 3

Embodiment 3 of the present invention will be described in reference to FIGS. 14 to 22. This Embodiment 3 differs from Embodiment 2 above in that the structure of a chassis 213 includes some changes and also in that optical sheets 215 are positioned relative to a light guide plate 214 in the circumferential direction. Note that description of those structures, operations, and effects that are similar to those described in Embodiment 2 above will not be repeated to avoid duplication.

Figure 14:
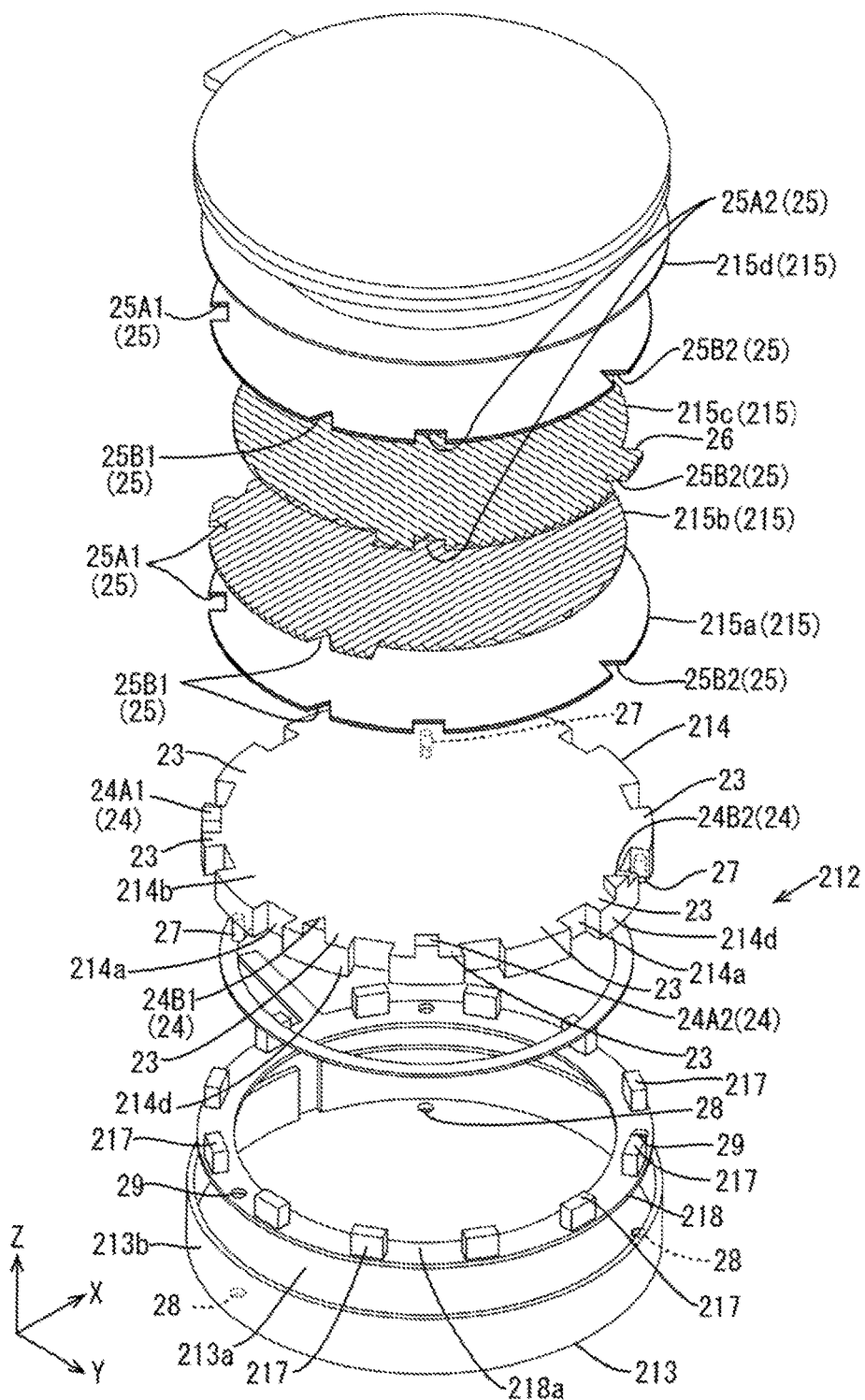
FIG. 14 is an exploded perspective view of a liquid crystal display in accordance with Embodiment 3 of the present invention.

Referring to FIG. 14, the chassis 213 in accordance with the present embodiment is made of a metal and includes a bottom wall portion 213a that is substantially circular as viewed in plan view and a sidewall portion 213b that is shaped substantially like a circular ring rising in the direction of the front side from an outer peripheral portion of the bottom wall portion 213a. The sidewall portion 213b has a fixed thickness all along the circumference and has no concave positioning portions like those in Embodiments 1 and 2 above. This structure allows for reduction in the thickness of the sidewall portion 213b, thereby providing a backlight device 212 with a narrow frame. The chassis 213 may be manufactured by press working or drawing from a platelike metal mother material.

Referring to FIGS. 14 to 17, the light guide plate 214 has light-incident faces 214a and non-light-incident faces 214d that form a radially rising/falling, step-like structure. The light-incident faces 214a are located relatively radially inward, whereas the non-light-incident faces 214d are located relatively radially outward. In other words, the light guide plate 214 has LED-to-LED intervening portions (light-source-to-light-source intervening portions) 23 that are parts thereof where the non-light-incident faces 214d are provided and that project radially outward relative to the light-incident faces 214a (toward the sidewall portion 213b of the chassis 213). Each LED-to-LED intervening portion 23 is interposed between LEDs 217 that are adjacent in the circumferential direction. The LED-to-LED intervening portions 23 (which are as many as the non-light-incident faces 214d) are arranged at intervals in terms of the circumferential direction of the light guide plate 214, the intervals being approximately equal to the width of the LEDs 217. Therefore, the LEDs 217 are provided flanked by those LED-to-LED intervening portions 23 which are adjacent in the circumferential direction. Therefore, this configuration leaves only an extremely small gap between the non-light-incident faces 214d of the LED-to-LED intervening portions 23 and the internal face of the sidewall portion 213b. Hence, even if light leaks through the non-light-incident faces 214d, the light is less likely to leak through that gap between the non-light-incident faces 214d of the LED-to-LED intervening portions 23 and the internal face of the sidewall portion 213b in the direction of the front side than without there being any LED-to-LED intervening portions on the light guide plate, which can suppress non-uniform luminance and other related problems in a suitable manner. As a result of the chassis 213 and the light guide plate 214 being configured as described above, an LED substrate 218 includes a base portion 218a that is shaped like a circular ring with a fixed width, the LEDs 217 being mounted on the base portion 218a, as shown in FIGS. 14 and 18. The LED-mounting portions described in Embodiment 1 above are omitted.

As shown in FIG. 14, the positioning structures in accordance with the present embodiment are for positioning the optical sheets 215, which are stacked on the front side (light-exiting side) of the light guide plate 214, relative to the light guide plate 214 in the circumferential direction. A reflective sheet 216 (see FIGS. 16 and 17) is not positioned by the positioning structures. Therefore, the light guide plate 214 forms the "lamination member," and the optical sheets 215 form a "combination of optical members." The positioning structures include light-guiding-plate-side positioning portions (lamination-member-side positioning portions) 24 provided on the light guide plate 214 and optical-sheet-side positioning portions (optical-member-side positioning portions) 25 provided on the optical sheets 215 for engagement with the light-guiding-plate-side positioning portions 24.

Figure 19:
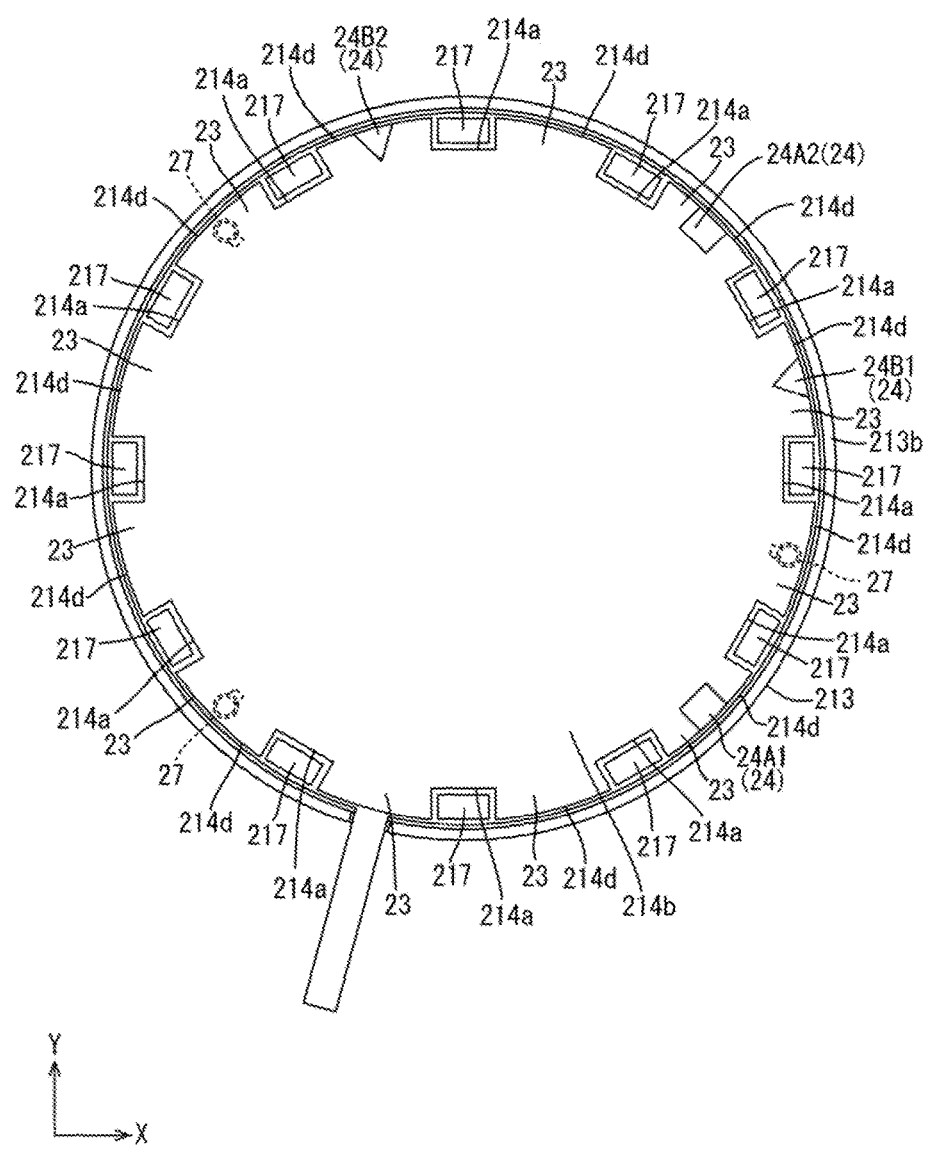
FIG. 19 is a plan view of a light guide plate inside the chassis.

Referring to FIGS. 14 and 19, the light-guiding-plate-side positioning portions 24 are formed to project from a light-exiting face 214b of the light guide plate 214 in the direction of the front side. The light-guiding-plate-side positioning portions 24, provided in the LED-to-LED intervening portions 23 of the light guide plate 214, are located radially outward of the light-incident faces 214a. In this configuration, the light-guiding-plate-side positioning portions 24 are less likely to obstruct light propagating in the light guide plate 214, which renders non-uniform luminance less likely to occur in the light exiting from the backlight device 212. In contrast, the optical-sheet-side positioning portions 25 are formed by notching parts of the outer peripheral portions of the optical sheets 215 so that the optical-sheet-side positioning portions 25 can be concavities or radially inward dents in the outer circumference end face.

Figure 15:
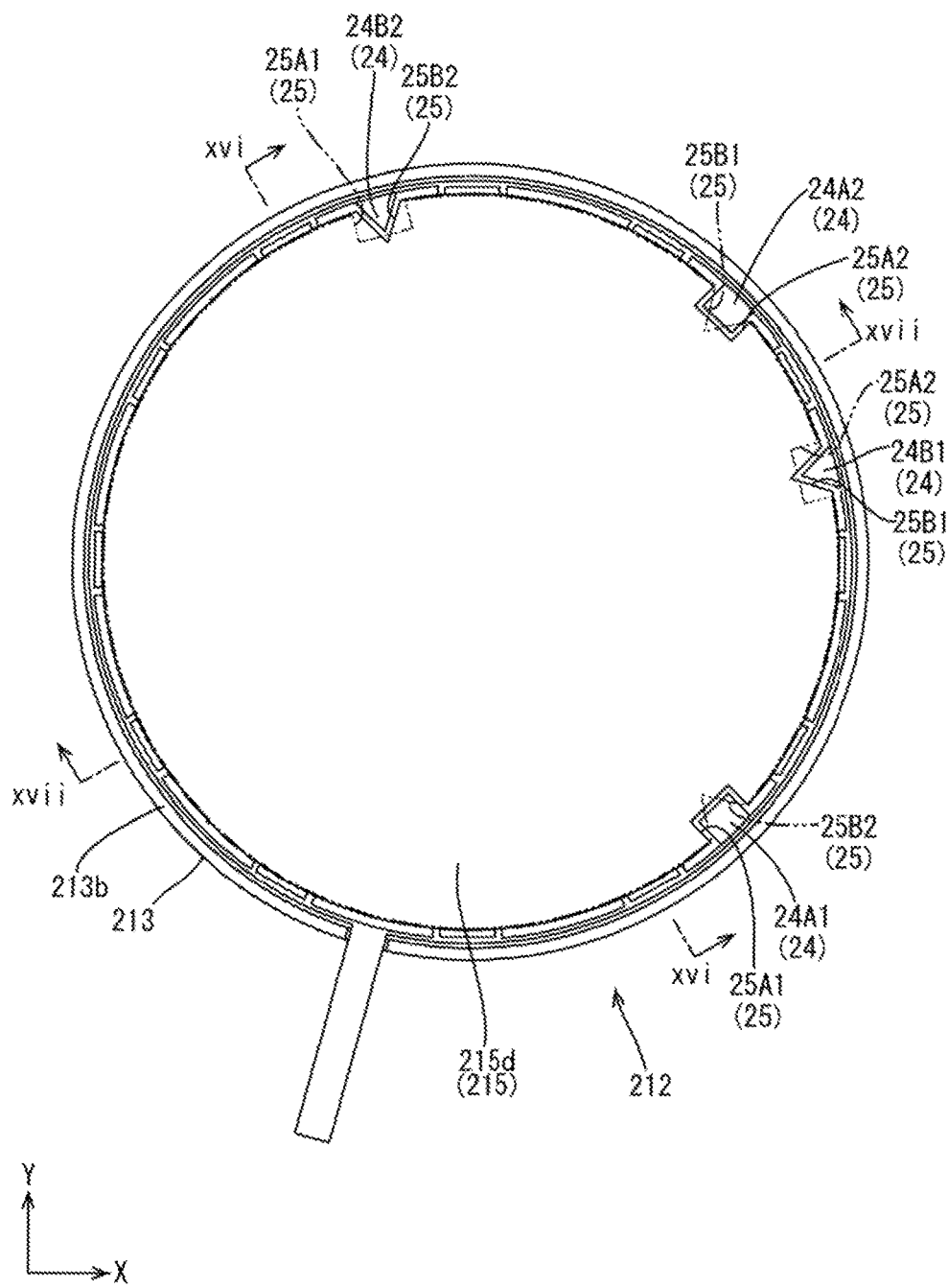
FIG. 15 is a plan view of a backlight device in the liquid crystal display.
Figure 16:
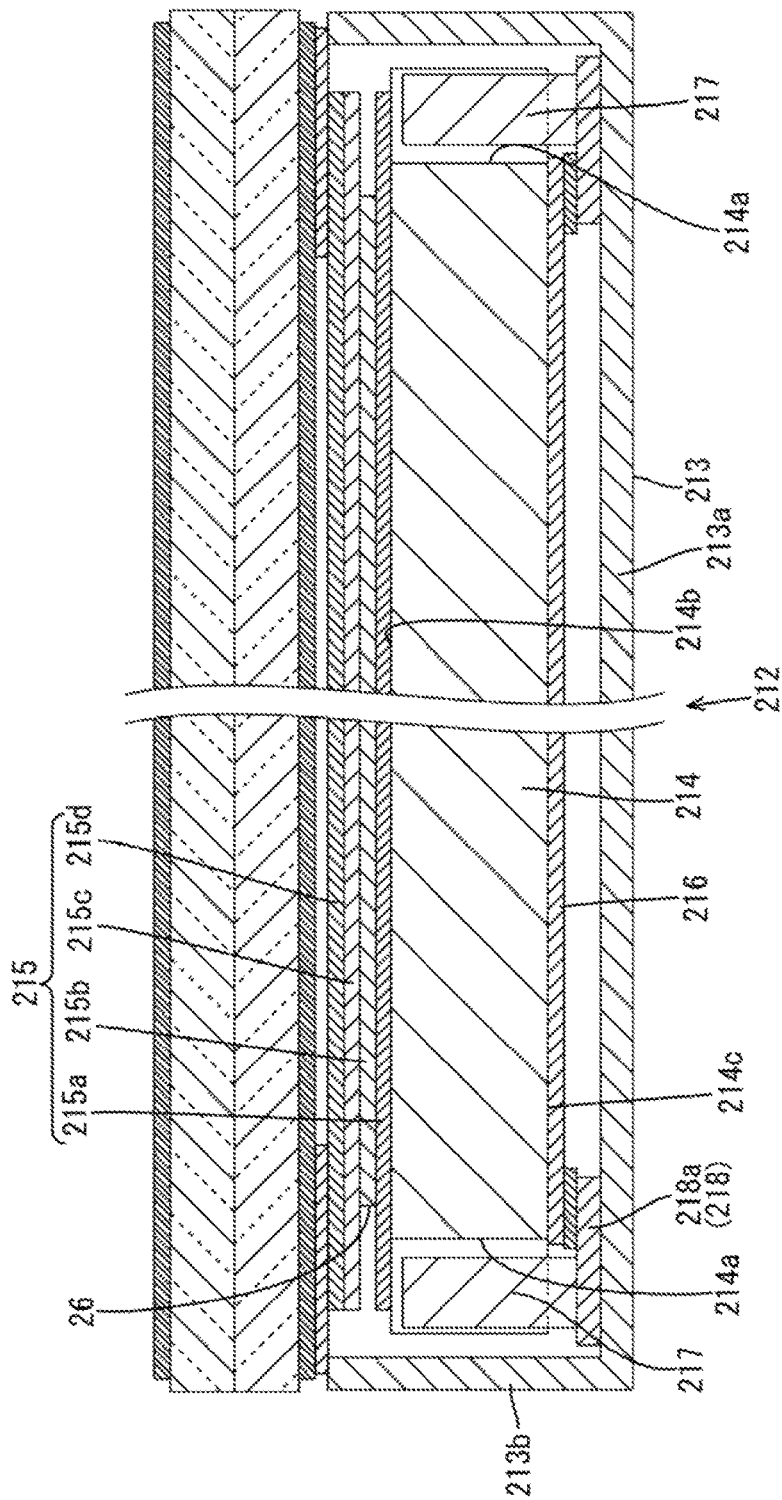
FIG. 16 is a cross-sectional view taken along line xvi-xvi in FIG. 15.

Referring to FIGS. 14 and 15, there are provided a total of four positioning structures as in Embodiment 2 above. Two of them, which make up a first pair of positioning structures, differ from each other in shape and size as viewed in plan view and are arranged to make therebetween an angle of approximately 60° (neither 90° nor 180°, equal to an angle α (degrees) so that the positioning structures are not arranged point-symmetrically with respect to the center of the combination of optical members). The remaining two, which make up a second pair of positioning structures, differ from each other in shape and size as viewed in plan view and are arranged to make the same angle (α (degrees)) therebetween as does the first pair and also so that the second pair and the first pair make an angle of approximately 90° (β

(degrees), which differs from α (degrees)) therebetween. The first pair of two positioning structures includes a first positioning structure ("first-pair first positioning structure") and a second positioning structure ("first-pair second positioning structure"). The first-pair second positioning structure differs from the first-pair first positioning structure in shape and size as viewed in plan view and makes an angle of approximately 60° (α (degrees)) with the first-pair first positioning structure. The second pair of two positioning structures includes a first positioning structure ("second-pair first positioning structure") and a second positioning structure ("second-pair second positioning structure"). The second-pair first positioning structure makes an angle of approximately 90° (β (degrees)) with the first-pair first positioning structure. The second-pair second positioning structure differs from the second-pair first positioning structure in shape and size as viewed in plan view, makes an angle of approximately 60° (α (degrees)) with the second-pair first positioning structure, and makes an angle of approximately 90° (β (degrees)) with the first-pair second positioning structure.

Among them, the first-pair first positioning structure includes a first-pair first light-guiding-plate-side positioning portion 24A1 that is substantially quadrilateral in shape and relatively large in size as viewed in plan view and a first-pair first optical-sheet-side positioning portion 25A1 that is substantially quadrilateral in shape and relatively large in size as viewed in plan view and that engages the first-pair first light-guiding-plate-side positioning portion 24A1. Meanwhile, the first-pair second positioning structure includes a first-pair second light-guiding-plate-side positioning portion 24B1 that is substantially triangular in shape and relatively small in size as viewed in plan view and a first-pair second optical-sheet-side positioning portion 25B1 that is substantially triangular in shape and relatively small in size as viewed in plan view and that engages the first-pair second light-guiding-plate-side positioning portion 24B1. The second-pair first positioning structure includes a second-pair first light-guiding-plate-side positioning portion 24A2 that has substantially the same shape and size as the first-pair first light-guiding-plate-side positioning portion 24A1 as viewed in plan view and a second-pair first optical-sheet-side positioning portion 25A2 that has substantially the same shape and size as the first-pair first optical-sheet-side positioning portion 25A1 as viewed in plan view and that engages the second-pair first light-guiding-plate-side positioning portion 24A2. Meanwhile, the second-pair second positioning structure includes a second-pair second light-guiding-plate-side positioning portion 24B2 that has substantially the same shape and size as the first-pair second light-guiding-plate-side positioning portion 24B1 as viewed in plan view and a second-pair second optical-sheet-side positioning portion 25B2 that has substantially the same shape and size as the first-pair second optical-sheet-side positioning portion 25B1 as viewed in plan view and that engages the first-pair second light-guiding-plate-side positioning portion 24B1. Note that throughout the following description, the first positioning structure and the second positioning structure in each pair will be distinguished, where necessary, by adding a suffix "A" to the reference number of the first positioning structure and adding a suffix "B" to the reference number of the second positioning structure. Where there is no such need, the first and second positioning structures will be collectively denoted without adding a suffix to the reference numbers thereof. Note also that throughout the following description, the first pair and the second pair will be distinguished, where necessary, by adding a suffix "1" to the reference number of the positioning structure in the first pair and adding a suffix "2" to the reference number of the positioning structure in the second pair. Where there is no such need, the first pair and the second pair will be collectively denoted without adding a suffix to the reference numbers thereof.

Referring to FIGS. 14 and 19, the light-guiding-plate-side positioning portions 24 in the first and second pairs that make up the four positioning structures described above are provided to project from the light-exiting face 214b of the light guide plate 214 in the direction of the front side and to project radially inward from the non-light-incident faces 214d. In contrast, the optical-sheet-side positioning portions 25 in the first and second pairs that make up the four positioning structures described above are provided on the outer peripheral portions of a diffusion sheet 215a and a reflective polarizer sheet 215d (four on each outer peripheral portion) and on the outer peripheral portions of a first lens sheet 215b and a second lens sheet 215c (two of the first pair and two of the second pair on each outer peripheral portion). Specifically, referring to FIG. 14, the first-pair first optical-sheet-side positioning portion 25A1 and the first-pair second optical-sheet-side positioning portion 25B1, which make up the first-pair positioning structures, are provided on the outer peripheral portion of the first lens sheet 215b. Meanwhile, the second-pair first optical-sheet-side positioning portion 25A2 and the second-pair second optical-sheet-side positioning portion 25B2, which make up the second-pair positioning structures, are provided on the second lens sheet 215c. As described earlier, the first-pair first light-guiding-plate-side positioning portion 24A1 and the first-pair second light-guiding-plate-side positioning portion 24B1, which make up the first-pair positioning structures, are identical in shape and size as viewed in plan view and disposed at an angular (circumferential) interval of approximately 90° between the second-pair first light-guiding-plate-side positioning portion 24A2 and the second-pair second light-guiding-plate-side positioning portion 24B2, which make up the second-pair positioning structures. Meanwhile, the extension direction (X-axis direction) of the unit lenses in the first lens sheet 215b is perpendicular to the extension direction (Y-axis direction) of the unit lenses in the second lens sheet 215c. Therefore, the first lens sheet 215b and the second lens sheet 215c structurally match each other if either of them is rotated by an angle of approximately 90° in the circumferential direction. A single type of component can therefore be used as both the first lens sheet 215b and the second lens sheet 215c, which allows for reduction in manufacturing cost.

Figure 21:
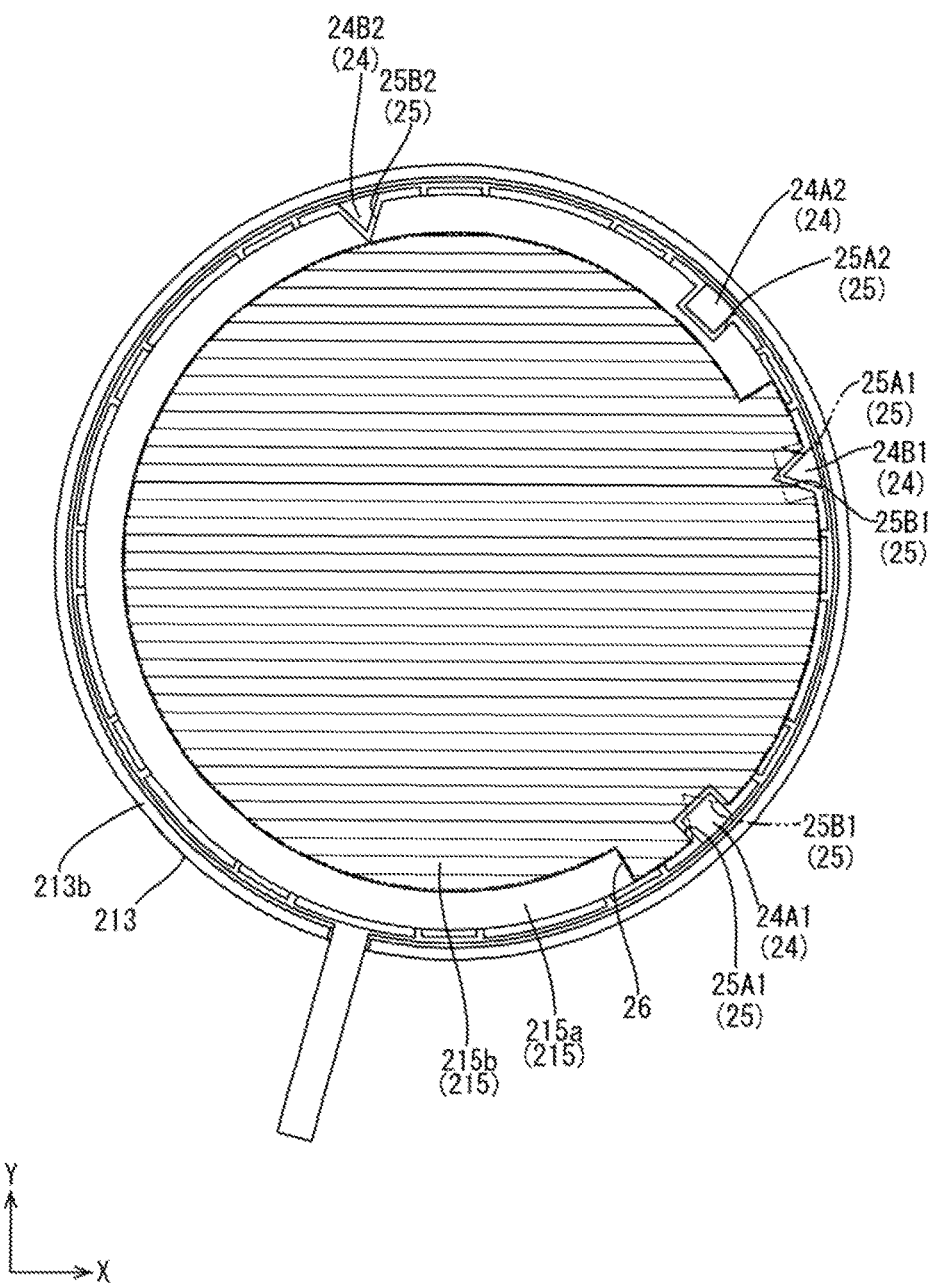
FIG. 21 is a plan view of a first lens sheet inside the chassis.
Figure 22:
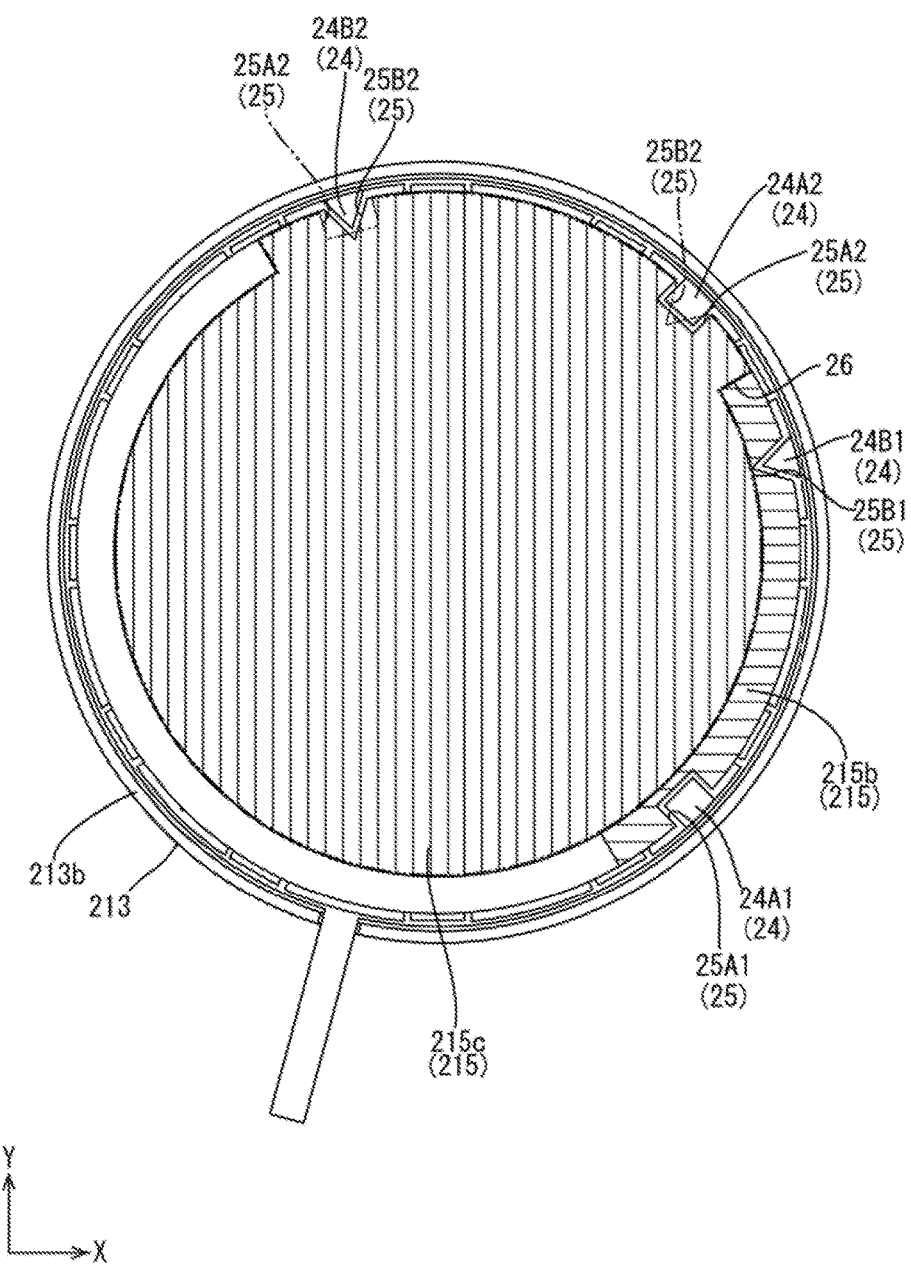
FIG. 22 is a plan view of a second lens sheet inside the chassis.

Referring to FIG. 21, the first lens sheet 215b has a notch in a part of the outer peripheral portion thereof. The notch extends over the entire outer peripheral portion to the exclusion of the angle from the first-pair first optical-sheet-side positioning portion 25A1 to the first-pair second optical-sheet-side positioning portion 25B1 (α (degrees), which is approximately 60°), that is, over an angle of approximately 300° (=360°−α (degrees)). This notch 26 prevents the outer peripheral portion of the first lens sheet 215b from moving onto the second-pair first light-guiding-plate-side positioning portion 24A2 and the second-pair second light-guiding-plate-side positioning portion 24B2. Likewise, the second lens sheet 215c has a notch as shown in FIG. 22. The notch extends over the entire outer peripheral portion to the exclusion of the angle from the second-pair first optical-sheet-side positioning portion 25A2 to the second-pair second optical-sheet-side positioning portion 25B2 (α (degrees), which is approximately 60°), that is, over an angle of approximately 300° (=360°−α (degrees)). This notch 26 prevents the outer peripheral portion of the second lens sheet 215*c* from moving onto the first-pair first light-guiding-plate-side positioning portion 24A1 and the first-pair second light-guiding-plate-side positioning portion 24B 1.

Figure 17:
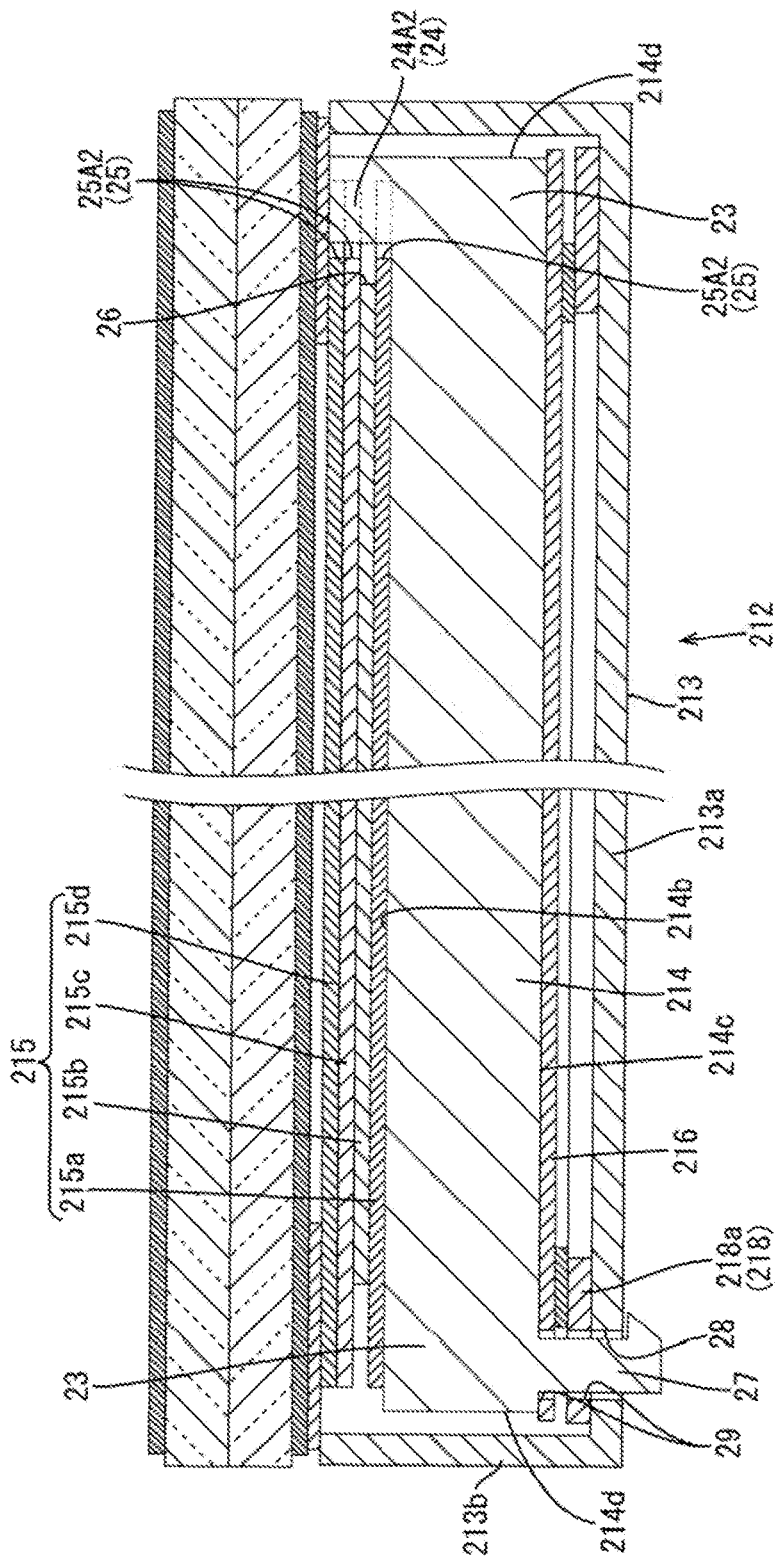
FIG. 17 is a cross-sectional view taken along line xvii-xvii in FIG. 15.
Figure 18:
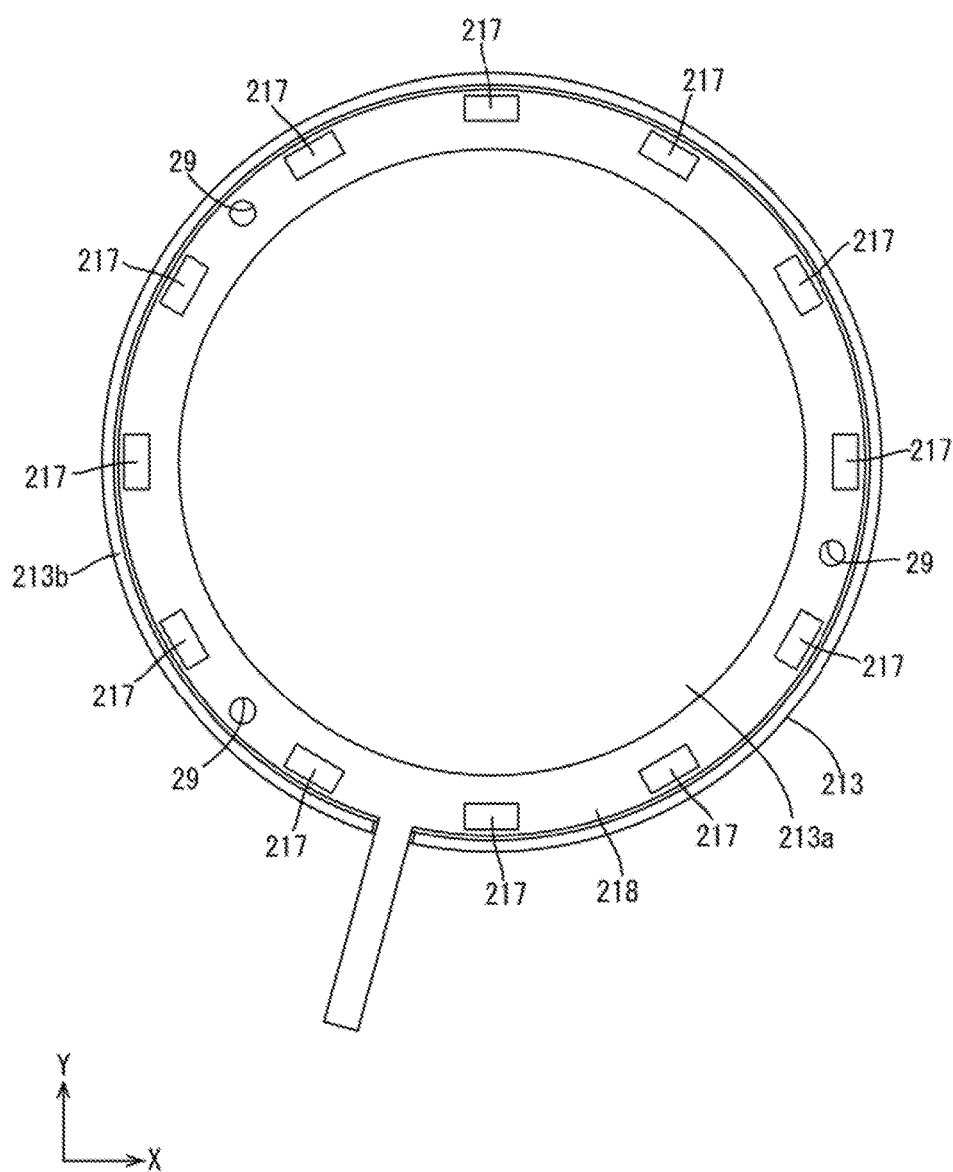
FIG. 18 is a plan view of an LED substrate inside a chassis.

As mentioned earlier, the light guide plate 214, which positions the optical sheets 215 in the circumferential direction, is assembled into the chassis 213 and held in that position by holding structures as shown in FIGS. 14 and 17. The holding structures include three light-guiding-plate-side holding portions 27 and three chassis-side holding portions (housing-side holding portions) 28. The light-guiding-plate-side holding portions 27 are arranged at predetermined intervals in terms of the circumferential direction of the light guide plate 214 in such a manner as to project out of an opposing face 214*c* of the light guide plate 214 in the direction of the back side. The chassis-side holding portions 28 are arranged at predetermined intervals in terms of the circumferential direction of the bottom wall portion 213*a* of the chassis 213 in such a manner as to form a hole through the bottom wall portion 213*a* of the chassis 213. The light-guiding-plate-side holding portions 27 are put through the respective chassis-side holding portions 28 and caught onto the hole edge portions thereof from the back side, to hold and prevent the light guide plate 214 from moving out of the chassis 213. The light-guiding-plate-side holding portions 27 are then moved in the circumferential direction into contact with the hole edge portions of the chassis-side holding portions 28 so that the light guide plate 214 is positioned relative to the chassis 213 in the circumferential direction, which in turn positions the light guide plate 214 and the optical sheets 215 relative to the chassis 213 in the circumferential direction. The LED substrate 218 and the reflective sheet 216 have insertion holes 29 through which the light-guiding-plate-side holding portions 27 are inserted respectively.

Figure 20:
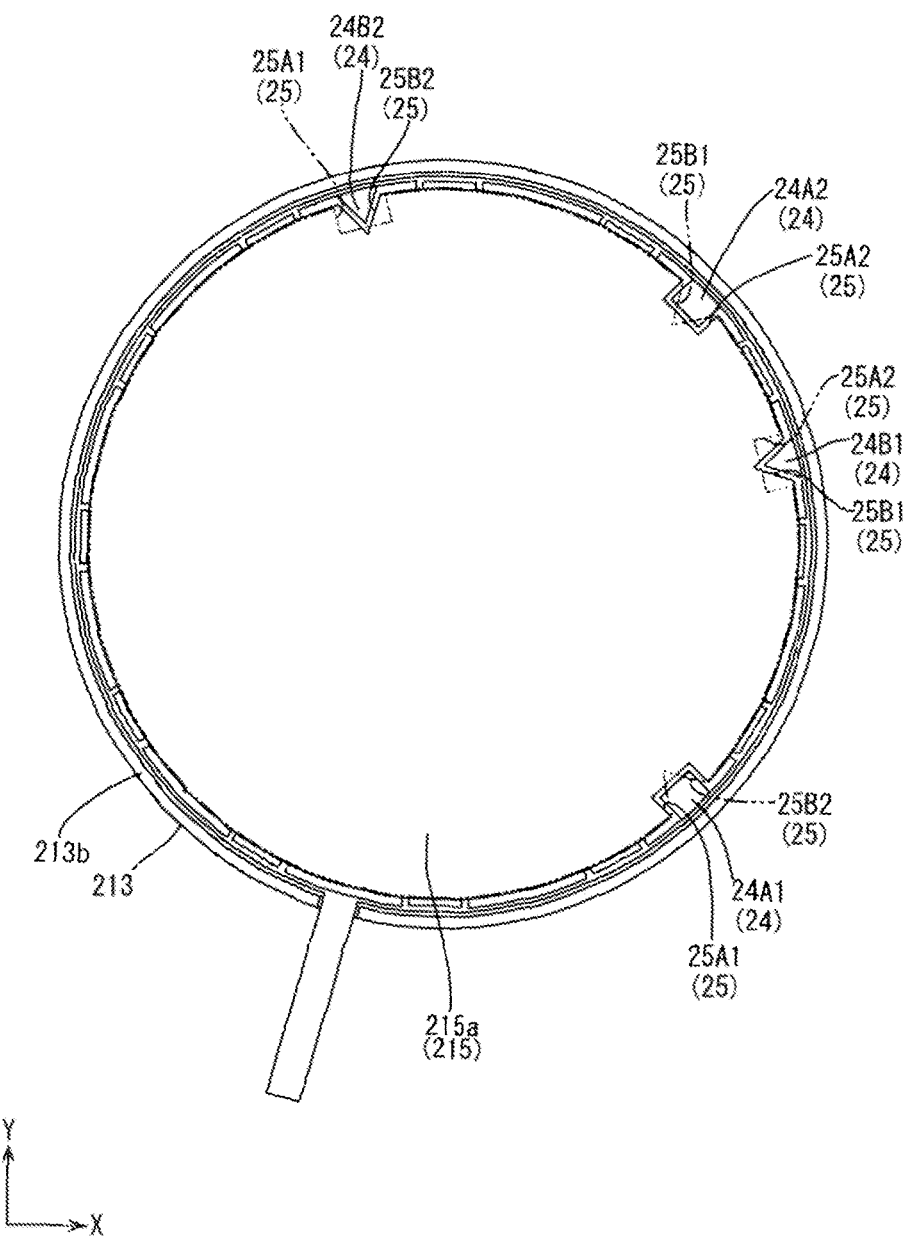
FIG. 20 is a plan view of a diffusion sheet inside the chassis.

Next, an assembly procedure for the backlight device 212 in accordance with the present embodiment will be described. Referring to FIG. 18, the LED substrate 218 is placed into the chassis 213. The reflective sheet 216 and the light guide plate 214 are then sequentially placed as shown in FIG. 19. Now, the light guide plate 214 is held in place and positioned in the circumferential direction as shown in FIG. 17, by the light-guiding-plate-side holding portions 27 being put through the chassis-side holding portions 28 in the bottom wall portion 213*a* of the chassis 213, caught onto the hole edge portions thereof from the back side, and further moved in the circumferential direction into contact with the hole edge portions. In this step, the light-guiding-plate-side holding portions 27 are put through the insertion holes 29 in the LED substrate 218 and the reflective sheet 216. Thereafter, as shown in FIG. 20, the diffusion sheet 215*a* is placed into the chassis 213. If the diffusion sheet 215*a* is in an appropriate position relative to the light guide plate 214 in the circumferential direction, the four light-guiding-plate-side positioning portions 24 engage the associated optical-sheet-side positioning portions 25 so that the diffusion sheet 215*a* is positioned relative to the light guide plate 214 in the circumferential direction.

Next, referring to FIG. 21, the first lens sheet 215*b* is placed into the chassis 213. In this step, the first-pair first optical-sheet-side positioning portion 25A1 and the first-pair second optical-sheet-side positioning portion 25B1 of the first lens sheet 215*b* are respectively engaged with the first-pair first light-guiding-plate-side positioning portion 24A1 and the first-pair second light-guiding-plate-side positioning portion 24B1. This engagement positions the first lens sheet 215*b* in the circumferential direction in such a manner that the unit lenses become parallel to the X-axis direction. Subsequently, the second lens sheet 215*c* is placed into the chassis 213. Specifically, the second-pair first optical-sheet-side positioning portion 25A2 and the second-pair second optical-sheet-side positioning portion 25B2 of the second lens sheet 215*c* are respectively engaged with the second-pair first light-guiding-plate-side positioning portion 24A2 and the second-pair second light-guiding-plate-side positioning portion 24B2 as shown in FIG. 22. This engagement positions the second lens sheet 215*c* in the circumferential direction in such a manner that the unit lenses become parallel to the Y-axis direction. Thereafter, as shown in FIG. 15, the reflective polarizer sheet 215*d* is placed into the chassis 213 and then positioned by the positioning structures in the circumferential direction similarly to the diffusion sheet 215*a*.

As described above, in the present embodiment, the backlight device 212 includes the plurality of LEDs 217 arranged at intervals along the circumference thereof. The lamination members include at least the light guide plate 214 which has a substantially circular profile so as to be encircled by the LEDs 217 and which guides the light emitted by the LEDs 217. The optical members include at least the optical sheets 215 which are disposed to overlap the light-exiting side of the light guide plate 214 and which perform an optical operation on the light emitted by the light guide plate 214. In this configuration, when the optical sheets 215 are disposed to overlap the light-exiting side of the light guide plate 214, the positioning structures position the optical sheets 215 relative to the light guide plate 214 in the circumferential direction of the optical sheets 215. Additionally, the optical sheets 215 become less likely to be displaced relative to the light guide plate 214 in the circumferential direction of the optical sheets 215 when, for example, the backlight device 212 is subjected to vibration or impact. That in turn renders the optical sheets 215 less likely to be subjected to abrasion and scratching that could otherwise be caused by friction with the light guide plate 214.

Furthermore, the backlight device 212 includes the chassis 213 into which the LEDs 217, the light guide plate 214, and the optical sheets 215 are placed and which has the sidewall portion 213*b* encircling at least the LEDs 217, the light guide plate 214, and the optical sheets 215. The light guide plate 214, having a substantially circular profile, includes, on parts of the outer circumferential surface thereof facing the LEDs 217, the light-incident faces 214*a* on which the light emitted by the LEDs 217 is incident. The light guide plate 214 further includes the LED-to-LED intervening portions (light-source-to-light-source intervening portions) 23 which project toward the sidewall portion 213*b* relative to the light-incident faces 214*a* and which are interposed between those LEDs 217 which are adjacent in the circumferential direction. The positioning structures are provided on the outer edges of the LED-to-LED intervening portions 23 and the optical sheets 215. In this configuration, the LED-to-LED intervening portions 23 are interposed between those LEDs 217 which are adjacent in the circumferential direction in such a manner as to project toward the sidewall portion 213*b* relative to the light-incident faces 214*a*. The positioning structures are provided on the outer edges of the LED-to-LED intervening portions 23 and the optical sheets 215. Therefore, the positioning structures are less likely to obstruct light propagating in the light guide plate 214, which renders non-uniform luminance and related problems less likely to occur in the light emitted by the backlight device 212. Besides, the sidewall portion 213b of the chassis 213 has no positioning structures. This configuration readily allows for reduction in the thickness of the sidewall portion 213b, thereby providing the backlight device 212 with a narrow frame. Furthermore, the LED-to-LED intervening portions 23 project toward the sidewall portion 213b relative to the light-incident faces 214a. This configuration leaves a smaller gap between the outer circumferential surface of the light guide plate 214, to the exclusion of the light-incident faces 214a, (the external faces of the LED-to-LED intervening portions 23) and the inner circumferential surface of the sidewall portion 213b than without there being any LED-to-LED intervening portions on the light guide plate. Hence, even if light leaks through parts of the outer circumferential surface of the light guide plate 214, to the exclusion of the light-incident faces 214a, in the direction of the sidewall portion 213b, the light is less likely to leak through that gap between the outer circumferential surface of the light guide plate 214 and the inner circumferential surface of the sidewall portion 213b in the direction of the light-exiting side, which can suppress non-uniform luminance and other related problems.

The positioning structures include the light-guiding-plate-side positioning portions 24 and the optical-sheet-side positioning portions 25. The light-guiding-plate-side positioning portions 24 project out of the light guide plate 214 in the direction of the light-exiting side. The optical-sheet-side positioning portions 25 are provided on the optical sheets 215 and mate with the light-guiding-plate-side positioning portions 24. In this configuration, the light-guiding-plate-side positioning portions 24, which mate with the optical-sheet-side positioning portions 25 of the optical sheets 215, project out of the light guide plate 214 in the direction of the light-exiting side. The light-guiding-plate-side positioning portions 24 are therefore less likely to obstruct light propagating in the light guide plate 214 than light-guiding-plate-side positioning portions formed by denting the light guide plate 214 away from the light-exiting side. This feature enables the light guide plate 214 to exhibit the optical performance thereof in a satisfactory manner.

Furthermore, the backlight device 212 includes the chassis 213 into which at least the LEDs 217, the light guide plate 214, and the optical sheets 215 are placed. The light guide plate 214 and the chassis 213 have holding structures that maintain the light guide plate 214 and the chassis 213 in assembled state. In this configuration, the holding structures maintain the light guide plate 214 and the chassis 213 in assembled state. The optical sheets 215, positioned relative to the light guide plate 214, are also positioned relative to the chassis 213.

Embodiment 4

Embodiment 4 of the present invention will be described in reference to FIGS. 23 to 29. This Embodiment 4 differs from Embodiment 3 above in that the concave and convex positioning structures are replaced by convex and concave ones respectively and also in that the positioning structures are disposed in different locations. Note that description of those structures, operations, and effects which are similar to those described in Embodiment 3 above will not be repeated to avoid duplication.

Figure 23:
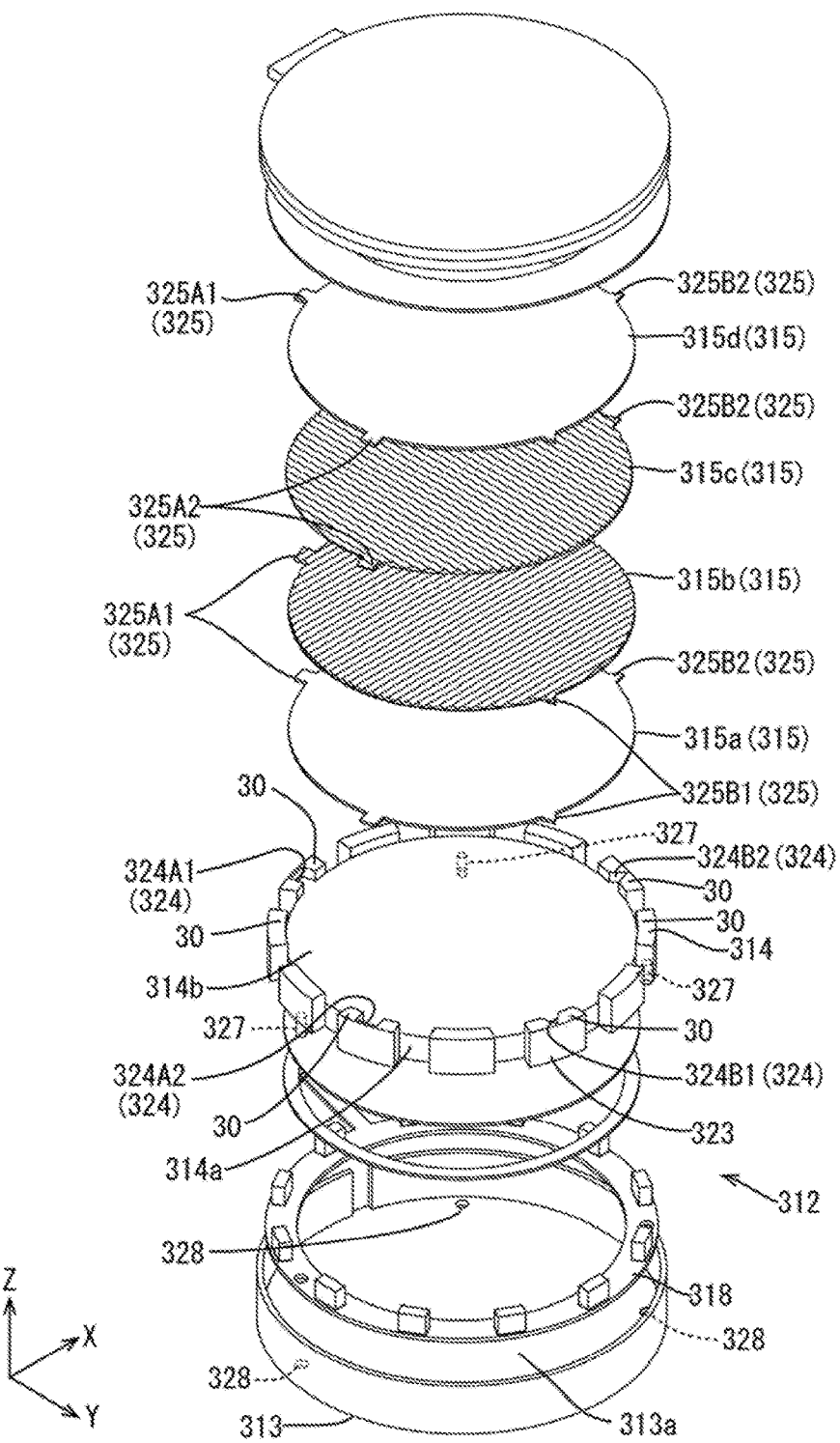
FIG. 23 is an exploded perspective view of a liquid crystal display in accordance with Embodiment 4 of the present invention.
Figure 24:
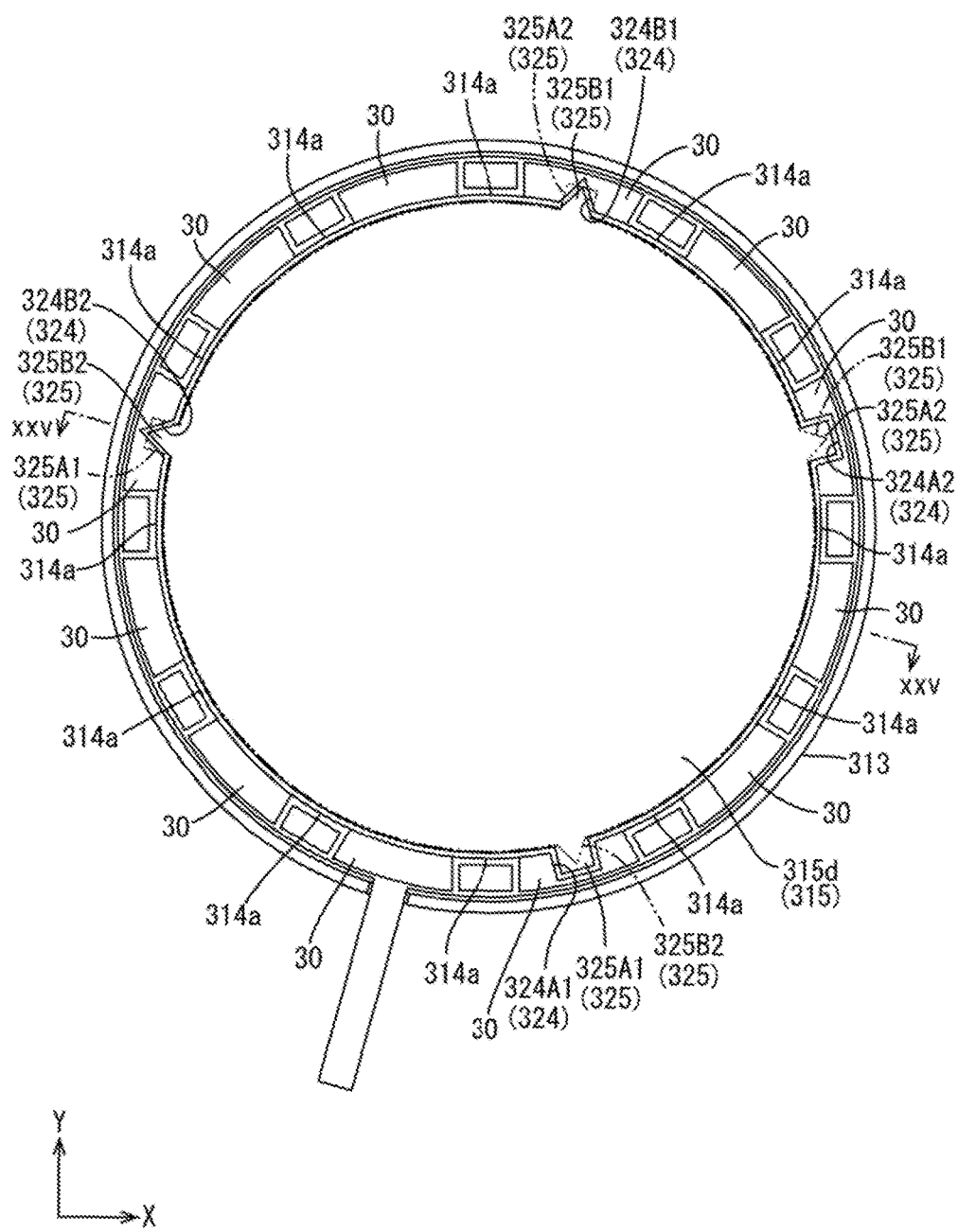
FIG. 24 is a plan view of a backlight device in the liquid crystal display.

Referring to FIGS. 23 and 24, there are provided a total of four positioning structures in the present embodiment as in Embodiments 2 and 3. Two of them, which make up a first pair of positioning structures, differ from each other in shape and size as viewed in plan view and are arranged to make therebetween an angle of approximately 150° ($\alpha$ (degrees), not point-symmetric with respect to the center of the optical members, neither equal to 90° nor equal to 180°). The remaining two, which make up a second pair of positioning structures, differ from each other in shape and size as viewed in plan view and are arranged to make the same angle therebetween as does the first pair ($\alpha$ (degrees)) and also so that the second pair and the first pair make an angle of approximately 90° ($\beta$ (degrees), not equal to $\alpha$ (degrees)) therebetween. The two positioning structures making up the first pair include a first-pair first positioning structure (a first-pair first light-guiding-plate-side positioning portion 324A1 and a first-pair first optical-sheet-side positioning portion 325A1) and a first-pair second positioning structure (a first-pair second light-guiding-plate-side positioning portion 324B1 and a first-pair second optical-sheet-side positioning portion 325B1). The first-pair second positioning structure differs from the first-pair first positioning structure in shape and size as viewed in plan view and makes an angle of approximately 150° ($\alpha$ (degrees)) with the first-pair first positioning structure. The two positioning structures making up the second pair include a second-pair first positioning structure (a second-pair first light-guiding-plate-side positioning portion 324A2 and a second-pair first optical-sheet-side positioning portion 325A2) and a second-pair second positioning structure (a second-pair second light-guiding-plate-side positioning portion 324B2 and a second-pair second optical-sheet-side positioning portion 325B2). The second-pair first positioning structure makes an angle of approximately 90° ($\beta$ (degrees)) with the first-pair first positioning structure. The second-pair second positioning structure differs from the second-pair first positioning structure in shape and size as viewed in plan view, makes an angle of approximately 150° ($\alpha$ (degrees)) with the second-pair first positioning structure, and makes an angle of approximately 90° ($\beta$ (degrees)) with the first-pair second positioning structure.

These optical-sheet-side positioning portions 325 constituting the positioning structures described above each project radially outward out of the outer circumference end face of a optical sheet 315. In contrast, a light guide plate 314 has LED-to-LED intervening portions 323 each of which has a light-guiding-plate-side protrusion portion 30 projecting out of a light-exiting face 314b in the direction of the front side. Each light-guiding-plate-side positioning portion 324 constituting a positioning structure is provided by denting a specific one of these light-guiding-plate-side protrusion portions 30. To describe it in more detail, each LED-to-LED intervening portion 323 has a different one of the light-guiding-plate-side protrusion portions 30. Those four of the light-guiding-plate-side protrusion portions 30 which are superimposed on the optical-sheet-side positioning portions 325 as viewed in plan view have the light-guiding-plate-side positioning portions 324 formed thereon by denting the inner wall faces of the light-guiding-plate-side protrusion portions 30 in such a manner that the inner wall faces can come to have a planar shape that follows the planar shape of the optical-sheet-side positioning portions 325. In this configuration, the optical-sheet-side positioning portions 325, being convex, can mate with the respective light-guiding-plate-side positioning portions 324 which are concave. Each optical sheet 315 has an outer diameter that is slightly shorter than the distance from the center of the light guide plate 314 to the inner wall face (light-incident face 314a) of the light-guiding-plate-side protrusion portion 30. This specification prevents the outer edge from moving onto the light-guiding-plate-side protrusion portion 30. Additionally, as in Embodiment 3 described above, the optical-sheet-side positioning portions 325 in the first and second pairs, making up the four positioning structures, are provided on the outer peripheral portions of a diffusion sheet 315a and a reflective polarizer sheet 315d (four on each outer peripheral portion). On the other hand, the optical-sheet-side positioning portions 325 are provided on the outer peripheral portions of a first lens sheet 315b and a second lens sheet 315c (two of the first pair and two of the second pair on each outer peripheral portion). A single type of component can therefore be used as both the first lens sheet 315b and the second lens sheet 315c, which allows for reduction in manufacturing cost.

Figure 25:
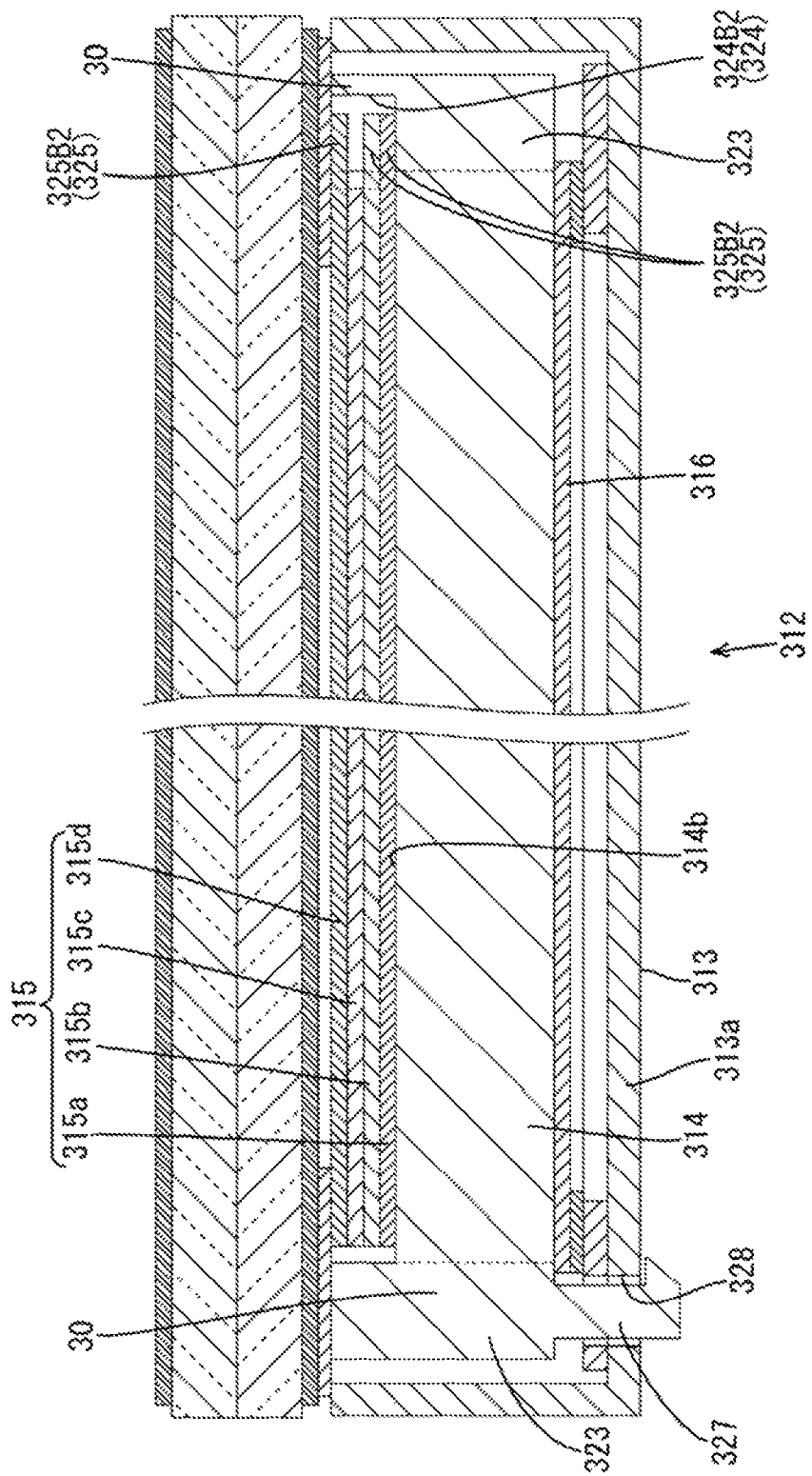
FIG. 25 is a cross-sectional view taken along line xxv-xxv in FIG. 24.
Figure 26:
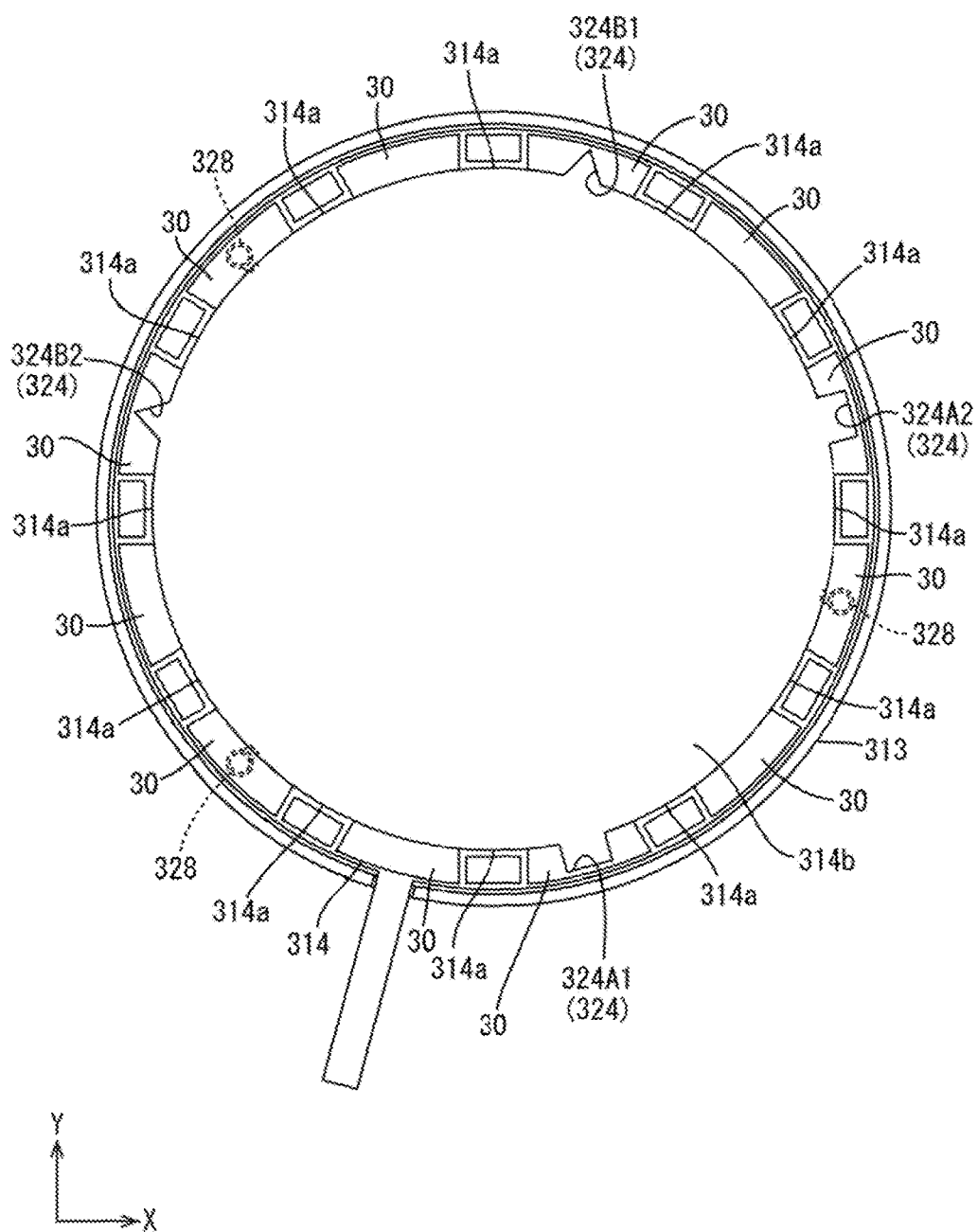
FIG. 26 is a plan view of a light guide plate inside a chassis.
Figure 27:
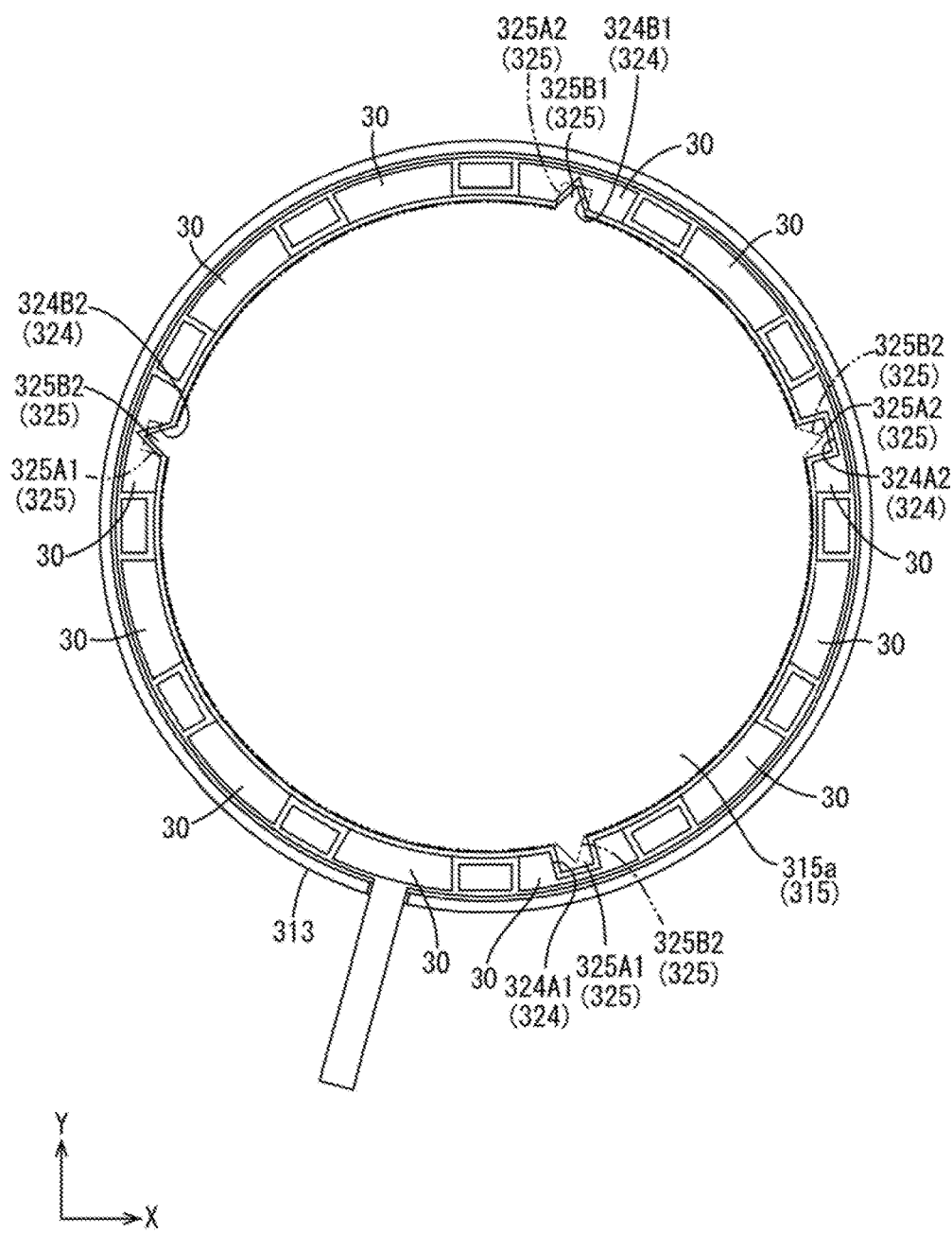
FIG. 27 is a plan view of a diffusion sheet inside the chassis.

Next, an assembly procedure for a backlight device 312 in accordance with the present embodiment will be described. An LED substrate 318 is placed into a chassis 313. A reflective sheet 316 and the light guide plate 314 are then sequentially placed as shown in FIG. 26. Now, the light guide plate 314 is held in place and positioned in the circumferential direction as shown in FIG. 25, by light-guiding-plate-side holding portions 327 being put through chassis-side holding portions 328 in a bottom wall portion 313a of the chassis 313, caught onto the hole edge portions thereof from the back side, and further moved in the circumferential direction into contact with the hole edge portions. Thereafter, as shown in FIG. 27, the diffusion sheet 315a is placed into the chassis 313. If the diffusion sheet 315a is in an appropriate position relative to the light guide plate 314 in the circumferential direction, the four light-guiding-plate-side positioning portions 324 engage the associated optical-sheet-side positioning portions 325 so that the diffusion sheet 315a is positioned relative to the light guide plate 314 in the circumferential direction.

Figure 28:
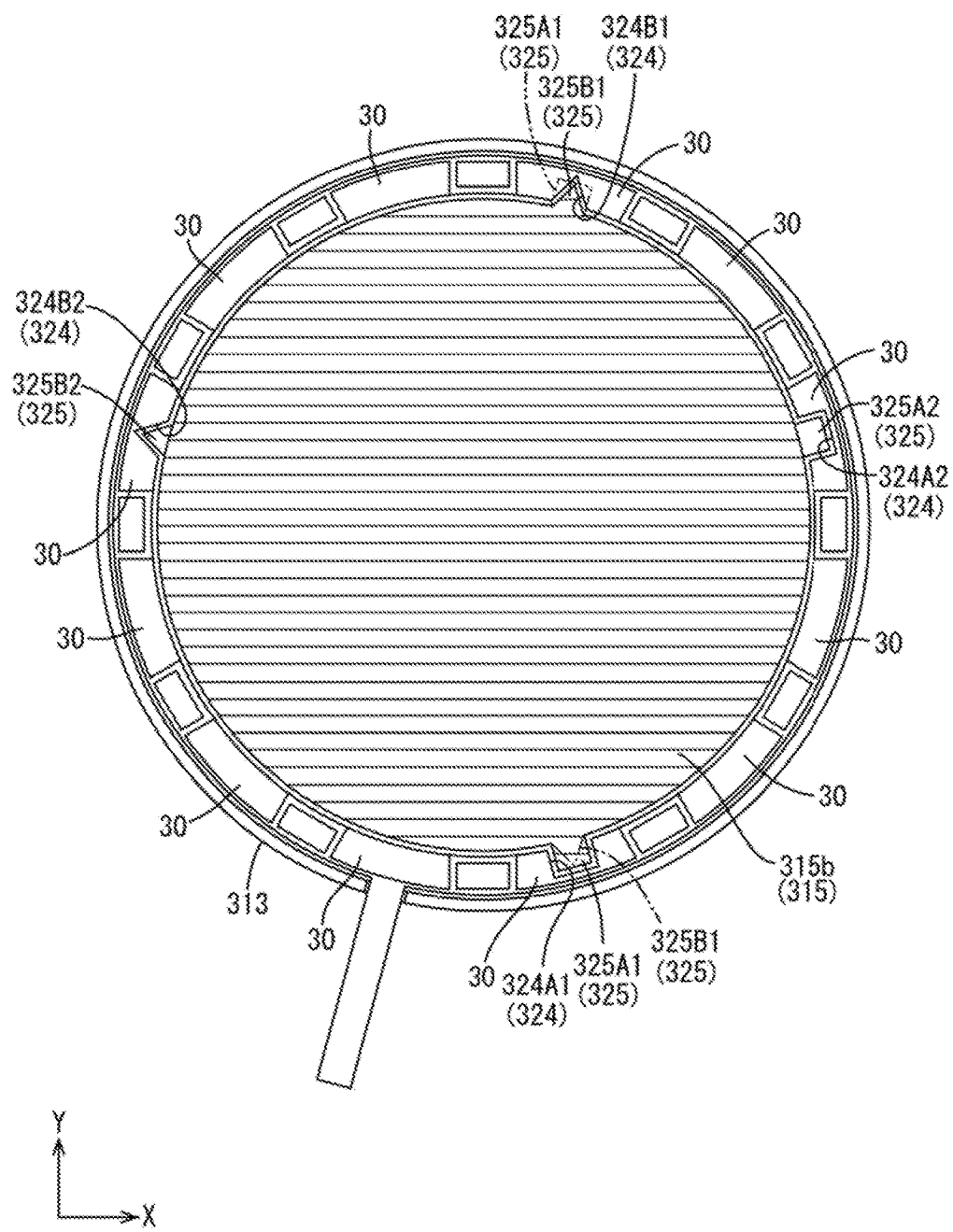
FIG. 28 is a plan view of a first lens sheet inside the chassis.
Figure 29:
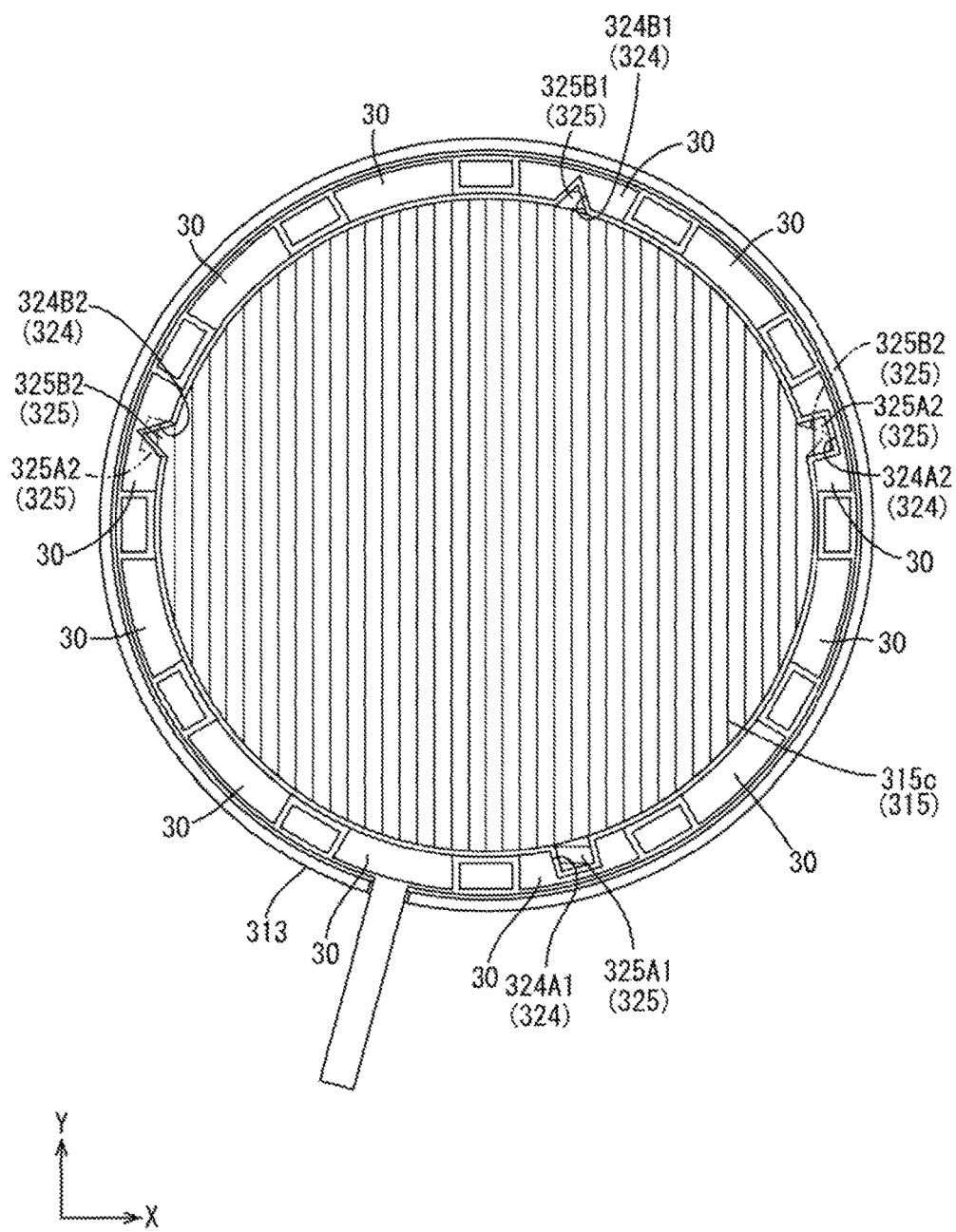
FIG. 29 is a plan view of a second lens sheet inside the chassis.

Next, referring to FIG. 28, the first lens sheet 315b is placed into the chassis 313. In this step, the first-pair first optical-sheet-side positioning portion 325A1 and the first-pair second optical-sheet-side positioning portion 325B1 of the first lens sheet 315b are respectively engaged with the first-pair first light-guiding-plate-side positioning portion 324A1 and the first-pair second light-guiding-plate-side positioning portion 324B1. This engagement positions the first lens sheet 315b in the circumferential direction in such a manner that the unit lenses become parallel to the X-axis direction. Subsequently, the second lens sheet 315c is placed into the chassis 313. Specifically, the second-pair first optical-sheet-side positioning portion 325A2 and the second-pair second optical-sheet-side positioning portion 325B2 of the second lens sheet 315c are respectively engaged with the second-pair first light-guiding-plate-side positioning portion 324A2 and the second-pair second light-guiding-plate-side positioning portion 324B2 as shown in FIG. 29. This engagement positions the second lens sheet 315c in the circumferential direction in such a manner that the unit lenses become parallel to the Y-axis direction. Thereafter, as shown in FIG. 15, the reflective polarizer sheet 315d is placed into the chassis 313 and then positioned by the positioning structures in the circumferential direction similarly to the diffusion sheet 315a.

Embodiment 5

Embodiment 5 of the present invention will be described in reference to FIG. 30. This Embodiment 5 differs from Embodiment 3 above in that the concave and convex holding structures are replaced by convex and concave ones respectively. Note that description of those structures, operations, and effects which are similar to those described in Embodiment 3 above will not be repeated to avoid duplication.

Figure 30:
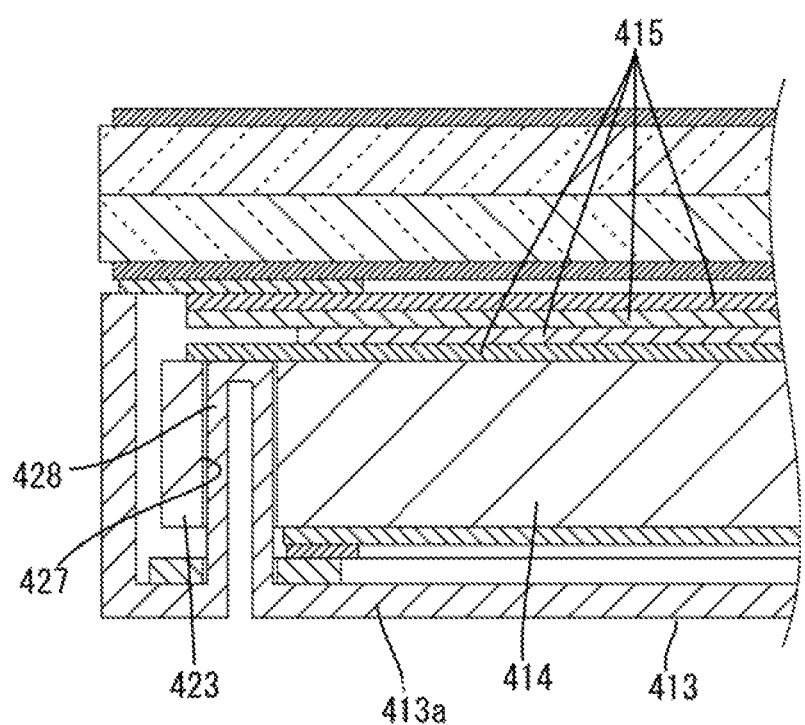
FIG. 30 is a cross-sectional view of a liquid crystal display in accordance with Embodiment 5 of the present invention.

Referring to FIG. 30, the holding structures in accordance with the present embodiment include light-guiding-plate-side holding portions 427 and chassis-side holding portions 428. Each light-guiding-plate-side holding portion 427 is shaped like a hole running through the thickness of an LED-to-LED intervening portion 423 of a light guide plate 414. Each chassis-side holding portion 428 projects out of a part of a bottom wall portion 413a of a chassis 413 in the direction of the front side. The light guide plate 414 is held and positioned relative to the chassis 413 in the circumferential direction by the chassis-side holding portions 428 being put through the light-guiding-plate-side holding portions 427 into contact with hole edge portions thereof in the circumferential direction. Therefore, the light guide plate 414 and optical sheets 415, which are positioned relative to the light guide plate 414, are positioned relative to the chassis 413 in the circumferential direction. This configuration can achieve operations and effects that are similar to those achieved in Embodiment 3.

Embodiment 6

Embodiment 6 of the present invention will be described in reference to FIG. 31. In this Embodiment 6, changes are made to the configuration of the positioning structures of Embodiment 3 above. Note that description of those structures, operations, and effects which are similar to those described in Embodiment 3 above will not be repeated to avoid duplication.

Figure 31:
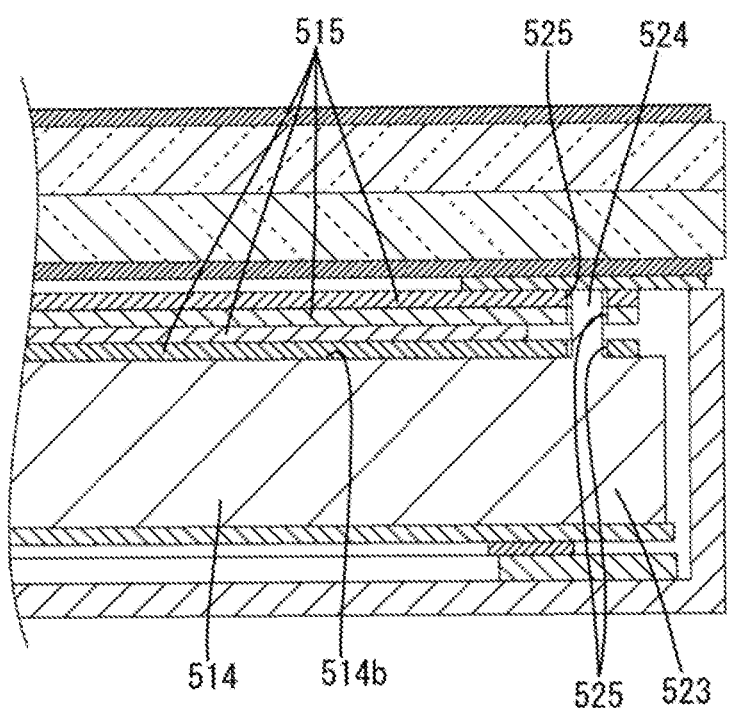
FIG. 31 is a cross-sectional view of a liquid crystal display in accordance with Embodiment 6 of the present invention.

Referring to FIG. 31, each light-guiding-plate-side positioning portions 524 in accordance with the present embodiment is shaped like a column projecting out of a light-exiting face 514b of an LED-to-LED intervening portion 523 of a light guide plate 514 in the direction of the front side. Each optical-sheet-side positioning portions 525 is shaped like a hole running through the thickness of the outer edge of an optical sheet 515. This configuration can achieve operations and effects that are similar to those achieved in Embodiment 3.

Embodiment 7

Embodiment 7 of the present invention will be described in reference to FIGS. 32 and 33. In this Embodiment 7, changes are made to the configuration of the positioning structures of Embodiment 1 above. Note that description of those structures, operations, and effects which are similar to those described in Embodiment 1 above will not be repeated to avoid duplication.

Figure 32:
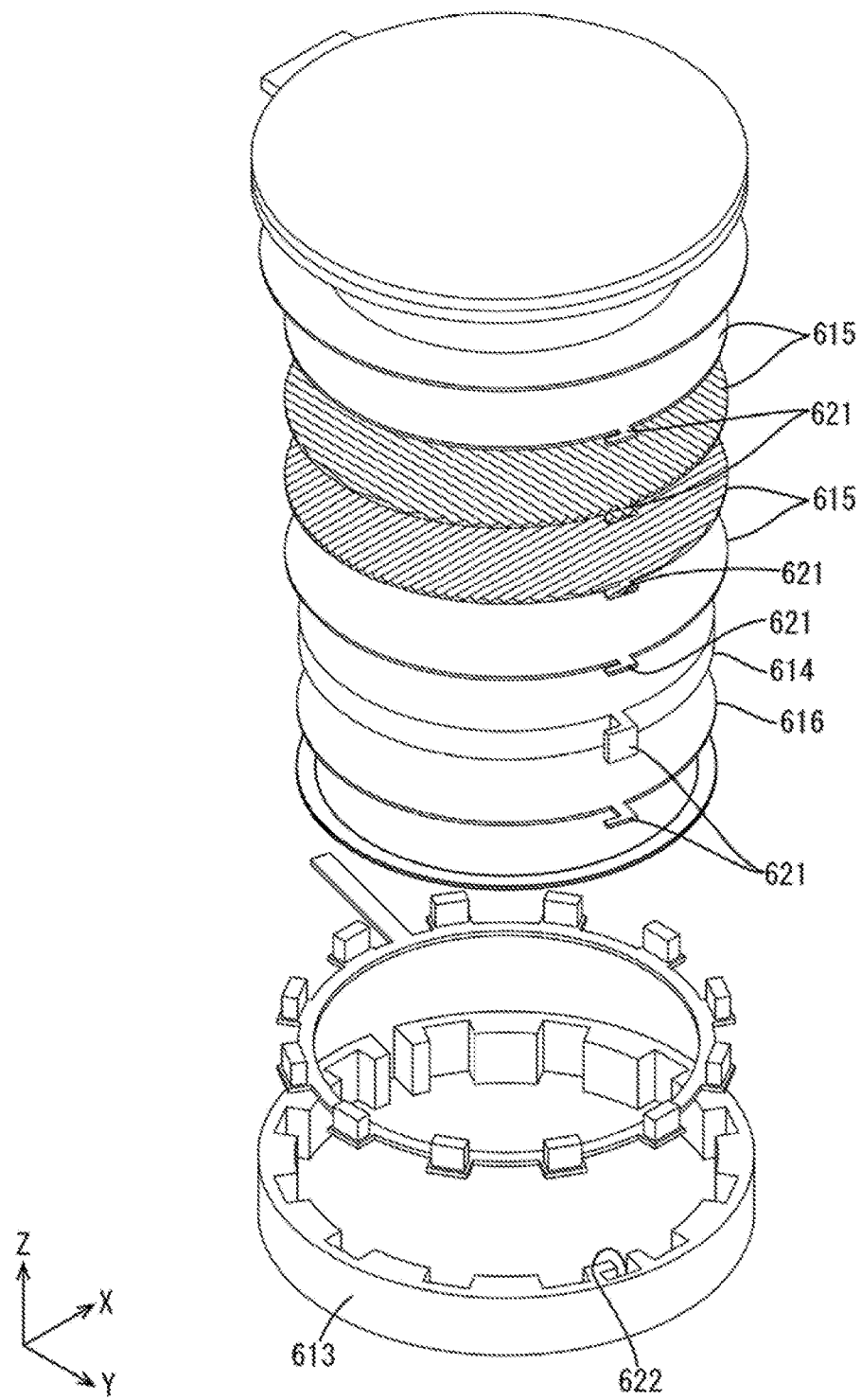
FIG. 32 is an exploded perspective view of a liquid crystal display in accordance with Embodiment 7 of the present invention.
Figure 33:
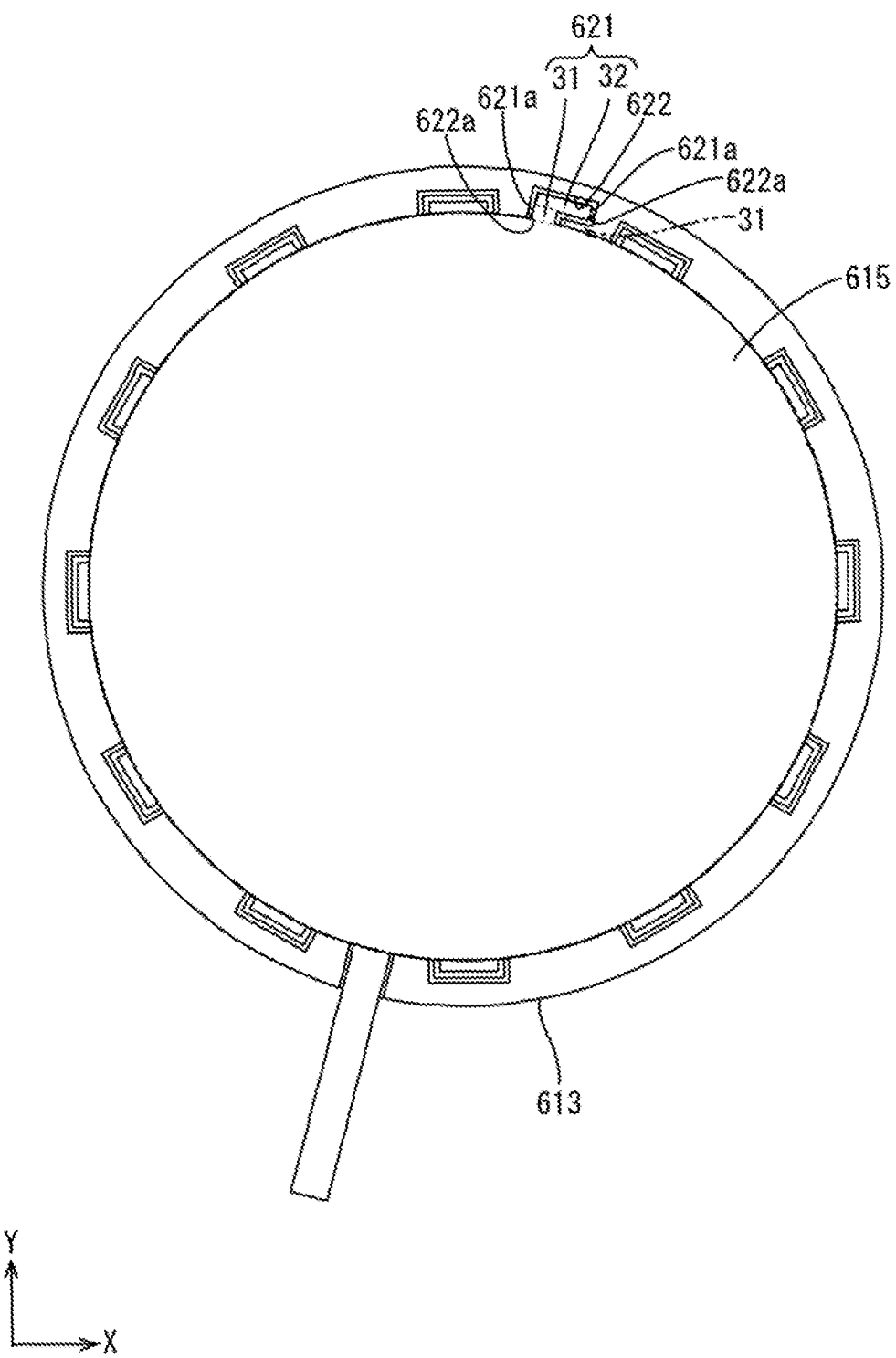
FIG. 33 is a plan view of a backlight device in the liquid crystal display.

Referring to FIGS. 32 and 33, in accordance with the present embodiment, there is provided only one positioning structure that is non-line symmetric in shape as viewed in plan view. To describe it in more detail, convex positioning portions (optical-member-side positioning portions) 621 and concave positioning portions (lamination-member-side positioning portions, housing-side positioning portions) 622, which make up the positioning structure, are shaped like an asymmetric letter "L" (shaped like a hook) as viewed in plan view. Each convex positioning portion 621 includes a radial protrusion portion 31 and a circumferential protrusion portion 32. The radial protrusion portions 31 project radially outward out of the outer circumference end faces of a reflective sheet 616, a light guide plate 614, and optical sheets 615. The circumferential protrusion portions 32 project only in one of circumferential directions out of the projecting tips of the radial protrusion portions 31. Therefore, when the reflective sheet 616, the light guide plate 614, and the optical sheets 615 are to be placed into a chassis 613, if these members are in the flipped, incorrect position with the front and back thereof reversed, the radial protrusion portions 31 move onto the edge portions of the concave positioning portions 622 as indicated by a dash-double-dot line in FIG. 33, thereby interrupting the assembling in reverse position. On the other hand, if the reflective sheet 616, the light guide plate 614, and the optical sheets 615 are in the correct position in terms of the front and back thereof, the reflective sheet 616, the light guide plate 614, and the optical sheets 615 are positioned relative to the chassis 613 in the circumferential direction, by the convex positioning portions 621 being inserted into the concave positioning portions 622 so that contact faces 621a and 622a of the convex and concave positioning portions 621 and 622 can move into contact with each other in the circumferential direction. In this manner, the single positioning structure allows for positioning in the circumferential direction and interruption of assembling in reverse position. This feature is preferable, for example, for simplification of the configuration.

As described above, in the present embodiment, the positioning structure is non-line symmetric in shape as viewed in the direction in which the light guide plate 614, the optical sheets 615, and the reflective sheet 616 (combination of optical members) overlap the chassis 613 (lamination member). In this configuration, the light guide plate 614, the optical sheets 615, and the reflective sheet 616 (combination of optical members) are positioned relative to the chassis 613 (lamination member) in the circumferential direction. In addition, if the light guide plate 614, the optical sheets 615, and the reflective sheet 616 (combination of optical members) are to be disposed in the flipped, incorrect position to overlap the chassis 613 (lamination member), the positioning structure, which is asymmetric in shape as viewed in the overlapping direction, does not fit together, thereby interrupting the assembling of the light guide plate 614, the optical sheets 615, and the reflective sheet 616 (combination of optical members) and preventing these optical members from being assembled in the flipped position.

Embodiment 8

Embodiment 8 of the present invention will be described in reference to FIGS. 34 to 38. In this Embodiment 8, changes are made, for example, to the number of positioning structures of Embodiment 7 above. Note that description of those structures, operations, and effects which are similar to those described in Embodiment 7 above will not be repeated to avoid duplication.

Figure 34:
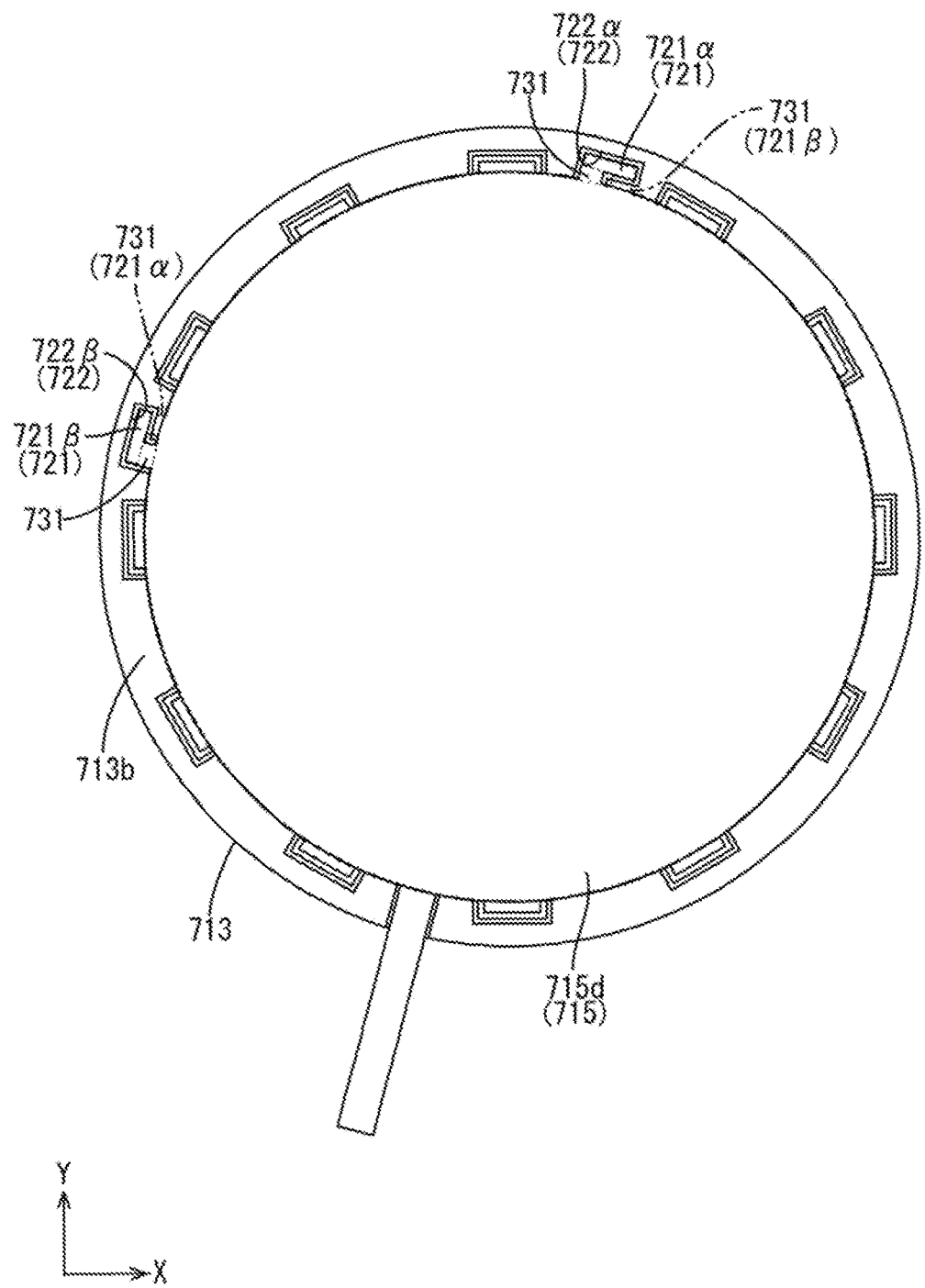
FIG. 34 is a plan view of a backlight device in a liquid crystal display in accordance with Embodiment 8 of the present invention.

Referring to FIG. 34, in accordance with the present embodiment, there are provided two positioning structures that are arranged to make an angle of approximately 90° therebetween. These two positioning structures include convex positioning portions 721 and concave positioning portions 722 that are identical in shape and size as viewed in plan view. Note that throughout the following description, the two positioning structures will be distinguished from each other, where necessary, by adding a suffix "α" to the reference number of one of the positioning structures and adding a suffix "β" to the reference number of the other positioning structure. Where there is no such need, the positioning structures will be collectively denoted without adding a suffix to the reference numbers thereof.

Figure 35:
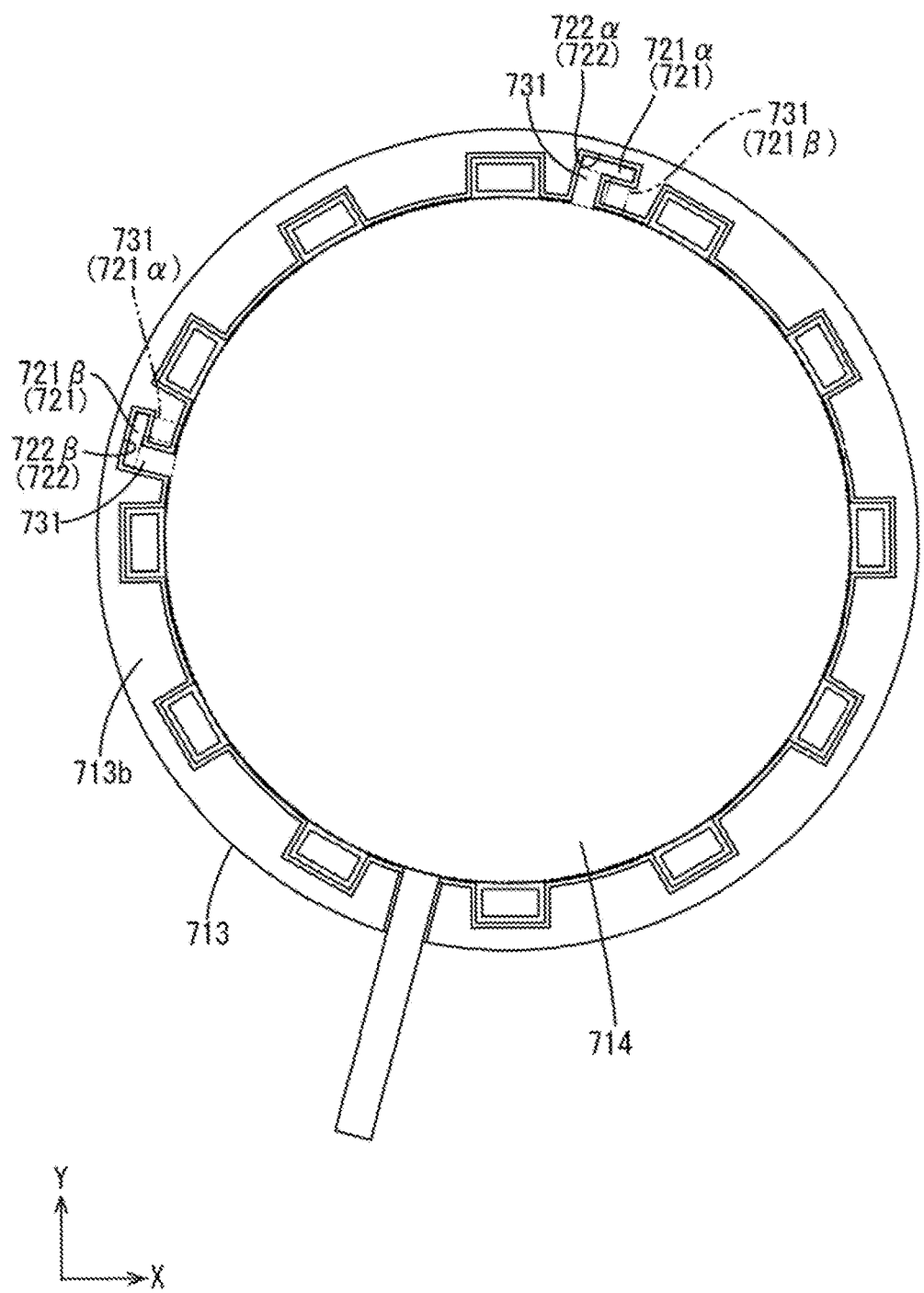
FIG. 35 is a plan view of a light guide plate inside a chassis.
Figure 36:
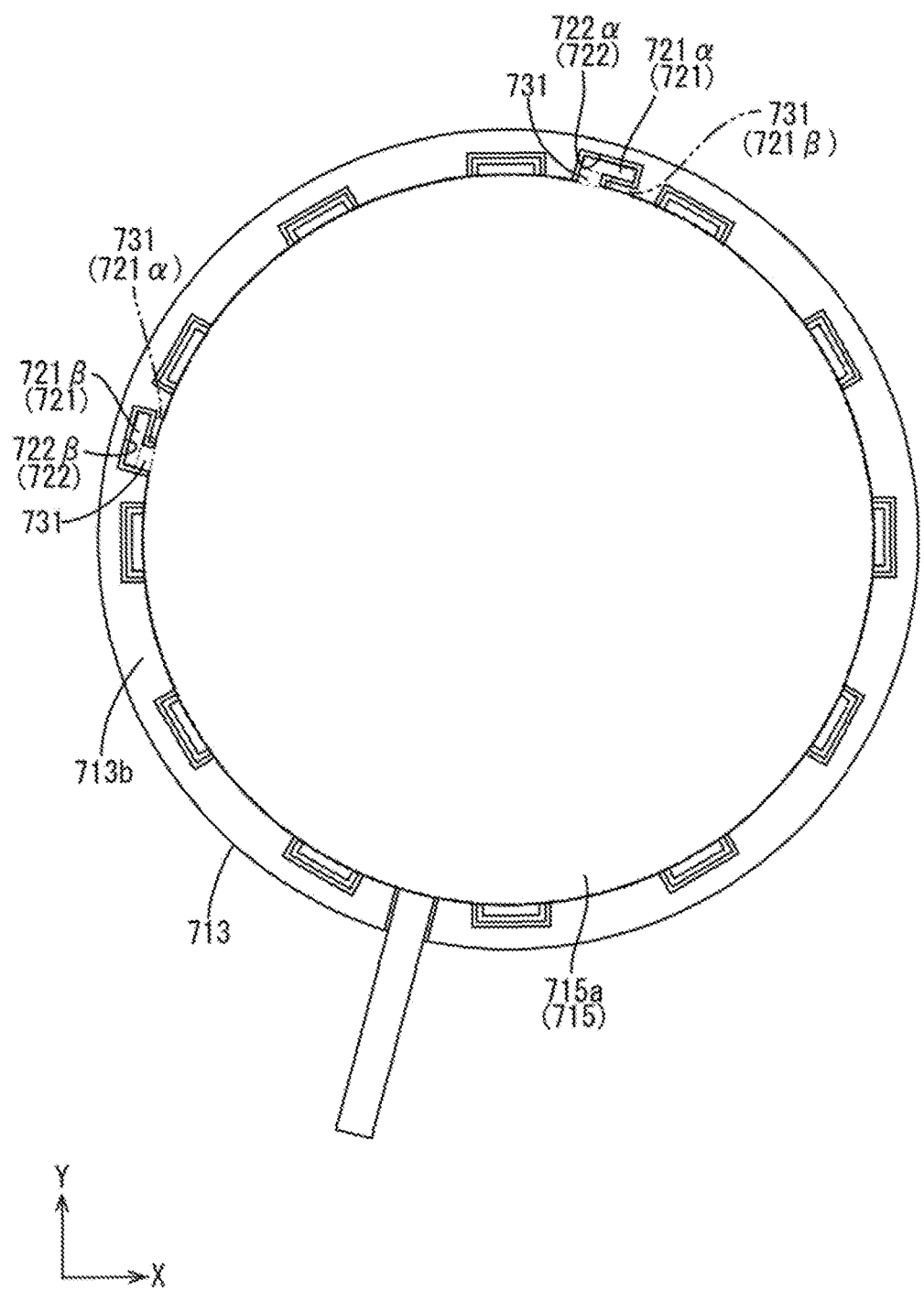
FIG. 36 is a plan view of a diffusion sheet inside the chassis.
Figure 37:
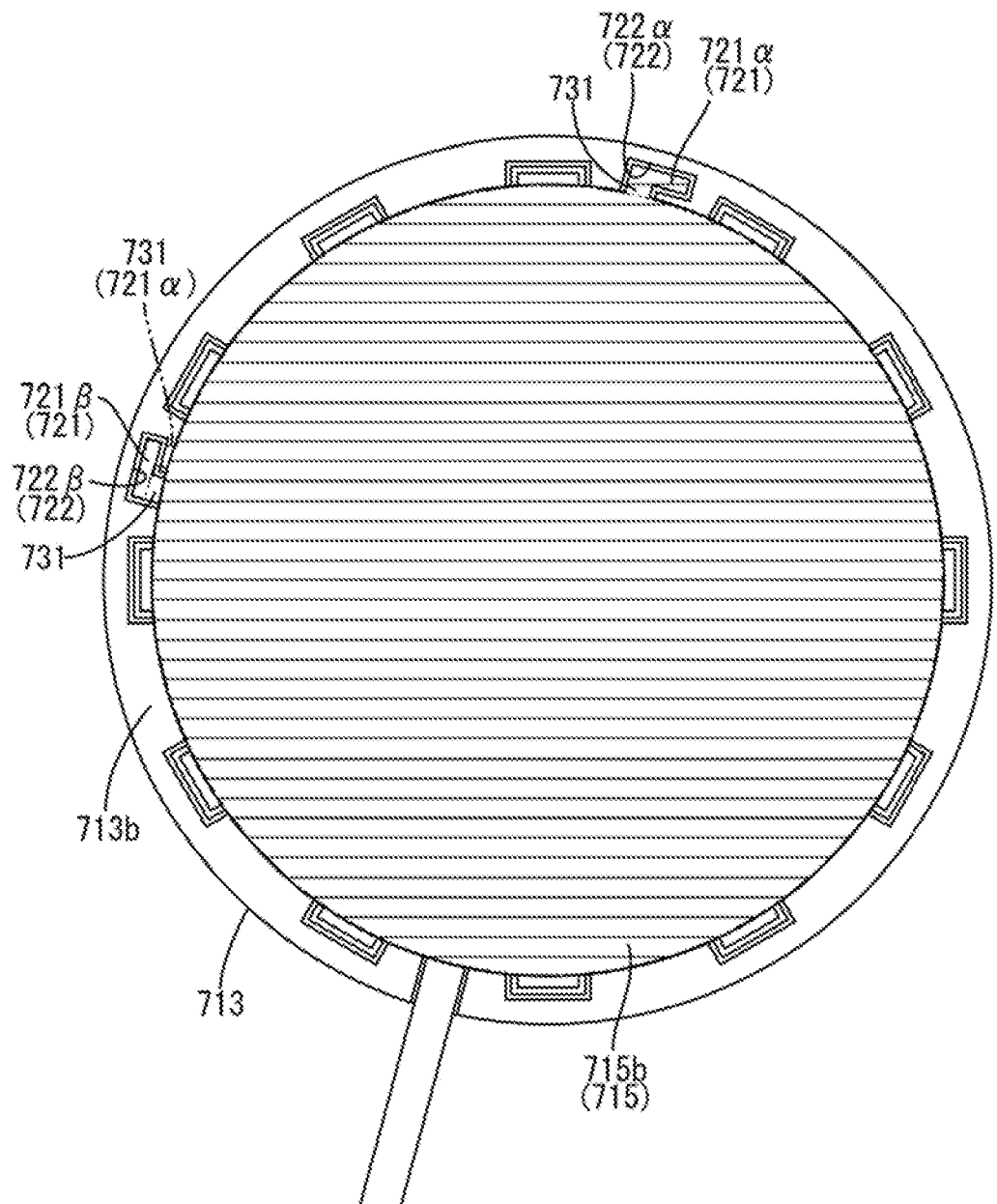
FIG. 37 is a plan view of a first lens sheet inside the chassis.
Figure 38:
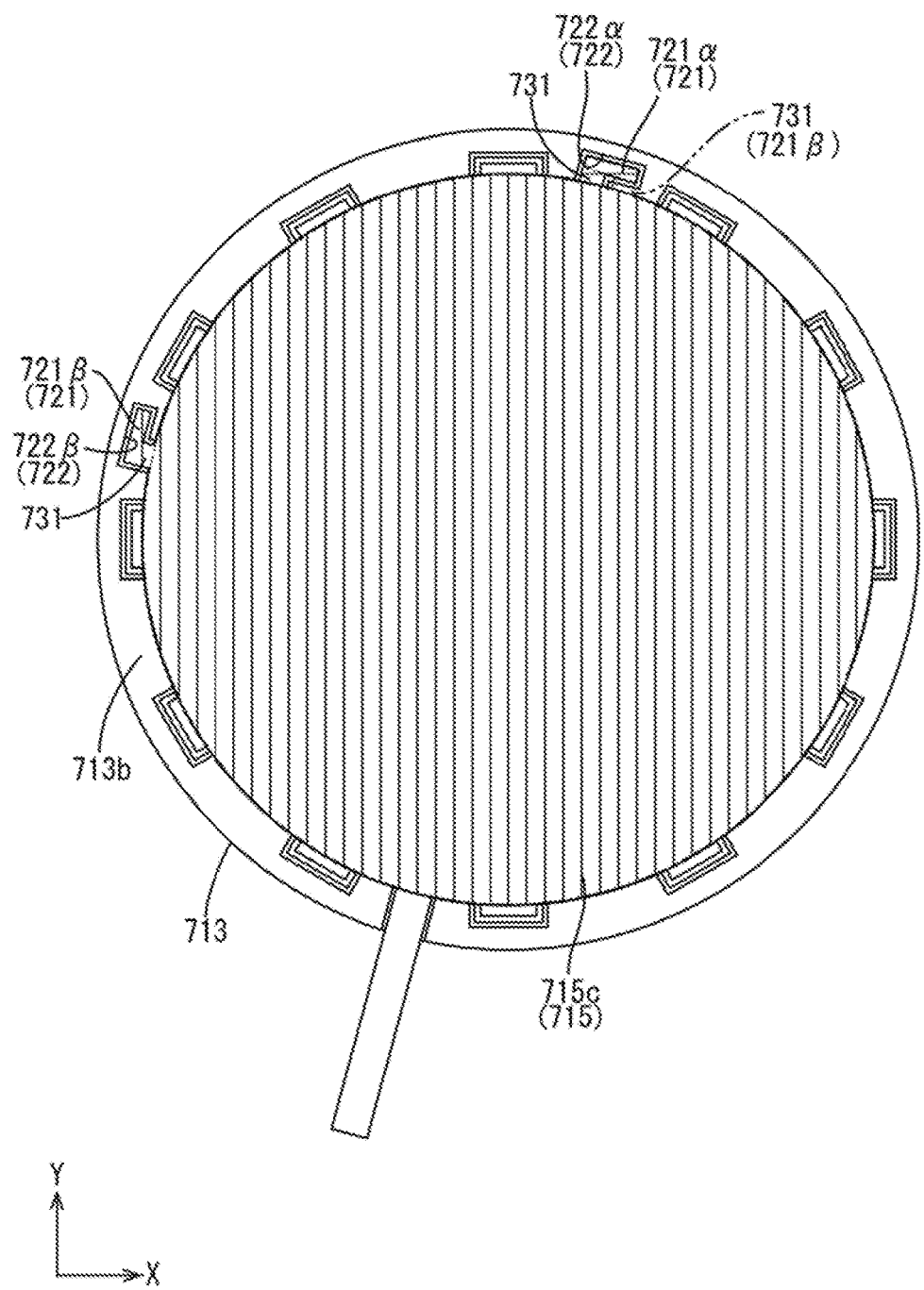
FIG. 38 is a plan view of a second lens sheet inside the chassis.

One of the two positioning structures (concave positioning portions 722α) and the other positioning structure (concave positioning portions 722β) are formed by denting parts of the inner circumferential surface of a sidewall portion 713b of a chassis 713. Meanwhile, one of the two positioning structures (convex positioning portions 721α) and the other positioning structure (convex positioning portions 721β) are provided on the outer peripheral portions of a light guide plate 714, a diffusion sheet 715a, a reflective polarizer sheet 715d, and a reflective sheet (four on each outer peripheral portion) as shown in FIGS. 34 to 36 and on the outer peripheral portions of a first lens sheet 715b and a second lens sheet 715c (one on each outer peripheral portion) as shown in FIGS. 37 and 38. Specifically, the outer peripheral portion of the first lens sheet 715b is provided only with the convex positioning portion 721α as shown in FIG. 37, whereas the outer peripheral portion of the second lens sheet 715c is provided only with the convex positioning portion 721β. As described earlier, the convex positioning portion 721α, which is one of the positioning structures, and the convex positioning portion 721β, which is the other positioning structure, are identical in shape and size as viewed in plan view and arranged to make therebetween an angle of approximately 90° in the circumferential direction. Meanwhile, the extension direction (X-axis direction) of the unit lenses in the first lens sheet 715b is perpendicular to the extension direction (Y-axis direction) of the unit lenses in the second lens sheet 715c. Therefore, the first lens sheet 715b and the second lens sheet 715c structurally match each other if either of them is rotated by an angle of approximately 90° in the circumferential direction. A single type of component can therefore be used as both the first lens sheet 715b and the second lens sheet 715c, which allows for reduction in manufacturing cost.

Next, an assembly procedure for a backlight device 712 in accordance with the present embodiment will be described. An LED substrate is placed into the chassis 713. A reflective sheet and the light guide plate 714 are then sequentially placed as shown in FIG. 35. If the reflective sheet and the light guide plate 714 are in appropriate positions relative to the chassis 713 in the circumferential direction, the two convex positioning portions 721 engage the associated concave positioning portions 722 so that the reflective sheet and the light guide plate 714 are positioned relative to the chassis 713 in the circumferential direction. Thereafter, as shown in FIG. 36, the diffusion sheet 715a is placed into the chassis 713 and then positioned by the positioning structures in the circumferential direction similarly to the reflective sheet and the light guide plate 714.

Next, referring to FIG. 37, the first lens sheet 715b is placed into the chassis 713. In this step, the convex positioning portion 721α of the first lens sheet 715b is inserted into the concave positioning portion 722α. This insertion positions the first lens sheet 715b in the circumferential direction in such a manner that unit lenses become parallel to the X-axis direction. Subsequently, the second lens sheet 715c is placed into the chassis 713. Specifically, the convex positioning portion 721β of the second lens sheet 715c is inserted into the concave positioning portion 722β as shown in FIG. 13. This insertion positions the second lens sheet 715c in the circumferential direction in such a manner that the unit lenses become parallel to the Y-axis direction. Thereafter, as shown in FIG. 34, the reflective polarizer sheet 715d is placed into the chassis 713 and then positioned by the positioning structures in the circumferential direction similarly to the diffusion sheet 715a.

If the reflective sheet, the light guide plate 714, the diffusion sheet 715a, and the reflective polarizer sheet 715d are in the flipped, incorrect position with the front and back thereof reversed when these members are to be placed into the chassis 713, the assembling of the members is interrupted. Specifically, as indicated by a dash-double-dot line in FIGS. 34 to 36, the convex positioning portion 721α has a radial protrusion portion 731 thereof moving onto the edge portion of the concave positioning portion 722β, and the convex positioning portion 721β has a radial protrusion portion 731 thereof moving onto the edge portion of the concave positioning portion 722α. This movement interrupts the assembling in reverse position. If the first lens sheet 715b is in the flipped, incorrect position with the front and back thereof reversed, the radial protrusion portion 731 of the convex positioning portion 721α moves onto the edge portion of the concave positioning portion 722β as indicated by a dash-double-dot line in FIG. 37, which interrupts the assembling in reverse position. If the second lens sheet 715c is in the flipped, incorrect position with the front and back thereof reversed, the radial protrusion portion 731 of the convex positioning portion 721β moves onto the edge portion of the concave positioning portion 722α as indicated by a dash-double-dot line in FIG. 38, which interrupts the assembling in reverse position. If any of the reflective sheet, the light guide plate 714, and an optical sheet 715 is/are prevented by the positioning structures from being assembled in this manner, that member/those members may be flipped back-to-front to the correct position before being subjected to the assembling process once again.

Other Embodiments

The present invention is by no means constrained to the embodiments described in the description above in reference to drawings. The following embodiments, as examples, are also encompassed in the technical scope of the present invention.

(1) In Embodiment 1 described above, the angle between the first positioning structure and the second positioning structure in the circumferential direction is approximately 90°. Alternatively, the angle may assume any suitable, specific numeric value that is not equal to 180°, in other words, may assume any suitable, specific numeric value provided that the first positioning structure and the second positioning structure are not point-symmetric with respect to the center of the optical members.

(2) In Embodiments 2 and 3 described above, the angle between the first positioning structure and the second positioning structure in each pair in the circumferential direction ($\alpha$ (degrees)) is approximately 60°. Alternatively, the angle may assume any suitable, specific numeric value that is neither equal to 90° nor equal to 180°, in other words, may assume any suitable, specific numeric value provided that the first positioning structure and the second positioning structure are not point-symmetric with respect to the center of the optical members and also that the specified angle differs from the angle between the positioning structures in the first pair and the positioning structures in the second pair ($\beta$ (degrees)).

(3) In Embodiment 4 described above, the angle between the first positioning structure and the second positioning structure in each pair in the circumferential direction ($\alpha$ (degrees)) is approximately 150°. Alternatively, the angle may assume any suitable, specific numeric value that is neither equal to 90° nor equal to 180°, in other words, may assume any suitable, specific numeric value provided that the first positioning structure and the second positioning structure are not point-symmetric with respect to the center of the optical members and also that the specified angle differs from the angle between the positioning structures in the first pair and the positioning structures in the second pair ($\beta$ (degrees)).

(4) In Embodiment 8 described above, the angle between one of the positioning structures and the other positioning structure in the circumferential direction is approximately 90°. Alternatively, the angle may assume any suitable, specific numeric value, in other words, may assume any suitable, specific numeric value provided that where there is a need to arrange a plurality of optical sheets of the same structure at a specific angular interval ($\beta$ (degrees)), the specific angular interval (angle) coincides with the angular interval between one of the positioning structures and the other positioning structure in the circumferential direction. When this is actually the case, the optical sheets of the same structure may be any optical sheets that are not lens sheets.

(5) In Embodiments 2 to 6 described above, the angle between the positioning structures in the first pair and the positioning structures in the second pair in the circumferential direction ($\beta$ (degrees)) is approximately 90°. Alternatively, the angle may assume any suitable, specific numeric value provided that the positioning structures in the first pair and the positioning structures in the second pair are not point-symmetric with respect to the center of the optical members and also that the specified angle differs from the angle between the two positioning structures in each pair ($\alpha$ (degrees)), in other words, may assume any suitable, specific numeric value provided that where there is a need to arrange a plurality of optical sheets of the same structure at a specific angular interval ($\beta$ (degrees)), the specific angular interval (angle) coincides with the angular interval between the positioning structures in the first pair and the positioning structures in the second pair in the circumferential direction. When this is actually the case, the optical sheets of the same structure may be any optical sheets that are not lens sheets.

(6) In Embodiments 2 to 6 described above, two pairs of positioning structures (a total of four) are provided. Alternatively, three or more pairs of positioning structures (a total of six or more) may be provided.

(7) In Embodiment 8 described above, two positioning structures are provided. Alternatively, three or more positioning structures may be provided.

(8) The positioning structures may assume any asymmetric planar shape apart from those described in Embodiments 7 and 8 above.

(9) In Embodiments 1 to 4 described above, the first positioning structures and the second positioning structures differ in both shape and size as viewed in plan view. Alternatively, the first positioning structures and the second positioning structures may share the same (mathematically similar) shape as viewed in plan view, differing only in size as viewed in plan view.

(10) In Embodiments 1 and 2 described above, the concave positioning portions are provided in parts of the sidewall portion of the chassis where no LED-containing concave portions are formed, so as to be isolated from the LED-containing concave portions. Alternatively, the concave positioning portions may be, for example, spatially continuous with the LED-containing concave portions.

(11) In Embodiments 1 and 2 described above, the concave positioning portions are provided on the sidewall portion of the chassis, and the convex positioning portions are provided on the outer edges of the reflective sheet, the light guide plate, and the optical sheets. Alternatively, this concavity-convexity relationship may be reversed. Specifically, the convex positioning portions may be provided on the sidewall portion of the chassis, and the concave positioning portions may be provided on the outer edges of the reflective sheet, the light guide plate, and the optical sheets.

(12) In Embodiments 3 to 6 described above, the light-guiding-plate-side positioning portions are provided in the LED-to-LED intervening portions of the light guide plate. Alternatively, the light-guiding-plate-side positioning portions may be provided on parts of the light guide plate where no LED-to-LED intervening portions are provided.

(13) In Embodiments 3 to 6 described above, the light-guiding-plate-side holding portions are provided in the LED-to-LED intervening portions of the light guide plate. Alternatively, the light-guiding-plate-side holding portions may be provided on parts of the light guide plate where no LED-to-LED intervening portions are provided.

(14) In Embodiments 3, 5, and 6 described above, the light-guiding-plate-side positioning portions are provided to project out of the light-exiting face of the light guide plate in the direction of the front side. Alternatively, the light-guiding-plate-side positioning portions may be provided by denting the light-exiting face of the light guide plate.

(15) In Embodiment 4 described above, the light-guiding-plate-side positioning portions are provided by denting the light-guiding-plate-side protrusion portion that projects out of the light-exiting face of the light guide plate in the direction of the front side. Alternatively, the light-guiding-plate-side positioning portions may be provided by projecting the inner wall face of the light-guiding-plate-side protrusion portion radially inward. When this is actually the case, the optical-sheet-side positioning portions may be provided by denting parts of the outer edge of each optical sheet.

(16) In Embodiment 4 described above, every LED-to-LED intervening portion of the light guide plate is provided with a light-guiding-plate-side protrusion portion. Alternatively, only some LED-to-LED intervening portions may be provided with a light-guiding-plate-side protrusion portion. When this is actually the case, a light-guiding-plate-side protrusion portion may be provided selectively only in the LED-to-LED intervening portions in which there is provided a light-guiding-plate-side positioning portion.

(17) Suitable changes may be made, for example, to the number of holding structures, the arrangement of the holding structures in the circumferential or radial direction apart from the configurations described in Embodiments 3 to 6 above.

(18) In each embodiment described above, each positioning structure is separated by substantially equal distances from the LEDs that are immediately adjacent to the positioning structure in the circumferential direction. Alternatively, the positioning structure may be separated by unequal (non-uniform) distances from the LEDs that are immediately adjacent to the positioning structure in the circumferential direction.

(19) The configurations described in Embodiments 7 and 8 may be applied to the configurations described in Embodiments 3 to 6.

(20) In the configuration described in Embodiment 1, the unit lenses in the first and second lens sheets may have different apex angles, heights, or array pitches.

(21) In the configurations described In Embodiments 1, 2, 7, and 8, the chassis may be, for example, square-shaped in plan view.

(22) In the embodiments above, the LED substrate is disposed to overlap the back side of the light guide plate, as an example. The present invention is also applicable to configurations in which the LED substrate is disposed to overlap the front side of the light guide plate.

(23) In the embodiments above, the LEDs are of a side emitting type, as an example. Alternatively, the LEDs may be of a top emitting type.

(24) In the embodiments above, the LED substrate is composed of a film-like base material, as an example. Alternatively, the LED substrate may be composed of a platelike base member with some thickness.

(25) In the embodiments above, the light sources are LEDs, as an example. Alternatively, the light sources may be, for example, organic ELs.

(26) In the embodiments above, the color filters in the liquid crystal panel include three-color (R, G, and B) coloring units, as an example. Alternatively, the coloring units may come in four or more colors.

(27) Apart from the embodiments above, the present invention is also applicable to liquid crystal displays that include, for example, a touch panel, a parallax barrier panel, or a cover glass.

(28) In the embodiments above, the liquid crystal display is of a transmissive type, as an example. The present invention is also applicable to a transflective liquid crystal display.

(29) In the embodiments above, the switching elements in the liquid crystal display are TFTs. The present invention is also applicable to liquid crystal displays including switching elements that are not TFTs (e.g., thin film diodes (TFDs)) and to black and white liquid crystal displays apart from color liquid crystal displays.

(30) In the embodiments above, the pixel electrodes are arranged on the array substrate of the liquid crystal panel, and the counter electrodes are arranged on the CF substrate. Alternatively, both the pixel electrodes and the counter electrodes may be arranged on the array substrate. Such liquid crystal panels are preferably IPS (in-plane switching) mode or FFS (fringe field switching) mode.

(31) In the embodiments above, the display panel is a liquid crystal panel. Alternatively, for example, the display panel may be an MEMS (micro electro mechanical systems) display panel that displays images by using light emitted by the backlight device. The MEMS display panel includes a matrix of numerous tiny mechanical shutters arranged on a plane to form display pixels. The light emitted by the backlight device is regulated in terms of transmission intensity for each display pixel by controlling each opening/closing mechanical shutter, to display an image at predetermined gray levels.

REFERENCE SIGNS LIST

10: Liquid Crystal Display (Display Device)
11: Liquid Crystal Panel (Display Panel)
12, 112, 212, 312: Backlight Device (Illumination device)
13, 113, 213, 313, 413, 613, 713: Chassis (Housing)
13*b*, 113*b*, 213*b*, 713*b*: Sidewall Portion
13*b*1: LED-containing Concave Portion (Light-source-containing Concave Portion)
14, 114, 214, 314, 414, 514, 614: Light Guide Plate (Optical Member, Lamination Member)
14*a*, 214*a*, 314*a*: Light-incident Face
15, 115, 215, 315, 415, 515, 615, 715: Optical Sheet (Optical Member)
15*b*, 115*b*, 215*b*, 315*b*, 715*b*: First Lens Sheet (Lens Sheet)
15*c*, 115*c*, 215*c*, 315*c*, 715*c*: Second Lens Sheet (Lens Sheet)
16, 116, 216, 316, 616: Reflective Sheet (Optical Member)
17, 217: LED (Light Source)
21, 121, 621, 721: Convex Positioning Portion (Positioning Structure)
21*a*, 621*a*: Contact Face
22, 122, 622, 722: Concave Positioning Portion (Positioning Structure)
22*a*, 622*a*: Contact Face
23, 323, 423, 523: LED-to-LED Intervening Portion (Light-source-to-light-source Intervening Portion)
24, 324, 524: Light-guiding-plate-side Positioning Portion (Positioning Structure)

25, 325, 525: Optical-sheet-side Positioning Portion (Positioning Structure)
27, 327, 427: Light-guiding-plate-side Holding Portion (Holding Structure)
28, 328, 428: Chassis-side Holding Portion (Holding Structure)

The invention claimed is:

1. An illumination device and display device comprising:
an optical member having a substantially circular profile;
a lamination member disposed to overlap the optical member; and
positioning structures provided to the optical member and the lamination member and having contact faces that come into contact with each other in a circumferential direction of the optical member, to position the optical member relative to the lamination member in the circumferential direction.

2. The illumination device and display device according to claim 1, further comprising a plurality of light sources arranged at intervals in terms of the circumferential direction, wherein the positioning structures are provided between those light sources which are adjacent in the circumferential direction.

3. The illumination device and display device according to claim 1, wherein at least two of the positioning structures differ in size or shape from each other as viewed in a direction in which the lamination member overlaps the optical member and are provided in locations that are not point-symmetric with respect to a center of the optical member.

4. The illumination device and display device according to claim 1, wherein:
the optical member comprises a plurality of optical members disposed to overlap each other; and
the positioning structures comprise at least a first pair of two of the positioning structures and a second pair of another two of the positioning structures,
the positioning structures in the first pair differing in size or shape from each other as viewed in a direction in which the lamination member overlaps the optical members and being provided in such a manner as to make an angle of α (degrees) therebetween so that the positioning structures in the first pair are provided in locations that are not point-symmetric with respect to a center of the optical member,
the positioning structures in the second pair differing in size from each other as viewed in the direction in which the lamination member overlaps the optical members and being provided in such a manner as to make the same angle of α (degrees) therebetween as the positioning structures in the first pair and in such a manner that the first pair of positioning structures and the second pair of positioning structures make an angle of β (degrees) therebetween, α (degrees) being not equal to β (degrees).

5. The illumination device and display device according to claim 4, wherein:
the optical member comprises a plurality of lens sheets each including unit lenses extending in a single direction, the unit lenses being arranged in a direction that intersects that single direction; and
the positioning structures are arranged so that the first pair of positioning structures and the second pair of positioning structures make an angle of 90° therebetween.

6. The illumination device and display device according to claim 1, wherein the positioning structures are each asymmetric in shape as viewed in a direction in which the lamination member overlaps the optical member.

7. The illumination device and display device according to claim 1, further comprising a plurality of light sources arranged at intervals in terms of the circumferential direction,
wherein:
the optical member comprises at least a light guide plate for guiding light emitted by the light sources; and
the lamination member comprises at least a housing for housing the light sources and the light guide plate.

8. The illumination device and display device according to claim 7, wherein the optical member comprises at least an optical sheet disposed to overlap a light-exiting side of the light guide plate, the optical sheet performing an optical operation on light exiting from the light guide plate.

9. The illumination device and display device according to claim 7, wherein:
the housing has a sidewall portion encircling at least the light sources and the light guide plate, the sidewall portion having a plurality of light-source-containing concave portions in dented parts of an inner circumferential surface of the sidewall portion at intervals in terms of the circumferential direction, the light-source-containing concave portions containing the light sources inside thereof; and
the positioning structures comprise: a convex positioning portion on a projecting part of an outer circumferential surface of the light guide plate, the convex positioning portion having contact faces; and a concave positioning portion in a dented part of the inner circumferential surface of the sidewall portion, the concave positioning portion having contact faces for engagement with the convex positioning portion.

10. The illumination device and display device according to claim 1, further comprising a plurality of light sources arranged at intervals in terms of the circumferential direction,
wherein:
the lamination member comprises at least a light guide plate for guiding light emitted by the light sources, the light guide plate having a substantially circular profile so as to be encircled by the light sources; and
the optical member comprises at least an optical sheet disposed to overlap a light-exiting side of the light guide plate, the optical sheet performing an optical operation on light exiting from the light guide plate.

11. The illumination device and display device according to claim 10, further comprising a housing for housing the light sources, the light guide plate, and the optical sheet, the housing having a sidewall portion encircling at least the light sources, the light guide plate, and the optical sheet,
wherein:
the light guide plate has a substantially circular profile, has light-incident faces in parts of an outer circumferential surface thereof that face the light sources, the light emitted by the light sources being incident on the light-incident faces, and has light-source-to-light-source intervening portions interposed between those light sources which are adjacent in the circumferential direction and projecting toward the sidewall portion relative to the light-incident faces; and
the positioning structures are provided to the light-source-to-light-source intervening portions and an outer edge of the optical sheet.

12. The illumination device and display device according to claim 10, wherein the positioning structures comprise: a light-guiding-plate-side positioning portion projecting out of the light guide plate toward the light-exiting side; and an optical-sheet-side positioning portion provided on the optical sheet to mate with the light-guiding-plate-side positioning portion.

13. The illumination device and display device according to claim 10, further comprising a housing for housing at least the light sources, the light guide plate, and the optical sheet, wherein the light guide plate and the housing each comprise a holding structure configured to hold the light guide plate and the housing in assembled state.

14. A display device comprising: the illumination device and display device according to claim 1; and a display panel producing a display by utilizing light emitted by the illumination device and display device.

* * * * *